United States Patent
Colgate et al.

(10) Patent No.: US 11,774,250 B2
(45) Date of Patent: Oct. 3, 2023

(54) USING HIGH DEFINITION MAPS FOR GENERATING SYNTHETIC SENSOR DATA FOR AUTONOMOUS VEHICLES

(71) Applicant: NVIDIA CORPORATION, Santa Clara, CA (US)

(72) Inventors: Gil Colgate, Foster City, CA (US); Ronghua Zhang, Campbell, CA (US)

(73) Assignee: NVIDIA CORPORATION, Santa Clara, CA (US)

(*) Notice: Subject to any disclaimer, the term of this patent is extended or adjusted under 35 U.S.C. 154(b) by 132 days.

(21) Appl. No.: 16/919,125

(22) Filed: Jul. 2, 2020

(65) Prior Publication Data

US 2021/0004017 A1    Jan. 7, 2021

Related U.S. Application Data

(60) Provisional application No. 62/871,023, filed on Jul. 5, 2019.

(51) Int. Cl.
| | | |
|---|---|---|
| *G01C 21/30* | (2006.01) | |
| *G01C 21/34* | (2006.01) | |
| *G06V 10/774* | (2022.01) | |
| *G06V 20/56* | (2022.01) | |
| *G06F 18/214* | (2023.01) | |
| *G01C 21/00* | (2006.01) | |

(52) U.S. Cl.
CPC ......... *G01C 21/30* (2013.01); *G01C 21/3492* (2013.01); *G01C 21/3807* (2020.08); *G01C 21/3833* (2020.08); *G06F 18/2155* (2023.01); *G06V 10/7753* (2022.01); *G06V 20/56* (2022.01)

(58) Field of Classification Search
CPC .. G05D 1/0221; G05D 1/0219; G05D 1/0248; G05D 1/0251; G01C 21/3492; G01C 21/3807; G01C 21/3833; G01C 21/30; G01C 21/38–3896; G06K 9/6259; G06K 9/00791
See application file for complete search history.

(56) References Cited

U.S. PATENT DOCUMENTS

2016/0314224 A1* 10/2016 Wei .......................... G06F 30/20
2018/0275658 A1* 9/2018 Iandola ................ G06K 9/6257
(Continued)

OTHER PUBLICATIONS

"Autono Vi-Sim: Autonomous Vehicle Simulation Platform with Weather, Sensing and Traffic Control", Best et al., Jun. 1, 2018, Conference on Computer Vision and Pattern Recognition Workshop (Year: 2018).*

(Continued)

*Primary Examiner* — Jeffrey C Boomer
(74) *Attorney, Agent, or Firm* — Maschoff Brennan

(57) ABSTRACT

According to an aspect of an embodiment, operations may comprise accessing high definition (HD) map data of a region, presenting, via a user interface, information describing the HD map data, receiving instructions, via the user interface, for modifying the HD map data by adding one or more synthetic objects to locations in the HD map data, modifying the HD map data based on the received instructions, and generating a synthetic track in the modified HD map data comprising, for each of one or more vehicle poses, generated synthetic sensor data based on the one or more synthetic objects in the modified HD map data.

20 Claims, 25 Drawing Sheets

(56) References Cited

U.S. PATENT DOCUMENTS

2019/0228571 A1* 7/2019 Atsmon ................ G06T 19/006
2020/0301799 A1* 9/2020 Manivasagam ....... G06F 11/263

OTHER PUBLICATIONS

Nvidia Drive Sim., (Nvidia) Jan. 8, 2019 [online] [retrieved on 2020-OB-211. Retrieved from the Internet <URL: https://www.youtube.com/watch?v=DXsLDyiONV4>.

Greenstein, Zvi. The Test Fleet of the Future Is Virtual: DRIVE Constellation Now Available. Nvidia, Mar. 18, 2019, [online], [retrieved on Aug. 21, 2020]. Retrieved from the Internet: <URL: https//blogs.nvidia.com/blog/2019i03/18/drive-constellation-now-available/>.

* cited by examiner

USING HIGH DEFINITION MAPS FOR GENERATING SYNTHETIC SENSOR DATA FOR AUTONOMOUS VEHICLES

CROSS-REFERENCE TO RELATED APPLICATION

This patent application claims the benefit of and priority to U.S. Provisional App. No. 62/871,023 filed Jul. 5, 2019, which is incorporated by reference in the present disclosure in its entirety. This patent application is also related to U.S. Nonprovisional application Ser. No. 16/904,504 filed Jun. 17, 2020, which is incorporated by reference in the present disclosure in its entirety.

FIELD

The embodiments discussed herein are related to maps for autonomous vehicles, and more particularly to using high definition maps for generating synthetic sensor data for autonomous vehicles.

BACKGROUND

Autonomous vehicles, also known as self-driving cars, driverless cars, or robotic cars, may drive from a source location to a destination location without requiring a human driver to control or navigate the vehicle. Automation of driving may be difficult for several reasons. For example, autonomous vehicles may use sensors to make driving decisions on the fly, or with little response time, but vehicle sensors may not be able to observe or detect some or all inputs that may be required or useful to safely control or navigate the vehicle in some instances. Vehicle sensors may be obscured by corners, rolling hills, other vehicles, etc. Vehicle sensors may not observe certain inputs early enough to make decisions that may be necessary to operate the vehicle safely or to reach a desired destination. In addition, some inputs, such as lanes, road signs, or traffic signals, may be missing on the road, may be obscured from view, or otherwise may not be readily visible, and therefore may not be detectable by sensors. Furthermore, vehicle sensors may have difficulty detecting emergency vehicles, a stopped obstacle in a given lane of traffic, or road signs for rights of way.

Autonomous vehicles may use map data to discover some of the above information rather than relying on sensor data. However, conventional maps have several drawbacks that may make them difficult to use for an autonomous vehicle. For example, conventional maps may not provide the level of precision or accuracy for navigation within a certain safety threshold (e.g., accuracy within 30 centimeters (cm) or better). Further, GPS systems may provide accuracies of approximately 3-5 meters (m) but have large error conditions that may result in accuracies of over 100 m. This lack of accuracy may make it challenging to accurately determine the location of the vehicle on a map or to identify (e.g., using a map, even a highly precise and accurate one) a vehicle's surroundings at the level of precision and accuracy desired.

Furthermore, conventional maps may be created by survey teams that may use drivers with specially outfitted survey cars with high resolution sensors that may drive around a geographic region and take measurements. The measurements may be provided to a team of map editors that may assemble one or more maps from the measurements. This process may be expensive and time consuming (e.g., taking weeks to months to create a comprehensive map). As a result, maps assembled using such techniques may not have fresh data. For example, roads may be updated or modified on a much more frequent basis (e.g., rate of roughly 5-10% per year) than a survey team may survey a given area. For example, survey cars may be expensive and limited in number, making it difficult to capture many of these updates or modifications. For example, a survey fleet may include a thousand survey cars. Due to the large number of roads and the drivable distance in any given state in the United States, a survey fleet of a thousand cars may not cover the same area at the same frequency of road changes to keep the map up to date on a regular basis and to facilitate safe self-driving of autonomous vehicles. As a result, conventional techniques of maintaining maps may be unable to provide data that is sufficiently accurate and up to date for the safe navigation of autonomous vehicles.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, operations may comprise accessing high definition (HD) map data of a region. The operations may also comprise presenting, via a user interface, information describing the HD map data. The operations may also comprise receiving instructions, via the user interface, for modifying the HD map data by adding one or more synthetic objects to locations in the HD map data. The operations may also comprise modifying the HD map data based on the received instructions. The operations may also comprise generating a synthetic track in the modified HD map data comprising, for each of one or more vehicle poses, generated synthetic sensor data based on the one or more synthetic objects in the modified HD map data.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings.

DESCRIPTION OF EMBODIMENTS

Overview

Figure 1:
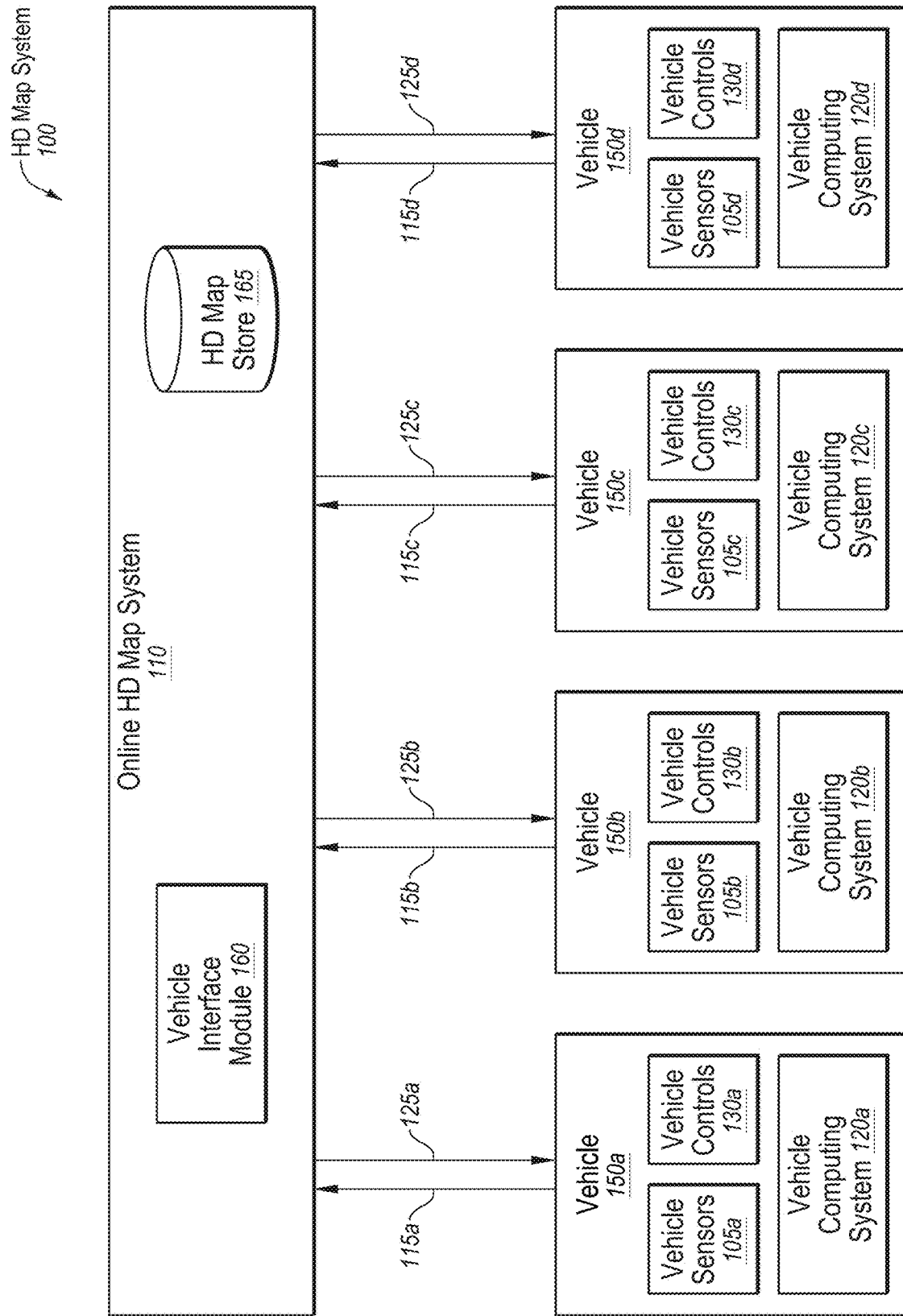
FIG. 1 illustrates the overall system environment of an HD map system interacting with multiple vehicle computing systems, according to an embodiment.

Embodiments of the present disclosure may maintain high definition (HD) maps that may include up-to-date information with high accuracy or precision. The HD maps may be used by an autonomous vehicle to safely navigate to various destinations without human input or with limited human input. In the present disclosure reference to "safe navigation" may refer to performance of navigation within a target safety threshold. For example, the target safety threshold may be a certain number of driving hours without an accident. Such thresholds may be set by automotive manufacturers or government agencies. Additionally, reference to "up-to-date" information does not necessarily mean absolutely up-to-date, but up-to-date within a target threshold amount of time. For example, a target threshold amount of time may be one week or less such that a map that reflects any potential changes to a roadway that may have occurred within the past week may be considered "up-to-date". Such target threshold amounts of time may vary anywhere from one month to 1 minute, or possibly even less.

The autonomous vehicle may be a vehicle capable of sensing its environment and navigating without human input. An HD map may refer to a map that may store data with high precision and accuracy, for example, with accuracies of approximately 2-30 cm.

Some embodiments may generate HD maps that may contain spatial geometric information about the roads on which the autonomous vehicle may travel. Accordingly, the generated HD maps may include the information that may allow the autonomous vehicle to navigate safely without human intervention. Some embodiments may gather and use data from the lower resolution sensors of the self-driving vehicle itself as it drives around rather than relying on data that may be collected by an expensive and time-consuming mapping fleet process that may include a fleet of vehicles outfitted with high resolution sensors to create HD maps. The autonomous vehicles may have no prior map data for these routes or even for the region. Some embodiments may provide location as a service (LaaS) such that autonomous vehicles of different manufacturers may gain access to the most up-to-date map information collected, obtained, or created via the aforementioned processes.

Some embodiments may generate and maintain HD maps that may be accurate and may include up-to-date road conditions for safe navigation of the autonomous vehicle. For example, the HD maps may provide the current location of the autonomous vehicle relative to one or more lanes of roads precisely enough to allow the autonomous vehicle to drive safely in and to maneuver safety between one or more lanes of the roads.

HD maps may store a very large amount of information, and therefore may present challenges in the management of the information. For example, an HD map for a given geographic region may be too large to store on a local storage of the autonomous vehicle. Some embodiments may provide a portion of an HD map to the autonomous vehicle that may allow the autonomous vehicle to determine its current location in the HD map, determine the features on the road relative to the autonomous vehicle's position, determine if it is safe to move the autonomous vehicle based on physical constraints and legal constraints, etc. Examples of such physical constraints may include physical obstacles, such as walls, barriers, medians, curbs, etc. and examples of legal constraints may include an allowed direction of travel for a lane, lane restrictions, speed limits, yields, stops, following distances, etc.

Some embodiments of the present disclosure may allow safe navigation for an autonomous vehicle by providing relatively low latency, for example, 5-40 milliseconds or less, for providing a response to a request; high accuracy in terms of location, for example, accuracy within 30 cm or better; freshness of data such that a map may be updated to reflect changes on the road within a threshold time frame, for example, within days, hours, minutes or seconds; and storage efficiency by reducing or minimizing the storage used by the HD Map.

Some embodiments of the present disclosure may involve using high definition maps for generating synthetic sensor data for autonomous vehicles. For example, the system may modify an HD Map (e.g., including an OMap and an LMap) to synthetically change features of the map, for example, by adding or removing a synthetic object (e.g., adding a new traffic sign, removing an existing traffic sign, or adding or removing cones at predetermined positions). The system may then generate synthetic sensor data (e.g., LIDAR scans and 2D perception results), and store them as a synthetic track. The system may then replay the synthetic track and may compare the detected change with ground truth (e.g., that is known since the system made the changes to the HD map). This technique may allow the system to generate and test scenarios that may be difficult to obtain from the real world. For example, because lane closure is a relatively rare phenomenon, and thus data for testing/debugging/training models based on lane closure may be difficult to obtain, some embodiments may synthetically add cones in various contexts, for example, on roads with different number of lanes, different locations with different level of traffic, highways, etc. to simulate lane closures without actual lane closure occurring in the real world.

FIG. 1 illustrates an example overall system environment of an HD map system 100 that may interact with multiple vehicles, according to one or more embodiments of the present disclosure. The HD map system 100 may comprise an online HD map system 110 that may interact with a plurality of vehicles 150 (e.g., vehicles 150a-d) of the HD map system 100. The vehicles 150 may be autonomous vehicles or non-autonomous vehicles.

The online HD map system 110 may be configured to receive sensor data that may be captured by vehicle sensors 105 (e.g., 105a-105d) of the vehicles 150 and combine data received from the vehicles 150 to generate and maintain HD maps. The online HD map system 110 may be configured to send HD map data to the vehicles 150 for use in driving the vehicles 150. In some embodiments, the online HD map system 110 may be implemented as a distributed computing system, for example, a cloud-based service that may allow clients such as a vehicle computing system 120 (e.g., vehicle computing systems 120a-d) to make requests for information and services. For example, a vehicle computing system 120 may make a request for HD map data for driving along a route and the online HD map system 110 may provide the requested HD map data to the vehicle computing system 120.

FIG. 1 and the other figures use like reference numerals to identify like elements. A letter after a reference numeral, such as "105a," indicates that the text refers specifically to the element having that particular reference numeral. A reference numeral in the text without a following letter, such as "105," refers to any or all of the elements in the figures bearing that reference numeral (e.g. "105" in the text refers to reference numerals "105a" and/or "105n" in the figures).

Figure 4:
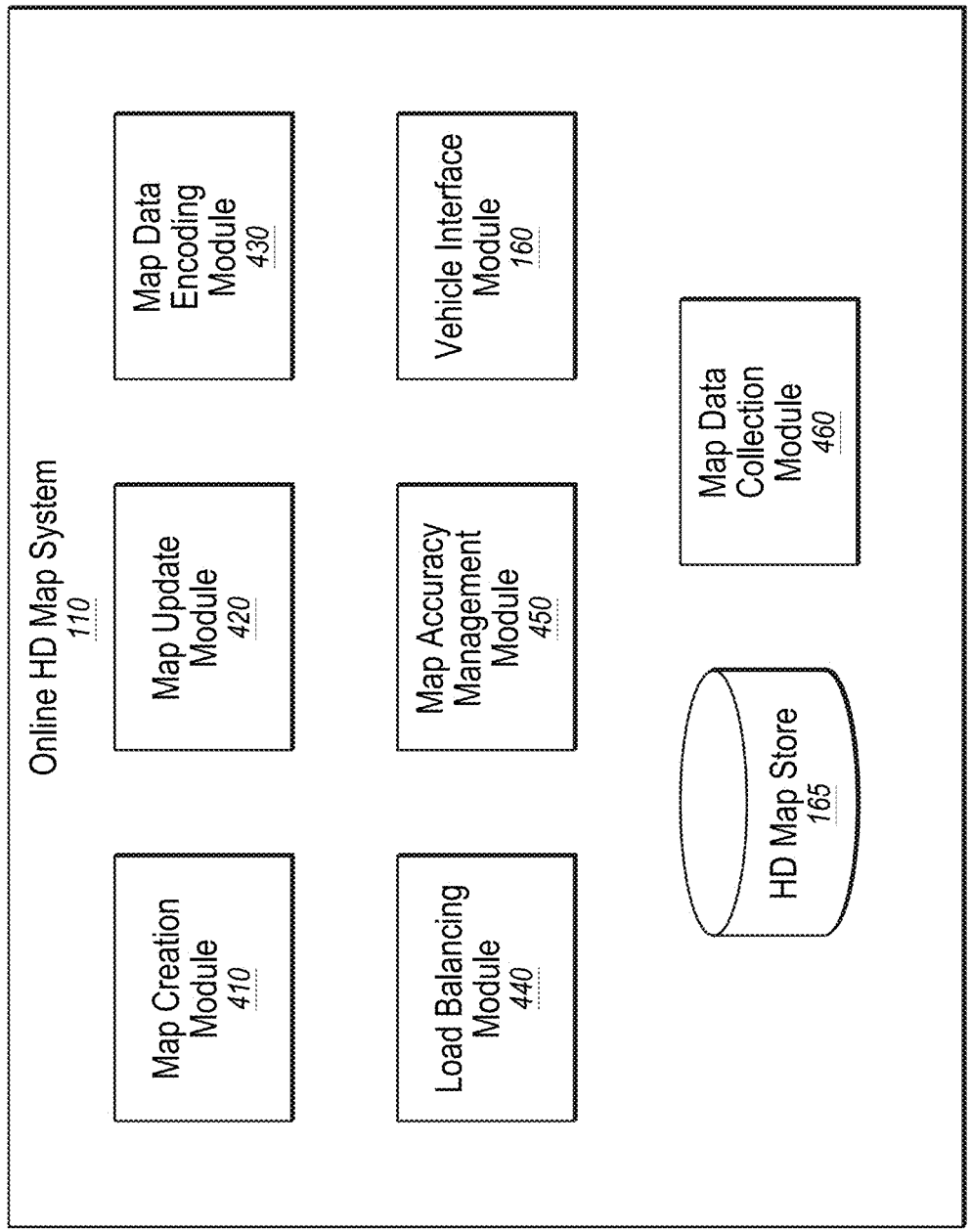
FIG. 4 illustrates an embodiment of a system architecture of an online HD map system.

The online HD map system 110 may comprise a vehicle interface module 160 and an HD map store 165. The online HD map system 110 may be configured to interact with the vehicle computing system 120 of various vehicles 150 using the vehicle interface module 160. The online HD map system 110 may be configured to store map information for various geographical regions in the HD map store 165. The online HD map system 110 may be configured to include other modules than those illustrated in FIG. 1, for example, various other modules as illustrated in FIG. 4 and further described herein.

In the present disclosure, a module may include code and routines configured to enable a corresponding system (e.g., a corresponding computing system) to perform one or more of the operations described therewith. Additionally or alternatively, any given module may be implemented using hardware including any number of processors, microprocessors (e.g., to perform or control performance of one or more operations), field-programmable gate arrays (FPGAs), application-specific integrated circuits (ASICs) or any suitable combination of two or more thereof. Alternatively or additionally, any given module may be implemented using a combination of hardware and software. In the present disclosure, operations described as being performed by a module may include operations that the module may direct a corresponding system to perform.

Further, the differentiation and separation of different modules indicated in the present disclosure is to help with explanation of operations being performed and is not meant to be limiting. For example, depending on the implementation, the operations described with respect to two or more of the modules described in the present disclosure may be performed by what may be considered as a same module. Further, the operations of one or more of the modules may be divided among what may be considered one or more other modules or submodules depending on the implementation.

The online HD map system 110 may be configured to receive sensor data collected by sensors of a plurality of vehicles 150, for example, hundreds or thousands of cars. The sensor data may include any data that may be obtained by sensors of the vehicles that may be related to generation of HD maps. For example, the sensor data may include LIDAR data, captured images, etc. Additionally or alternatively, the sensor data may include information that may describe the current state of the vehicle 150, the location and motion parameters of the vehicles 150, etc.

The vehicles 150 may be configured to provide the sensor data 115 that may be captured while driving along various routes and to send it to the online HD map system 110. The online HD map system 110 may be configured to use the sensor data 115 received from the vehicles 150 to create and update HD maps describing the regions in which the vehicles 150 may be driving. The online HD map system 110 may be configured to build high definition maps based on the collective sensor data 115 that may be received from the vehicles 150 and to store the HD map information in the HD map store 165.

The online HD map system 110 may be configured to send HD map data to the vehicles 150 at the request of the vehicles 150.

For example, in instances in which a particular vehicle 150 is scheduled to drive along a route, the particular vehicle computing system 120 of the particular vehicle 150 may be configured to provide information describing the route being travelled to the online HD map system 110. In response, the online HD map system 110 may be configured to provide HD map data of HD maps related to the route (e.g., that represent the area that includes the route) that may facilitate navigation and driving along the route by the particular vehicle 150.

In an embodiment, the online HD map system 110 may be configured to send portions of the HD map data to the vehicles 150 in a compressed format so that the data transmitted may consume less bandwidth. The online HD map system 110 may be configured to receive from various vehicles 150, information describing the HD map data that may be stored at a local HD map store (e.g., the local HD map store 275 of FIG. 2) of the vehicles 150.

In some embodiments, the online HD map system 110 may determine that the particular vehicle 150 may not have certain portions of the HD map data stored locally in a local HD map store of the particular vehicle computing system 120 of the particular vehicle 150. In these or other embodiments, in response to such a determination, the online HD map system 110 may be configured to send a particular portion of the HD map data to the vehicle 150.

In some embodiments, the online HD map system 110 may determine that the particular vehicle 150 may have previously received HD map data with respect to the same geographic area as the particular portion of the HD map data. In these or other embodiments, the online HD map system 110 may determine that the particular portion of the HD map data may be an updated version of the previously received HD map data that was updated by the online HD map system 110 since the particular vehicle 150 last received the previous HD map data. In some embodiments, the online HD map system 110 may send an update for that portion of the HD map data that may be stored at the particular vehicle 150. This may allow the online HD map system 110 to reduce or minimize the amount of HD map data that may be communicated with the vehicle 150 and also to keep the HD map data stored locally in the vehicle updated on a regular basis.

The vehicle 150 may include vehicle sensors 105 (e.g., vehicle sensors 105a-d), vehicle controls 130 (e.g., vehicle controls 130a-d), and a vehicle computing system 120 (e.g., vehicle computer systems 120a-d). The vehicle sensors 105 may be configured to detect the surroundings of the vehicle 150. In these or other embodiments, the vehicle sensors 105 may detect information describing the current state of the vehicle 150, for example, information describing the location and motion parameters of the vehicle 150.

The vehicle sensors 105 may comprise a camera, a light detection and ranging sensor (LIDAR), a global navigation satellite system (GNSS) receiver, for example, a global positioning system (GPS) navigation system, an inertial measurement unit (IMU), and others. The vehicle sensors 105 may include one or more cameras that may capture images of the surroundings of the vehicle. A LIDAR may survey the surroundings of the vehicle by measuring distance to a target by illuminating that target with a laser light pulses and measuring the reflected pulses. The GPS navigation system may determine the position of the vehicle 150 based on signals from satellites. The IMU may include an electronic device that may be configured to measure and report motion data of the vehicle 150 such as velocity, acceleration, direction of movement, speed, angular rate, and so on using a combination of accelerometers and gyroscopes or other measuring instruments.

The vehicle controls 130 may be configured to control the physical movement of the vehicle 150, for example, acceleration, direction change, starting, stopping, etc. The vehicle controls 130 may include the machinery for controlling the accelerator, brakes, steering wheel, etc. The vehicle computing system 120 may provide control signals to the vehicle controls 130 on a regular and/or continuous basis and may cause the vehicle 150 to drive along a selected route.

The vehicle computing system 120 may be configured to perform various tasks including processing data collected by the sensors as well as map data received from the online HD map system 110. The vehicle computing system 120 may also be configured to process data for sending to the online HD map system 110. An example of the vehicle computing system 120 is further illustrated in FIG. 2 and further described in connection with FIG. 2.

The interactions between the vehicle computing systems 120 and the online HD map system 110 may be performed via a network, for example, via the Internet. The network may be configured to enable communications between the vehicle computing systems 120 and the online HD map system 110. In some embodiments, the network may be configured to utilize standard communications technologies and/or protocols. The data exchanged over the network may be represented using technologies and/or formats including the hypertext markup language (HTML), the extensible markup language (XML), etc. In addition, all or some of the links may be encrypted using conventional encryption technologies such as secure sockets layer (SSL), transport layer security (TLS), virtual private networks (VPNs), Internet Protocol security (IPsec), etc. In some embodiments, the entities may use custom and/or dedicated data communications technologies.

Vehicle Computing System

Figure 2:
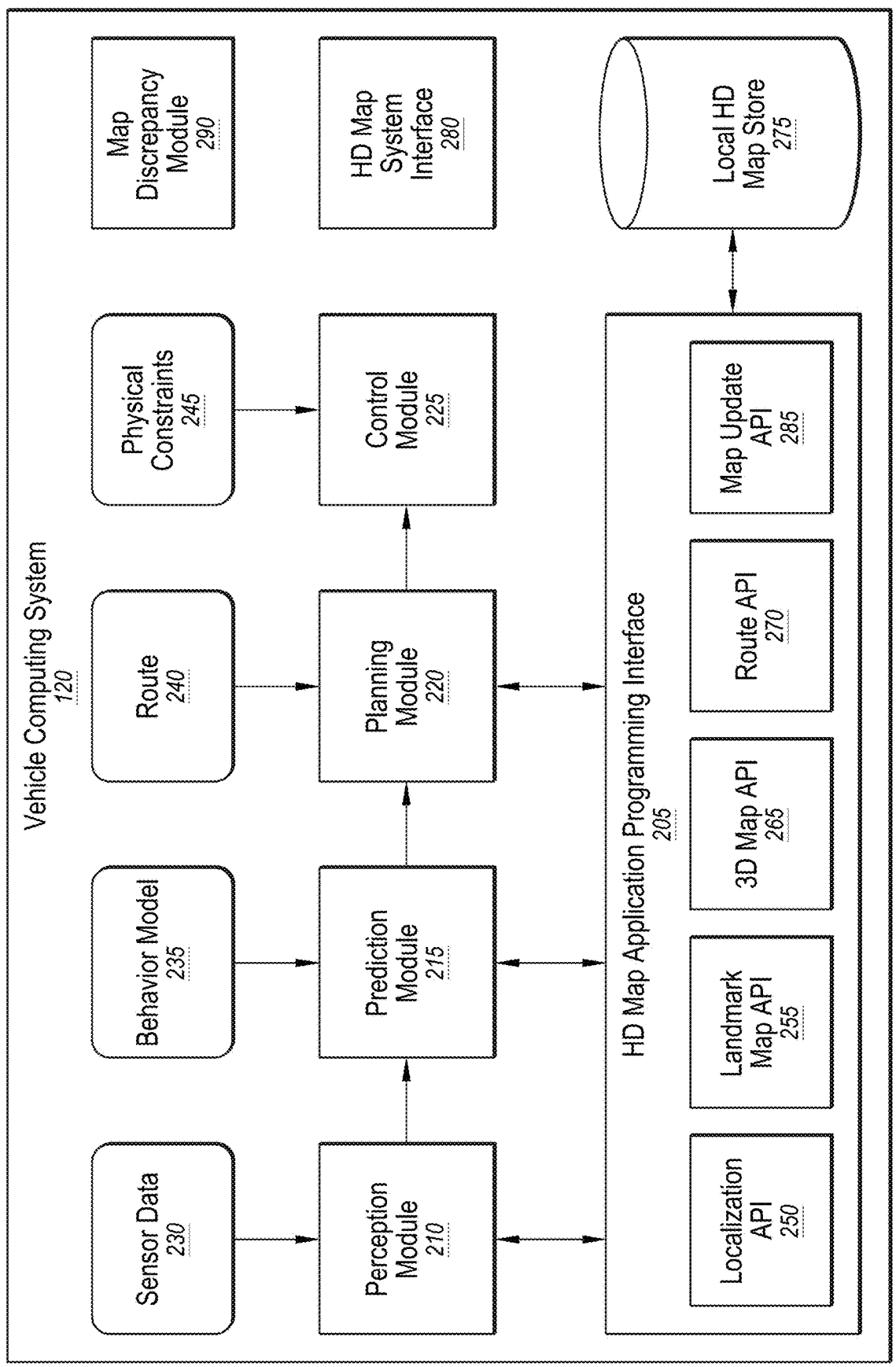
FIG. 2 illustrates an embodiment of a system architecture of a vehicle computing system.

FIG. 2 illustrates an example system architecture of the vehicle computing system 120. The vehicle computing system 120 may include a perception module 210, a prediction module 215, a planning module 220, a control module 225, a local HD map store 275, an HD map system interface 280, a map discrepancy module 290, and an HD map application programming interface (API) 205. The various modules of the vehicle computing system 120 may be configured to process various types of data including sensor data 230, a behavior model 235, routes 240, and physical constraints 245. In some embodiments, the vehicle computing system 120 may contain more or fewer modules. The functionality described as being implemented by a particular module may be implemented by other modules.

With reference to FIG. 2 and FIG. 1, in some embodiments, the vehicle computing system 120 may include a perception module 210. The perception module 210 may be configured to receive sensor data 230 from the vehicle sensors 105 of the vehicles 150. The sensor data 230 may include data collected by cameras of the car, LIDAR, IMU, GPS navigation system, etc. The perception module 210 may also be configured to use the sensor data 230 to determine what objects are around the corresponding vehicle 150, the details of the road on which the corresponding vehicle 150 is travelling, etc. In addition, the perception module 210 may be configured to process the sensor data 230 to populate data structures storing the sensor data 230 and to provide the information or instructions to a prediction module 215 of the vehicle computing system 120.

The prediction module 215 may be configured to interpret the data provided by the perception module 210 using behavior models (235) of the objects perceived to determine whether an object may be moving or likely to move. For example, the prediction module 215 may determine that objects representing road signs may not be likely to move, whereas objects identified as vehicles, people, etc., may either be in motion or likely to move. The prediction module 215 may also be configured to use behavior models 235 of various types of objects to determine whether they may be likely to move. In addition, the prediction module 215 may also be configured to provide the predictions of various objects to a planning module 200 of the vehicle computing system 120 to plan the subsequent actions that the corresponding vehicle 150 may take next.

The planning module 220 may be configured to receive information describing the surroundings of the corresponding vehicle 150 from the prediction module 215 and a route 240 that indicate or determine a destination of the vehicle 150, and that may indicate the path that the vehicle 150 may take to get to the destination.

The planning module 220 may also be configured to use the information from the prediction module 215 and the route 240 to plan a sequence of actions that the vehicle 150 may take within a short time interval, for example, within the next few seconds. In some embodiments, the planning module 220 may be configured to specify a sequence of actions as one or more points representing nearby locations that the vehicle 150 may drive through next. The planning module 220 may be configured to provide, to the control module 225, the details of a plan comprising the sequence of actions to be taken by the corresponding vehicle 150. The plan may indicate the subsequent action or actions of the corresponding vehicle 150, for example, whether the corresponding vehicle 150 may perform a lane change, a turn, an acceleration by increasing the speed or slowing down, etc.

The control module 225 may be configured to determine the control signals that may be sent to the vehicle controls 130 of the corresponding vehicle 150 based on the plan that may be received from the planning module 220. For example, if the corresponding vehicle 150 is currently at point A and the plan specifies that the corresponding vehicle 150 should next proceed to a nearby point B, the control module 225 may determine the control signals for the vehicle controls 130 that may cause the corresponding vehicle 150 to go from point A to point B in a safe and smooth way, for example, without taking any sharp turns or a zig zag path from point A to point B. The path that may be taken by the corresponding vehicle 150 to go from point A to point B may depend on the current speed and direction of the corresponding vehicle 150 as well as the location of point B with respect to point A. For example, if the current speed of the corresponding vehicle 150 is high, the corresponding vehicle 150 may take a wider turn compared to another vehicle driving slowly.

The control module 225 may also be configured to receive physical constraints 245 as input. The physical constraints 245 may include the physical capabilities of the corresponding vehicle 150. For example, the corresponding vehicle 150 having a particular make and model may be able to safely make certain types of vehicle movements such as acceleration and turns that another vehicle with a different make and model may not be able to make safely. In addition, the control module 225 may be configured to incorporate the physical constraints 245 in determining the control signals for the vehicle controls 130 of the corresponding vehicle 150. In addition, the control module 225 may be configured to send the control signals to the vehicle controls 130 that may cause the vehicle 150 to execute the specified sequence of actions and may cause the corresponding vehicle 150 to move as planned according to a predetermined set of actions. In some embodiments, the aforementioned steps may be constantly repeated every few seconds and may cause the corresponding vehicle 150 to drive safely along the route that may have been planned for the corresponding vehicle 150.

The various modules of the vehicle computing system 120 including the perception module 210, prediction module 215, and planning module 220 may be configured to receive map information to perform their respective computations. The corresponding vehicle 150 may store the HD map data in the local HD map store 275. The modules of the vehicle computing system 120 may interact with the HD map data using an HD map application programming interface (API) 205.

The HD map API 205 may provide one or more application programming interfaces (APIs) that can be invoked by a module for accessing the map information. The HD map system interface 280 may be configured to allow the vehicle computing system 120 to interact with the online HD map system 110 via a network (not illustrated in the Figures). The local HD map store 275 may store map data in a format that may be specified by the online HD Map system 110. The HD map API 205 may be configured to be capable of processing the map data format as provided by the online HD Map system 110. The HD map API 205 may be configured to provide the vehicle computing system 120 with an interface for interacting with the HD map data. The HD map API 205 may include several APIs including a localization API 250, a landmark map API 255, a route API 270, a 3D map API 265, a map update API 285, etc.

The localization API 250 may be configured to determine the current location of the corresponding vehicle 150, for example, where the corresponding vehicle 150 is with respect to a given route. The localization API 250 may be configured to include a localized API that determines a location of the corresponding vehicle 150 within an HD Map and within a particular degree of accuracy. The vehicle computing system 120 may also be configured to use the location as an accurate (e.g., within a certain level of accuracy) relative position for making other queries, for example, feature queries, navigable space queries, and occupancy map queries further described herein.

The localization API 250 may be configured to receive inputs comprising one or more of, location provided by GPS, vehicle motion data provided by IMU, LIDAR scanner data, camera images, etc. The localization API 250 may be configured to return an accurate location of the corresponding vehicle 150 as latitude and longitude coordinates. The coordinates that may be returned by the localization API 250 may be more accurate compared to the GPS coordinates used as input, for example, the output of the localization API 250 may have precision ranging from 2-30 cm. In some embodiments, the vehicle computing system 120 may be configured to invoke the localization API 250 to determine the location of the corresponding vehicle 150 periodically based on the LIDAR using scanner data, for example, at a frequency of 10 Hertz (Hz).

The vehicle computing system 120 may also be configured to invoke the localization API 250 to determine the vehicle location at a higher rate (e.g., 60 Hz) if GPS or IMU data is available at that rate. In addition, the vehicle computing system 120 may be configured to store as internal state, location history records to improve accuracy of subsequent localization calls. The location history record may store history of location from the point-in-time, when the corresponding vehicle 150 was turned off/stopped, etc. The localization API 250 may include a localize-route API that may be configured to generate an accurate (e.g., within specified degrees of accuracy) route specifying lanes based on the HD maps. The localize-route API may be configured to receive as input a route from a source to a destination via one or more third-party maps and may be configured to generate a high precision (e.g., within a specified degree of precision, such as within 30 cm) route represented as a connected graph of navigable lanes along the input routes based on HD maps.

The landmark map API 255 may be configured to provide a geometric and semantic description of the world around the corresponding vehicle 150, for example, description of various portions of lanes that the corresponding vehicle 150 is currently travelling on. The landmark map APIs 255 comprise APIs that may be configured to allow queries based on landmark maps, for example, fetch-lanes API and fetch-features API. The fetch-lanes API may be configured to provide lane information relative to the corresponding vehicle 150 and the fetch-features API. The fetch-lanes API may also be configured to receive, as input, a location, for example, the location of the corresponding vehicle 150 specified using latitude and longitude and returns lane information relative to the input location. In addition, the fetch-lanes API may be configured to specify a distance parameter indicating the distance relative to the input location for which the lane information may be retrieved. Further, the fetch-features API may be configured to receive information identifying one or more lane elements and to return landmark features relative to the specified lane elements. The landmark features may include, for each landmark, a spatial description that may be specific to the type of landmark.

The 3D map API 265 may be configured to provide access to the spatial 3-dimensional (3D) representation of the road and various physical objects around the road as stored in the local HD map store 275. The 3D map API 265 may include a fetch-navigable-surfaces API and a fetch-occupancy-grid API. The fetch-navigable-surfaces API may be configured to receive, as input, identifiers for one or more lane elements and returns navigable boundaries for the specified lane elements. The fetch-occupancy-grid API may also be configured to receive a location as input, for example, a latitude and a longitude of the corresponding vehicle 150, and return information describing occupancy for the surface of the road and all objects available in the HD map near the location. The information describing occupancy may include a hierarchical volumetric grid of some or all positions considered occupied in the HD map. The occupancy grid may include information at a high resolution near the navigable areas, for example, at curbs and bumps, and relatively low resolution in less significant areas, for example, trees and walls beyond a curb. In addition, the fetch-occupancy-grid API may be configured to be useful to detect obstacles and to change direction, if necessary.

The 3D map APIs 265 also include map-update APIs, for example, download-map-updates API and upload-map-updates API. The download-map-updates API may be configured to receive as input a planned route identifier and download map updates for data relevant to all planned routes or for a specific planned route. The upload-map-updates API may be configured to upload data collected by the vehicle computing system 120 to the online HD map system 110. The upload-map-updates API may allow the online HD map system 110 to keep the HD map data stored in the online HD map system 110 updated based on changes in map data that may be observed by vehicle sensors 105 of vehicles 150 driving along various routes.

The route API 270 may be configured to return route information including a full route between a source and destination and portions of a route as the corresponding vehicle 150 travels along the route. The 3D map API 265 may be configured to allow querying of the online HD map system 110 or of an HD Map. The route APIs 270 may include an add-planned-routes API and a get-planned-route API. The add-planned-routes API may be configured to provide information describing planned routes to the online HD map system 110 so that information describing relevant HD maps can be downloaded by the vehicle computing system 120 and kept up to date. The add-planned-routes API may be configured to receive as input, a route specified using polylines expressed in terms of latitudes and longitudes and also a time-to-live (TTL) parameter specifying a time period after which the route data can be deleted. Accordingly, the add-planned-routes API may be configured to allow the vehicle 150 to indicate the route the vehicle 150 is planning on taking in the near future as an autonomous trip. The add-planned-route API may be configured to align the route to the HD map, record the route and its TTL value, and ensure that the HD map data for the route stored in the vehicle computing system 120 is updated (e.g., up-to-date). The get-planned-routes API may be configured to return a list of planned routes and provide information describing a route identified by a route identifier.

The map update API 285 may be configured to manage operations related to updating the map data, both for the local HD map store 275 and for the HD map store 165 stored in the online HD map system 110. Accordingly, modules in the vehicle computing system 120 may be configured to invoke the map update API 285 for downloading data from the online HD map system 110 to the vehicle computing system 120 for storing in the local HD map store 275. The map update API 285 may also be configured to allow the vehicle computing system 120 to determine whether the information monitored by the vehicle sensors 105 indicates a discrepancy in the map information provided by the online HD map system 110 and uploads data to the online HD map system 110 that may result in the online HD map system 110 updating the map data stored in the HD map store 165 that is provided to other vehicles 150.

The map discrepancy module 290 can be configured to be operated with the map update API 285 in order to determine map discrepancies and to communicate map discrepancy information to the online HD map system 110. In some aspects, determining map discrepancies involves comparing sensor data 230 of a particular location to HD map data for that particular location. For example, HD map data may indicate that a lane of a freeway should be usable by the vehicle 150, but sensor data 230 may indicate there is construction work occurring in that lane which has closed it from use. Upon detecting a map discrepancy by the map discrepancy module 290, the corresponding vehicle 150 sends an update message to the online HD map system 110 that comprises information regarding the detected map discrepancy. The map discrepancy module 290 may be configured to construct the update message, which may comprise a vehicle identifier (ID), one or more timestamps, a route traveled, lane element IDs of lane elements traversed, a type of discrepancy, a magnitude of discrepancy, a discrepancy fingerprint to help identify duplicate discrepancy alert messages, a size of message, etc. In some embodiments, one or more operations of the map discrepancy module 290 may be at least partially handled by a map data collection module 460 of FIG. 4 as detailed below.

In some embodiments, the corresponding vehicle 150 may be configured to send an update message to the online HD map system 110 or to the local HD map store 275 upon detection of a map discrepancy and/or periodically send update message. For example, the corresponding vehicle 150 may be configured to record discrepancies and report the discrepancies to the online HD map system 110 via an update message every 10 miles. The online HD map system 110 can be configured to manage the update messages and prioritize the update messages, as described in more detail with reference to map data collection module 460 below.

In some embodiments, the corresponding vehicle 150 can be configured to send update messages to the online HD map system 110 only upon reaching or docking at high bandwidth access points. Once the corresponding vehicle 150 is connected to the Internet (e.g., network), it can be configured to send either a collated update message or a set of update messages, which messages can comprise update messages constructed since the last high bandwidth access point was reached or docked at. Use of the high bandwidth access point can be useful for transmitting large amounts of data. In some aspects, upon receiving a confirmation message that the collated update message or one or more update messages were received by the online HD map system 110, the corresponding vehicle 150 marks the data for deletion to schedule a local delete process and/or deletes the data. Alternatively, the corresponding vehicle 150 may report to the online HD map system 110 periodically based on time, such as every hour.

The map discrepancy module 290 can be configured to function and perform operations related to discrepancy identification in response to messages from the online HD map system 110. For example, upon receiving a message requesting data about a particular location along a route of the corresponding vehicle 150, the map discrepancy module 290 can be configured to instruct one or more vehicle sensors 105 of the corresponding vehicle 150 to collect and report that data to the map discrepancy module 290. Upon receipt of the data, the map discrepancy module 290 can be configured to construct a message containing the data and send the message to the online HD map system 110, either immediately, at the next scheduled time of a periodic schedule, or at the next high bandwidth access point, etc.

The map discrepancy module 290 may be configured to determine a degree of urgency of the determined map discrepancy to be included in an update to any HD map that includes the region having the discrepancy. For example, there may be two degrees of urgency, those being low urgency and high urgency. The online HD map system 110 may consider the degree of urgency of an update message when determining how to process the information in the update message, as detailed below with regard to map data collection module 460. For example, a single lane closure on a desert backroad may be determined to have low urgency, whereas total closure of a major highway in a city of one million people may be determined to have high urgency. In some instances, high urgency update messages may be handled by the online HD map system 110 before low urgency update messages.

In some embodiments, the corresponding vehicle 150 can be configured to continually record sensor data 230 and encode relevant portions thereof for generation of messages to the online HD map system 110, such as in response to requests for additional data of specific locations. In an embodiment, the vehicle 150 can be configured to only delete continually recorded sensor data 230 upon confirmation from the online HD map system 110 that none of the sensor data 320 is needed by the online HD map system 110.

Figure 3:
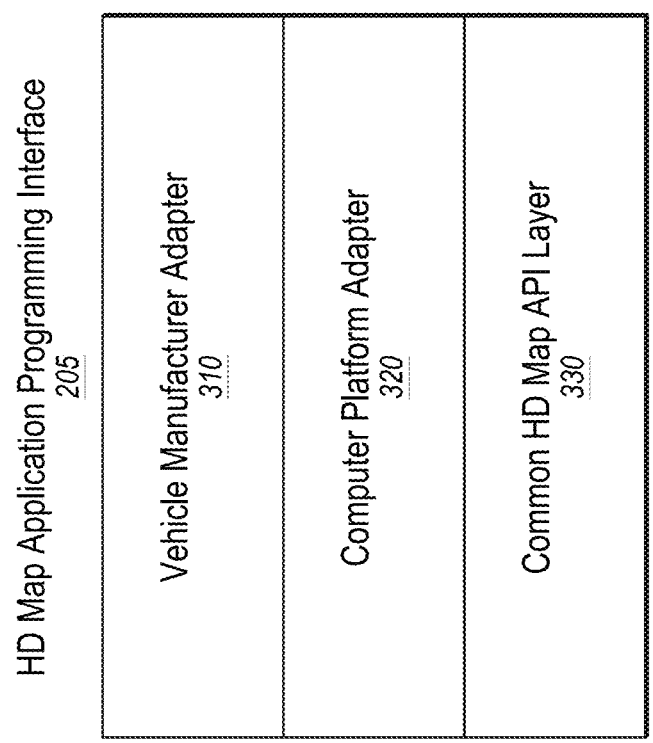
FIG. 3 illustrates an embodiment of the various layers of instructions in an HD Map application programming interface (API) of a vehicle computing system.

FIG. 3 illustrates an example of various layers of instructions in the HD map API 205 of the vehicle computing system 120. Different manufacturers of vehicles may have different procedures or instructions for receiving information from vehicle sensors 105 and for controlling the vehicle controls 130. Furthermore, different vendors may provide different computer platforms with autonomous driving capabilities, for example, collection and analysis of vehicle sensor data. Examples of a computer platform for autonomous vehicles include platforms provided by vendors, such as NVIDIA, QUALCOMM, and INTEL. These platforms may provide functionality for use by autonomous vehicle manufacturers in manufacture of autonomous vehicles 150. A vehicle manufacturer can use any one or several computer platforms for autonomous vehicles 150.

The online HD map system 110 may be configured to provide a library for processing HD maps based on instructions specific to the manufacturer of the vehicle and instructions specific to a vendor specific platform of the vehicle. The library may provide access to the HD map data and allows the vehicle 150 to interact with the online HD map system 110.

As shown in FIG. 3, the HD map API 205 may be configured to be implemented as a library that includes a vehicle manufacturer adapter 310, a computer platform adapter 320, and a common HD map API layer 330. The common HD map API layer 330 may be configured to comprise generic instructions that can be used across a plurality of vehicle compute platforms and vehicle manufacturers. The computer platform adapter 320 may be configured to include instructions that may be specific to each computer platform. For example, the common HD map API layer 330 may be configured to invoke the computer platform adapter 320 to receive data from sensors supported by a specific computer platform. The vehicle manufacturer adapter 310 may be configured to comprise instructions specific to a vehicle manufacturer. For example, the common HD map API layer 330 may be configured to invoke functionality provided by the vehicle manufacturer adapter 310 to send specific control instructions to the vehicle controls 130.

The online HD map system 110 may be configured to store computer platform adapters 320 for a plurality of computer platforms and vehicle manufacturer adapters 310 for a plurality of vehicle manufacturers. The online HD map system 110 may be configured to determine the particular vehicle manufacturer and the particular computer platform for a specific autonomous vehicle 150. The online HD map system 110 may be configured to select the vehicle manufacturer adapter 310 for the particular vehicle manufacturer and the computer platform adapter 320 the particular computer platform of that specific vehicle 150. In addition, the online HD map system 110 can be configured to send instructions of the selected vehicle manufacturer adapter 310 and the selected computer platform adapter 320 to the vehicle computing system 120 of that specific autonomous vehicle 150. The vehicle computing system 120 of that specific autonomous vehicle 150 may be configured to install the received vehicle manufacturer adapter 310 and the compute platform adapter 320. The vehicle computing system 120 can be configured to periodically check or verify whether the online HD map system 110 has an update to the installed vehicle manufacturer adapter 310 and the compute platform adapter 320. Additionally, if a more recent update is available compared to the version installed on the vehicle 150, the vehicle computing system 120 may be configured to request and receive the latest update and to install it.

HD Map System Architecture

FIG. 4 illustrates an example of system architecture of the online HD map system 110. The online HD map system 110 may be configured to include a map creation module 410, a map update module 420, a map data encoding module 430, a load balancing module 440, a map accuracy management module 450, a vehicle interface module 160, a map data collection module 460, and an HD map store 165. Some embodiments of online HD map system 110 may be configured to include more or fewer modules than shown in FIG. 4. Functionality indicated as being performed by a particular module may be implemented by other modules. In some embodiments, the online HD map system 110 may be configured to be a distributed system comprising a plurality of processing systems.

The map creation module 410 may be configured to create the HD map data of HD maps from sensor data collected from several vehicles (e.g., 150a-b) that are driving along various routes. The map update module 420 may be configured to update previously computed HD map data by receiving more recent information (e.g., sensor data) from vehicles 150 that recently travelled along routes on which map information changed. For example, certain road signs may have changed or lane information may have changed as a result of construction in a region, and the map update module 420 may be configured to update the HD maps and corresponding HD map data accordingly. The map data encoding module 430 may be configured to encode HD map data to be able to store the data efficiently (e.g., compress the HD map data) as well as send the HD map data to vehicles 150. The load balancing module 440 may be configured to balance loads across vehicles 150 such that requests to receive data from vehicles 150 are distributed (e.g., uniformly distributed) across different vehicles 150 (e.g., the load distribution between different vehicles 150 is within a threshold amount of each other). The map accuracy management module 450 may be configured to maintain relatively high accuracy of the HD map data using various techniques even though the information received from individual vehicles may not have the same degree of accuracy.

In some embodiments, the map data collection module 460 can be configured to monitor vehicles 150 and process status updates from vehicles 150 to determine whether to request one or more certain vehicles 150 for additional data related to one or more particular locations. Details of the map data collection module 460 are further described in connection with FIG. 13.

Figure 5:
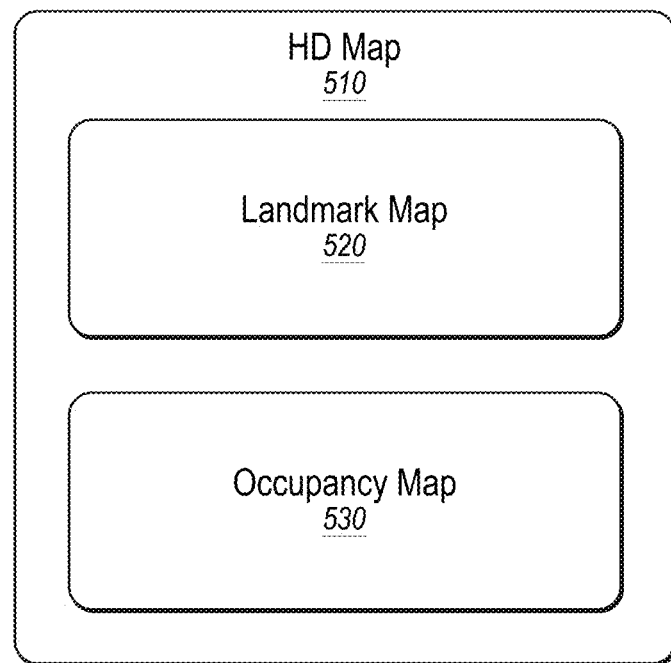
FIG. 5 illustrates an embodiment of components of an HD map.

FIG. 5 illustrates example components of an HD map 510. The HD map 510 may be configured to include HD map data of maps of several geographical regions. In the present disclosure, reference to a map or an HD map, such as HD map 510, may include reference to the map data that corresponds to such a map. Further, reference to information of a respective map may also include reference to the map data of that map.

In some embodiments, the HD map 510 of a geographical region may comprise a landmark map (LMap) 520 and an occupancy map (OMap) 530. The landmark map 520 may comprise information or representations of driving paths (e.g., lanes, yield lines, safely navigable space, driveways, unpaved roads, etc.), pedestrian paths (e.g., cross walks, sidewalks, etc.), and landmark objects (e.g., road signs, buildings, etc.) For example, the landmark map 520 may comprise information describing lanes including the spatial location of lanes and semantic information about each lane. The spatial location of a lane may comprise the geometric location in latitude, longitude, and elevation at high precision, for example, precision within 30 cm or better. The semantic information of a lane comprises restrictions such as direction, speed, type of lane (for example, a lane for going straight, a left turn lane, a right turn lane, an exit lane, and the like), restriction on crossing to the left, connectivity to other lanes, etc.

In some embodiments, the landmark map 520 may comprise information describing stop lines, yield lines, spatial location of crosswalks, safely navigable space, spatial location of speed bumps, curb, road signs comprising spatial location all types of signage that is relevant to driving restrictions, etc. Examples of road signs described in an HD map 510 may include traffic signs, stop signs, traffic lights, speed limits, one-way, do-not-enter, yield (vehicle, pedestrian, animal), etc.

In some embodiments, the information included in a landmark map 520 can be associated with a confidence value measuring a probability of a representation being accurate. A representation of an object is accurate when information describing the object matches attributes of the object (e.g., a driving path, a pedestrian path, a landmark object, etc.). For example, when spatial location and semantic information of a driving path can match attributes (e.g., physical measurements, restrictions, etc.) of the driving path, the representation of the driving path can be considered to be accurate. The vehicle computing system 120 (e.g., the planning module 220) may use the confidence value to control the vehicle 150. For example, if a representation of a landmark object is associated with a high confidence value in the landmark map 520 but the vehicle 150 does not detect the landmark object based on the vehicle sensors 105 and the corresponding observation of the environment around the vehicle 150, the vehicle computing system 120 can be configured to control the vehicle 150 to avoid the landmark object that is presumed to be present based on the high confidence value, or control the vehicle 150 to follow driving restrictions imposed by the landmark object (e.g., causes the vehicle 150 to yield based on a yield sign on the landmark map).

In some embodiments, the occupancy map 530 may comprise a spatial 3-dimensional (3D) representation of the road and physical objects around the road. The data stored in an occupancy map 530 may also be referred to herein as occupancy grid data. The 3D representation may be associated with a confidence score indicative of a likelihood of the object existing at the location. The occupancy map 530 may be represented in a number of other ways. In some embodiments, the occupancy map 530 may be represented as a 3D mesh geometry (collection of triangles) which may cover the surfaces. In some embodiments, the occupancy map 530 may be represented as a collection of 3D points which may cover the surfaces. In some embodiments, the occupancy map 530 may be represented using a 3D volumetric grid of cells at 5-10 cm resolution. Each cell may indicate whether or not a surface exists at that cell, and if the surface exists, a direction along which the surface may be oriented.

The occupancy map 530 may take a large amount of storage space compared to a landmark map 520. For example, data of 1 GB/Mile may be used by an occupancy map 530, resulting in the map of the United States (including 4 million miles of road) occupying $4 \times 10^{15}$ bytes or 4 petabytes. Therefore the online HD map system 110 and the vehicle computing system 120 may be configured to use data compression techniques to store and transfer map data thereby reducing storage and transmission costs. Accordingly, the techniques disclosed herein may help improve the self-driving of autonomous vehicles by improving the efficiency of data storage and transmission with respect to self-driving operations and capabilities.

In some embodiments, the HD map 510 may not use or rely on data that may typically be included in maps, such as addresses, road names, ability to geo-code an address, and ability to compute routes between place names or addresses. The vehicle computing system 120 or the online HD map system 110 may access other map systems, for example, GOOGLE MAPS, to obtain this information. Accordingly, a vehicle computing system 120 or the online HD map system 110 may receive navigation instructions from a tool such as GOOGLE MAPS into a route and may convert the information to a route based on the HD map 510 or may convert the information such that it may be compatible for us on the HD map 510.

Geographical Regions in HD Maps

The online HD map system 110 can be configured to divide a large physical area into geographical regions and to store a representation of each geographical region. Each geographical region may represent a contiguous area bounded by a geometric shape, for example, a rectangle or square. In some embodiments, the online HD map system 110 may be configured to divide a physical area into geographical regions of similar size independent of the amount of data needed to store the representation of each geographical region. In some embodiments, the online HD map system 110 may divide a physical area into geographical regions of different sizes, where the size of each geographical region may be determined based on the amount of information needed for representing the geographical region. For example, a geographical region representing a densely populated area with a large number of streets may represent a smaller physical area compared to a geographical region representing a sparsely populated area with very few streets. In some embodiments, the online HD map system 110 can be configured to determine the size of a geographical region based on an estimate of an amount of information that may be used to store the various elements of the physical area relevant for an HD map 510.

In an embodiment, the online HD map system 110 may represent a geographic region using an object or a data record that may comprise various attributes including: a unique identifier for the geographical region; a unique name for the geographical region; a description of the boundary of the geographical region, for example, using a bounding box of latitude and longitude coordinates; and a collection of landmark features and occupancy grid data.

Figure 6A:
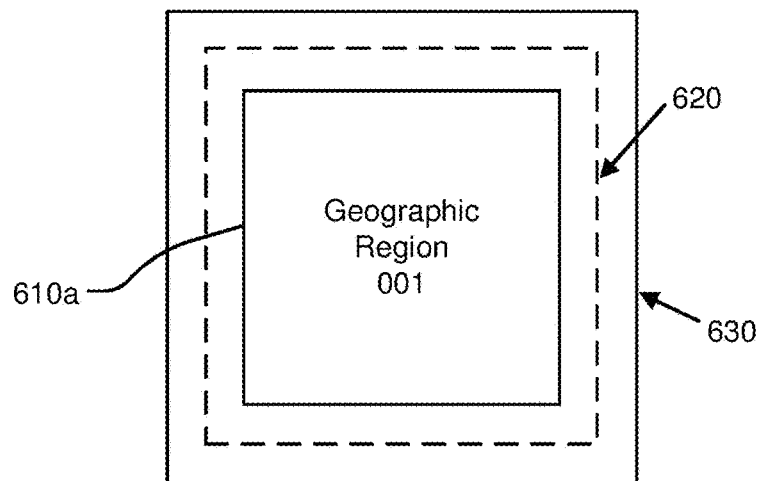
FIGS. 6A-6B illustrate an embodiment of geographical regions defined in an HD map.
Figure 6B:
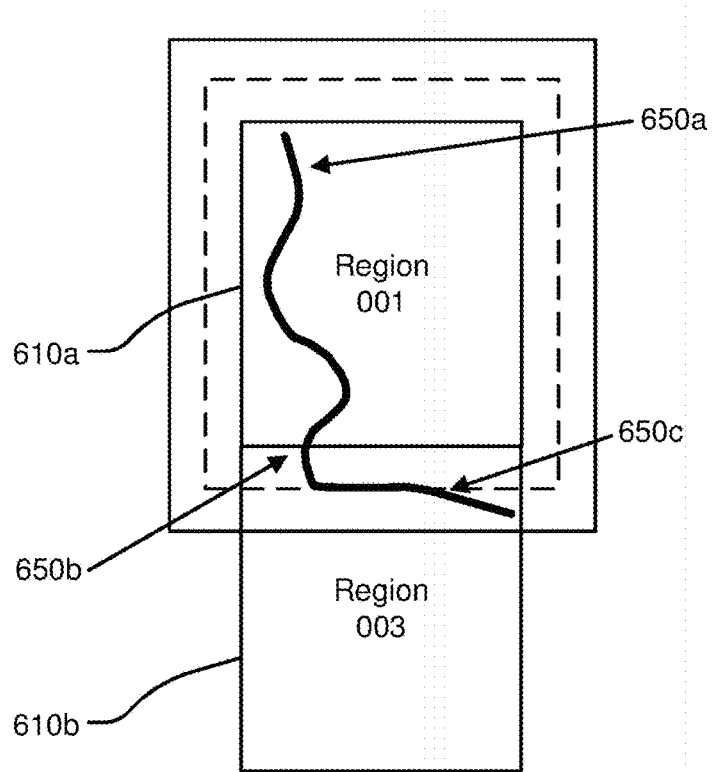

FIGS. 6A-6B illustrate example geographical regions 610a and 610b that can be defined in an HD map according to one or more embodiments. FIG. 6A illustrates a square geographical region 610a. FIG. 6B illustrates two neighboring geographical regions 610a and 610b. The online HD map system 110 can be configured to store data in a representation of a geographical region that can allow for a smooth transition from one geographical region to another as a vehicle 150 drives across geographical region boundaries.

In some embodiments, as illustrated in FIGS. 6A-6B, each geographic region may include a buffer of a predetermined width around it. The buffer may comprise redundant map data around one or more or all sides of a geographic region (e.g., in the case that the geographic region is bounded by a rectangle). Therefore, in some embodiments, where the geographic region may be a certain shape, the geographic region may be bounded by a buffer that may be a larger version of that shape. By way of example, FIG. 6A illustrates a boundary 620 for a buffer of approximately 50 meters around the geographic region 610a and a boundary 630 for a buffer of 100 meters around the geographic region 610a.

In some embodiments, the vehicle computing system 120 can be configured to switch the current geographical region of a corresponding vehicle 150 from one geographical region to a neighboring geographical region when the corresponding vehicle 150 crosses a predetermined (e.g., defined) threshold distance within the buffer. For example, as shown in FIG. 6B, the corresponding vehicle 150 starts at location 650a in the geographical region 610a. The corresponding vehicle 150 may traverse along a route to reach a location 650b where it may cross the boundary of the geographical region 610 but may stay within the boundary 620 of the buffer. Accordingly, the vehicle computing system 120 of the corresponding vehicle 150 may continue to use the geographical region 610a as the current geographical region of the vehicle 150. Once the corresponding vehicle 150 crosses the boundary 620 of the buffer at location 650c, the vehicle computing system 120 may be configured to switch the current geographical region of the corresponding vehicle 150 to geographical region 610b from geographical region 610a. The use of a buffer may reduce or prevent rapid switching of the current geographical region of a vehicle 150 as a result of the vehicle 150 travelling along a route that may closely track a boundary of a geographical region.

Lane Representations in HD Maps

The HD map system 100 may represent lane information of streets in HD maps. Although the embodiments described may refer to streets, the techniques may be applicable to highways, alleys, avenues, boulevards, paths, etc., on which vehicles can travel. The HD map system 100 can be configured to use lanes as a reference frame for purposes of routing and for localization of the vehicle 150. The lanes represented by the HD map system 100 may include lanes that are explicitly marked, for example, white and yellow striped lanes, lanes that may be implicit, for example, on a country road with no lines or curbs but may nevertheless have two directions of travel, and implicit paths that may act as lanes, for example, the path that a turning car may make when entering a lane from another lane.

The HD map system 100 can be configured to store information relative to lanes, for example, landmark features such as road signs and traffic lights relative to the lanes, occupancy grids relative to the lanes for obstacle detection, and navigable spaces relative to the lanes so the vehicle 150 can plan/react in emergencies when the vehicle 150 makes an unplanned move out of the lane. Accordingly, the HD map system 100 can be configured to store a representation of a network of lanes to allow the vehicle 150 to plan a legal path between a source and a destination and to add a frame of reference for real-time sensing and control of the vehicle 150. The HD map system 100 stores information and provides APIs that may allow a vehicle 150 to determine the lane that the vehicle 150 is currently in, the precise location of the vehicle 150 relative to the lane geometry, and any and all relevant features/data relative to the lane and adjoining and connected lanes.

Figure 7:
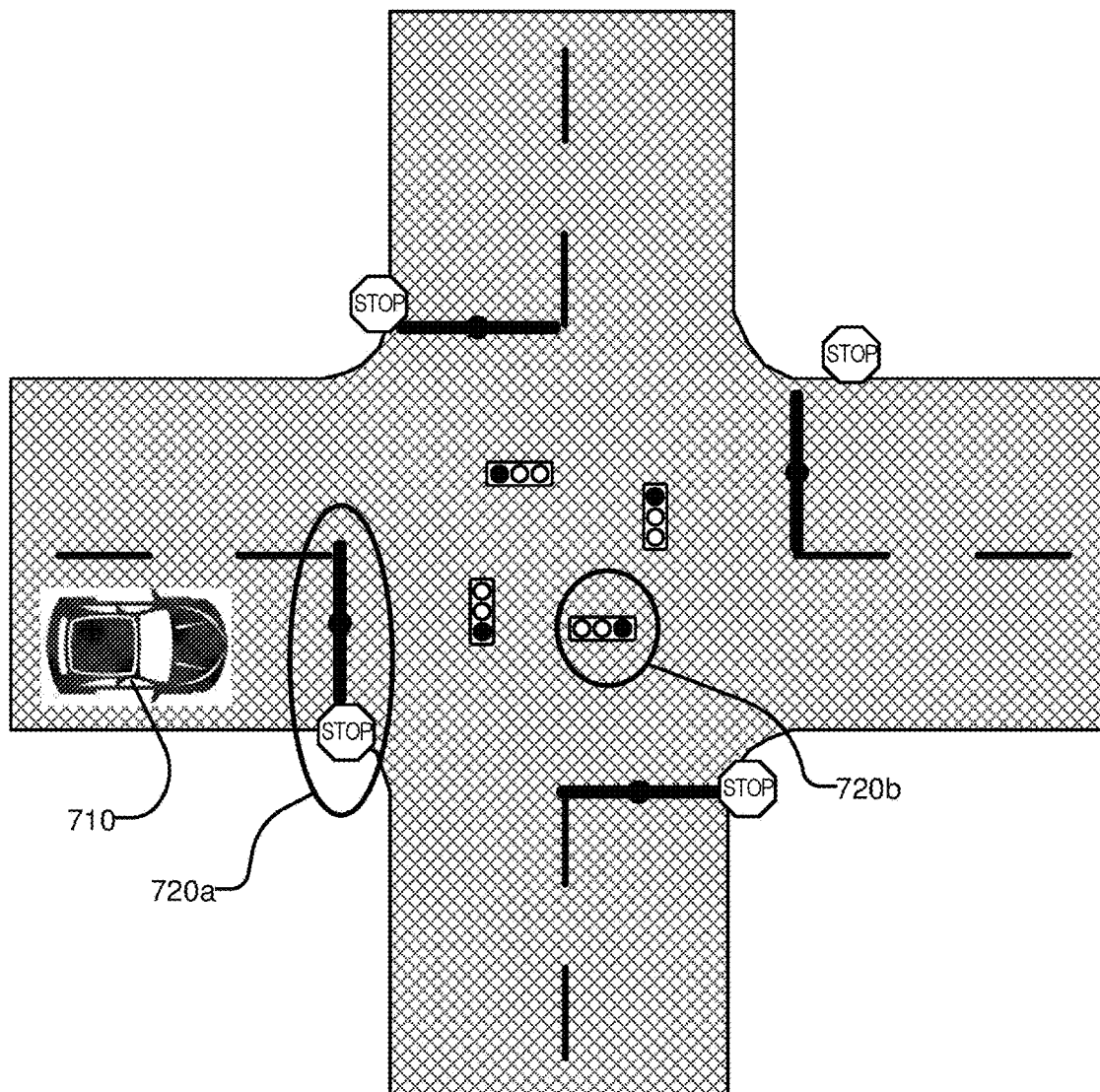
FIG. 7 illustrates an embodiment of a representation of lanes in an HD map.

FIG. 7 illustrates example lane representations in an HD map. FIG. 7 illustrates a vehicle 710 at a traffic intersection. The HD map system 100 provides the vehicle 710 with access to the map data that may be relevant for autonomous driving of the vehicle 710. This may include, for example, features 720a and 720b that may be associated with the lane but may not be the closest features to the vehicle 710. Therefore, the HD map system 100 may be configured to store a lane-centric representation of data that may represent the relationship of the lane to the feature so that the vehicle 710 can efficiently extract the features given a lane.

The HD map system 100 can be configured to provide an HD map that represents portions of the lanes as lane elements. The lane elements can specify the boundaries of the lane and various constraints including the legal direction in which a vehicle 710 can travel within the lane element, the speed with which the vehicle can drive within the lane element, whether the lane element can be for left turn only, or right turn only, etc. In some embodiments, the HD map system 100 can be configured to provide a map that represents a lane element as a continuous geometric portion of a single vehicle lane. The HD map system 100 can be configured to store objects or data structures that may represent lane elements that comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations and etc.

Examples of lane elements represented by a HD map of the HD map system 100 can include, a piece of a right lane on a freeway, a piece of a lane on a road, a left turn lane, the turn from a left turn lane into another lane, a merge lane from an on-ramp an exit lane on an off-ramp, and a driveway. The HD map system 100 can comprise an HD map that represents a one-lane road using two lane elements, one for each direction. The HD map system 100 can be configured to represent median turn lanes that are shared similar to a one-lane road.

Figure 8A:
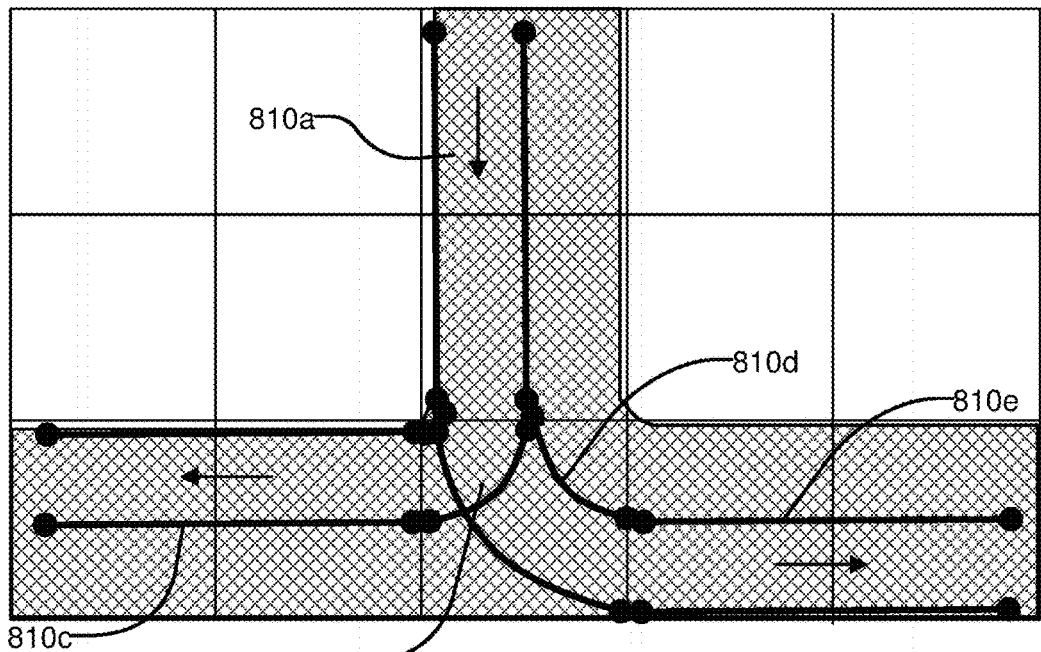
FIGS. 8A-8B illustrate embodiments of lane elements and relationships between lane elements in an HD map.
Figure 8B:
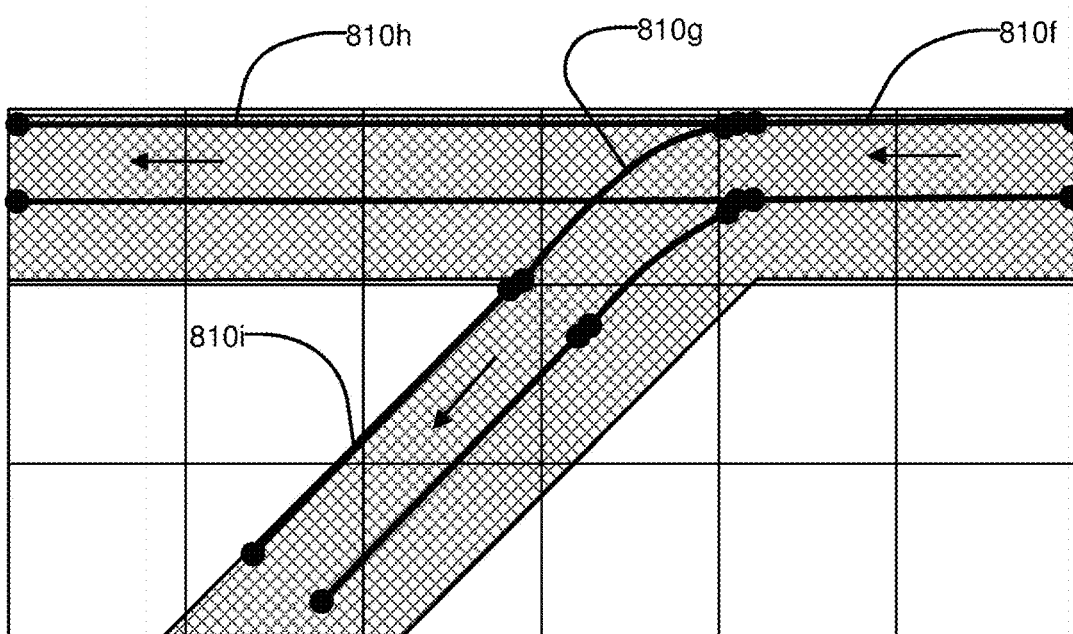

FIGS. 8A-8B illustrate example lane elements (e.g., LaneEl) and relations between lane elements in an HD map. FIG. 8A illustrates an example of a T-junction in a road illustrating a lane element 810a (e.g., an example of straight LaneEl) that may be connected to lane element 810c (e.g., another straight LaneEl) via a turn lane 810b (e.g., a curved LaneEl) and is connected to lane 810e (e.g., another straight LaneEl) via a turn lane 810d (e.g., another curved LaneEl). FIG. 8B illustrates an example of a Y-junction in a road with label 810f connected to lane 810h directly and connected to lane 810i via lane 810g. The HD map system 100 can be configured to determine a route from a source location to a destination location as a sequence of connected lane elements that can be traversed to reach from the source location to the destination location.

Change Detection System

There can be various types of circumstances that can change the actual stationary or moving objects on or near a road that may or may not impede a route being driven by a vehicle 150 configured and operated as described herein. While moving objects that may impede the route can be considered for determining operation and travel instructions to move the vehicle 150 so that it does not hit the moving object, stationary objects that may impede the route of vehicle 150 also may be avoided by making changes to the operation and travel instructions. Additionally, when the object is stationary and not on a HD map, there may be changes to implement into the HD map so that the object is represented in its location as a new object. That is, the prior HD map may not show an object in an object location. Accordingly, it can be beneficial to have systems and methods for updating an HD map to include a new object in a new object location.

For example, after a HD map is created and used by one or more vehicles 150, the physical world associated with an HD map may undergo at least one change that may modify a route and the corresponding driving behavior. Any changes to the physical world that may impact the route can be made to the corresponding HD map so that the vehicles 150 can navigate the route in response to the at least one change. In some aspects, the changes to the physical world can be identified by the vehicle 150 and processed so that changes to the HD map can be made. The analysis of changes to the physical world can be performed at least partially by the vehicle 150 so that any data related to a change in the physical world can be packaged for efficient delivery to the online HD map system 110. The vehicle 150 can process the data so that the raw sensor data is not sent directly to the online HD map system 110, and thereby the data transmission protocols are not overly burdened by significant raw sensor data. The processing of data regarding changes to the physical world can be implemented at least partially by the vehicle 150 to identify a change candidate, and then the data related to the change candidate can be efficiently uploaded to the online HD map system 110. Thus, the vehicle 150 can be configured to perform change candidate generation for candidates for changes to the HD map based on changes to the physical world.

The HD maps may be updated with changes to the physical world. For example, a vehicle 150 that is driving along a route can use sensors to sense the physical world in order to capture sensor data. The vehicle 150 can be configured to compare the sensor data with the HD map that includes the location that the vehicle 150 is traveling within. The comparison can determine whether there are changes to the surrounding environment of the route, which includes changes to objects on the actual route, changes to objects associated with the actual route, and changes to options for routes. For example, the vehicle computing system 120 can be configured to determine whether there are new buildings, structures, objects, or new route options (e.g., road openings or road closures) that are not included in the corresponding HD map. The online HD map system 110 can be configured to collect information from a first vehicle 150 to initially identify a map change candidate, and then to collect additional information from at least one additional vehicle 150 to confirm the presence of the map change candidate for the HD map. The online HD map system 110 can collect the map change candidate information from multiple vehicles 150 driving along a route to determine whether the map change candidate information is accurate or erroneously reported by a vehicle 150. The presence of the map change candidate information being similar or the same for a specific location or route can indicate the map change candidate is valid. Alternatively, when only one vehicle provides a specific map change candidate, the online HD map system 110 may not be able to validate the specific map change candidate and thereby mark the information as potentially erroneous and not update the HD map until the change candidate is verified by additional data. In some aspects, the online HD map system 110 can sample map change candidate information from a plurality of vehicles 150 until reaching a threshold number of vehicles 150 providing a substantially similar map change candidate before proceeding with a map change protocol to update the HD map with the change.

In some embodiments, a change detection system can be included at the vehicle computing system 120 or at the online HD map system 110. In some aspects, it can be beneficial for some or all of the components of the change detection system to be included at the vehicle 150 to take advantage of the computing power of the vehicle computing system 120. However, any raw data (e.g., from vehicle sensors 105) or processed data (e.g., from a module or API) may be transmitted to the online HD map system 110 for processing to identify changes that may be made to the HD maps. Accordingly, the description of the change detection system may be applied to the vehicle computing system 120 or applied to the online HD map system 110. In some aspects, it may be advantageous for the vehicle computing system 120 to process the raw sensor data and make map change determinations that can then be provided as information to the online HD map system 110 to update the maps in the HD map store 165.

Figure 16:
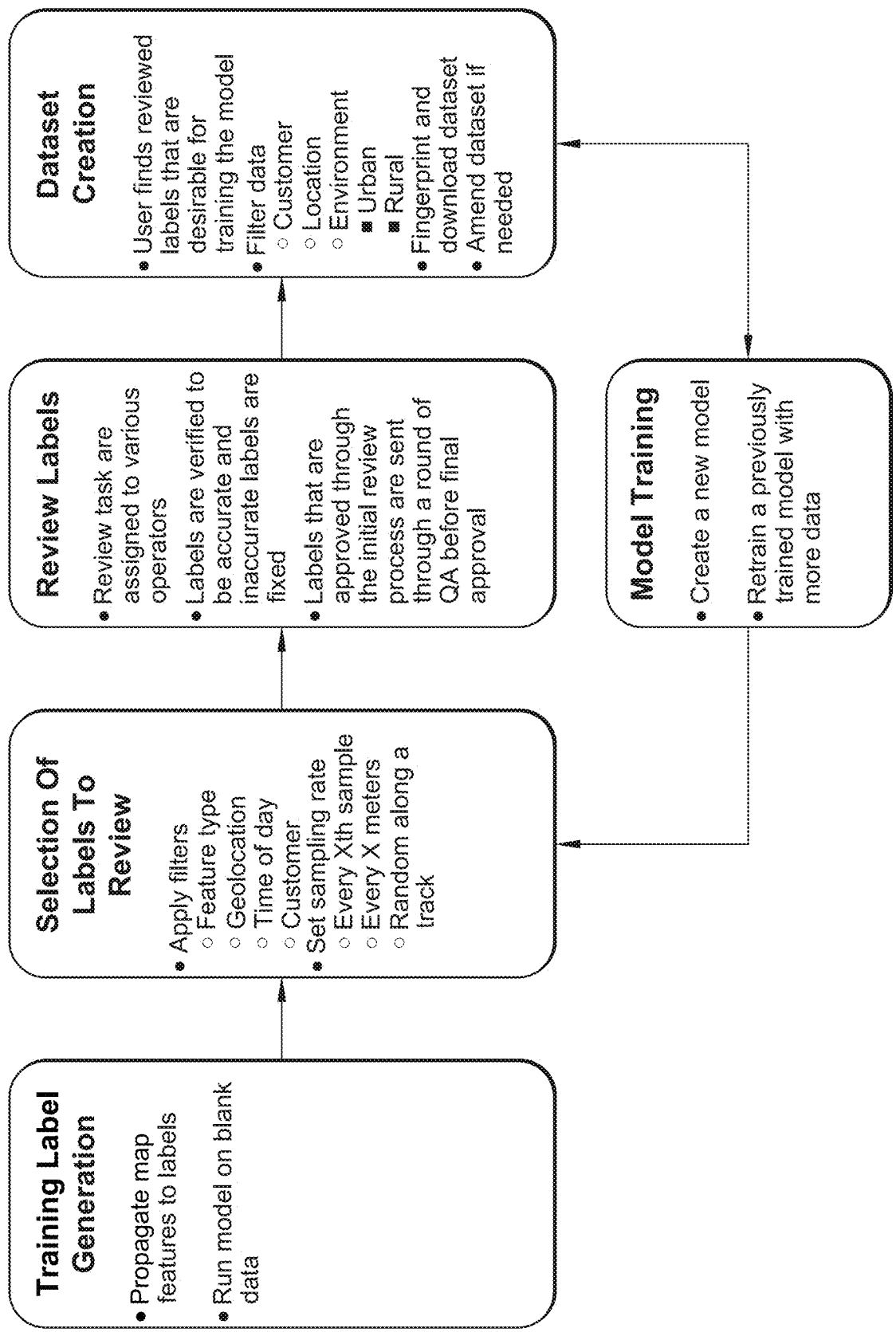
FIG. 16 illustrates a flowchart of an example method for training data generation.

FIG. 16 illustrates an example of a change detection system 1620 that can be implemented in order to identify changes for the HD map. Accordingly, the change detection system 1620 includes computing architecture for identifying discrepancies between objects in an HD map compared to the objects being sensed or not sensed at a defined location. The change detection system 1620 can facilitate performance of change detection protocols in the vehicle computing system 120, and determine whether or not a HD map may be updated to include a change for a new object at a new object location or absence of a known object in a known object location. The object location can be considered to be within a region of a lane element that is useful for indicating a lane closure or a lane opening when absent, such as on or between boundaries of a lane element.

The change detection system 1620 is shown to be configured to receive sensor data from a sensor module 1630, such as from a vehicle sensor 105 that is included in the vehicle 150. The sensor data can be provided to a perception module 1610, which may be configured as described for the perception module 210 whether or not modified by the descriptions of operations to provide relevant information to the change detection system 1620. As such, protocols described for the perception module 1610 may be performed by an embodiment of the perception module 210, and vice versa. The perception module 1610 can provide processed perception data as perception output to the perception integration module 1615. Additionally or alternatively, the sensor data can be provided to a $3^{rd}$ party perception module 1635, which can process the sensor data to obtain modified perception data as modified perception output that can be provided to the perception integration module 1615. The perception integration module 1635 performs analysis of the received data to determine whether there is a change to objects that are detected that may be identified for inclusion in an updated HD map. The change detection module 1660 can process the perception output data to determine a change candidate as a proposal that can be provided to the change management module 1625. The change management module 1625 can then process the change proposal to determine whether or not to create a final change candidate, which can be provided to the HD map update module 1650. The HD map update module 1650 can provide the final change candidate to the online HD map system 110 for consideration of whether or not to update a corresponding HD map to include the new object in the new object location. The HD map system interface 1680 may function as described for the HD map system interface 280 of the vehicle computing system 120.

In some embodiments, the perception module 1610 can be configured to receive sensor data from any vehicle sensor 105 of a vehicle, which can include any of the sensors described herein or later developed. For example, the perception module 1610 can be configured to receive LIDAR and camera image data for processing. The perception module 1610 can be configured to process the data such that the data (e.g., image data) is rectified before it is sent to the localization module 1645; however, the data can be rectified before being received into the perception module 1610. Also, the localization module 1645 can provide data regarding differences in object locations to the perception module 1610 and/or to the perception integration module 1615. The localization module 1645 can compare point cloud data from sensor data with point cloud data for the HD map at the location of the vehicle 150. Differences between the sensor point cloud data and the HD map point cloud data can be utilized by the change detection system 1620 to determine whether there has been a change at that location, such as a new object in a new object location or a known object being absent. The perception module 1610 can be configured to process the received data to determine sensor data (e.g., camera data or LIDAR data or point cloud difference data) that is to be processed and the frequency (e.g., process 1 out of every 3 frames) of analyzing the processed data.

In some embodiments, the perception module 1610 can be configured to collect and save perception output data for providing to the perception integration module 1615. The data received into the perception module 1610 that is not used for the perception output data can be deleted or otherwise not stored or omitted from consideration in a change detection protocol.

While the change detection system 1620 is described in connection to identifying new objects in new object locations, the functionality can also be used to identify objects that are absent from prior object locations (e.g., area of a lane element) that are no longer present. That is, the data can be analyzed to determine removal of an object when such a known object is no longer in a known object location of the lane element. The protocol for identifying removed objects can be used for creating change candidates for the HD map to remove objects that have become missing.

Additionally, the perception output from the perception integration module 1615 can be stored in the change detection system 1620 in a perception output storage 1655, which can be a data storage device. Also, the final change candidate from the change management module 1625 may be stored in an change candidate storage 1675, which can be the same or different from the perception output storage 1655, and which may be part of an existing data storage device in the vehicle computing system 120. In some aspects, the perception integration module 1615 can be configured to provide an interface for the internal perception module 1610 and/or external $3^{rd}$ party perception module 1635, which is consistent and flexible to account for data from both modules (1610, 1635). The perception integration module 1615 can provide the perception output result from the integration of data to the change detection module 1660. In addition, the perception integration module 1615 can be configured to save the perception output data in the perception output storage 1655, which allows for the perception output data to be recalled and used as needed or desired. The perception integration module 1615 can obtain any reported perception result in order to assist with map development and map updates as well as to compare the perception output with any external perception data.

In some embodiments, the perception integration module 1615 can be configured to provide a perception integration API that can be used to report the perception result data from the perception module 1610 or the $3^{rd}$ party perception module 1635. The perception integration module 1615 can also be configured to provide API for a query regarding one or more objects in a location (e.g., HD map location) that are detected using sensor data that has a timestamp that is closest to an input value (e.g., in a region of the HD map based on timestamp) The sensor data can have a timestamp that is older than in input value (e.g., query_timestamp_microseconds). The perception integration API can be configured to be used to build a query service of objects that are identified, which can be used for a viewer to visualize detection results of known objects in known object locations, new objects in new object locations, or lack of objects in known object locations in the route in real time.

The change detection system 1620 can also include a localization module 1645 that can provide location data for a new object in the new object location. The localization module 1645 may receive sensor data from the vehicle sensors 105 or receive processed sensor data. The localization module 1645 can provide location data to perception module 1610, such that the perception output can be characterized by location data. The localization module 1645 can also provide the location data to the change detection module 1660 to help facilitate determination of a change candidate.

The change detection system 1620 may also include a feature module 1640 that can provide a landmark map (Lmap) to the change detection module 1660. The change detection module 1660 can use the Lmap for comparison with the new object in the new object location identified in the perception output. In some embodiments, the change detection module 1660 is configured to receive: perception output from the perception integration module 1615, a point cloud difference and localization status from the localization module 1645; a sensor data feed from the vehicle sensors 105 or from the perception module 1610 that has processed the sensor data; and/or a landmark map from the feature module 1640. The data received into the change detection module 1660 can be processed in order to generate or otherwise identify one or more change candidates.

In some embodiments, the change detection module 1660 is configured to produce a change candidate proposal based on perception output that is reported by the perception integration module 1615. Once a perception output is received, the change detection module 1660 is configured to filter out any invalid object change detection result (e.g., new object or missing known object) using 3D information. The change detection module 1660 can be configured to perform a live scan of the perception output that is accumulated over a short period of time (e.g., less than a second, such as milliseconds), and identify any object change detection that is erroneous or that cannot be verified (e.g., from multiple images or other data). Also, the change detection module 1660 can be configured to perform an analysis of any point cloud difference that is identified by the localization module 1645, such as by a point cloud difference analysis service (e.g., performs checking of point cloud data for a location to identify matching point cloud data or point cloud data that is different for the location). As used herein, the term "point cloud" refers to either accumulated live scans of data or a point cloud difference. For example, when there is a perception output for a detected object that is not a known object in a known object location, the change detection module 1660 is configured to project a point cloud onto a corresponding camera image to identify the points (e.g., called object points) of the point cloud that are projected onto the detected object in the camera image. The change detection module 1660 can be configured to remove any ground points from object points, and then perform clustering on the object points. In some instances, the change detection module 1660 can be configured to identify the largest cluster of object points in order to compute the 3D location and bounding box of this detected object. In some aspects, any object that has no object points or too few object points is dropped. In some aspects, some heuristic protocols are used to analyze the data to further filter any remaining objects in the perception output. For example, traffic cones cannot float above ground, and any traffic cones identified to float are removed. The presence of certain objects (e.g., traffic cones) in defined locations (e.g., intersection or crossing a lane) can provide an indication that a known lane is closed, which can then initiate a protocol for labeling the lane as closed. The protocols for a lane becoming closed or becoming opened use the change detection system and protocols for change detection, and which are described in more detail below In some embodiments, the perception output may have data that omits an object (e.g., traffic cone) in a known traffic cone location. Correspondingly, a known object in a known object location (e.g., specific location or along a general defined region of a lane element) can be matched with perception output that omits the known object. An omitted object that was previously present can then be used in generation of a change candidate that proposes that the known object is no longer present. The absence of certain known objects (e.g., traffic cones) in defined locations (e.g., intersection or crossing a lane) can provide an indication that a known closed lane is now reopened, which can then initiate a protocol for labeling the lane as opened.

In some embodiments, the change detection module 1660 can be configured with various interfaces for different functions. Accordingly, the change detection module 1660 can include a localizer functionality interface that is configured to obtain information from the localization module 1645 regarding status and functionality, and to determine whether or not the localization module 1645 is functioning and capable of performing localization tasks. In some aspects, the change detection module 1660 can include an sensor data interface that is configured to obtain sensor data from the perception module 1610 or directly from the vehicle sensors 150 or other sensor data module that processes and provides relevant sensor data. The sensor data interface can allow for the change detection module 1660 to correlate a change candidate with a relevant portion of the sensor data that resulted in the determination of the change candidate. In some aspects, the change detection module 1660 can include a localizer module interface that is configured to receive point cloud difference data into the change detection module 1660 from the localization module 1645. The localizer module interface can provide any suitable data to the change detection module 1660 to be used to determine a change candidate or to provide additional information for the basis of the change candidate. Also, the localizer interface can be used so that the change detection module 1660 can compute a 3D position of detected objects, such as known or new objects, or query a 3D position where a known object is no longer present. As such, the localizer interface allows for the change detection module 1660 to use a detected object in a 2D image coordinate to be identified in a 3D position coordinate. In some aspects, the change detection module 1660 can use a perception integration interface that interfaces with the perception integration module 1615 so as to allow receipt of the perception output data.

The change management module 1625 can be configured to receive at least one change candidate (e.g., change candidate proposal) from the change detection module 1660, where at least one change candidate is analyzed to determine a final change candidate due to a detected change of an object. In some aspects, the change management module 1625 can aggregate any change candidates or deduplicate any change candidates that are proposed by the change detection module 1660. The change management module 1625 may receive multiple change candidates as proposals for updating the HD map for a single change based on the analyzed data. For example, the change detection module 1660 can be configured to provide a new or changed object to the HD map for every camera frame or other data that observes the new or changed object. The new or changed objects may not be identified to exist in the exact same location due to localization error and noises. In response, the change management module 1625 can be configured to consolidate the change candidates to identify unique change candidates that could be useful for updating the map. Additionally, the change management module 1625 can be configured to store any final change candidates into the change candidate storage 1675 or other data storage in the vehicle computing system 120. After a change candidate is identified by the change management module 1625, the change candidate can be stored to help with troubleshooting, if needed.

The change detection system 1620 includes the HD map update module 1650 that can collect final change candidates from the change management module 1625, whether provided automatically or provided after a query by the HD map update module 1650. When queried by the HD map update module 1640, the change management module 1625 will provide the requested one or more final change candidates. Alternatively, the HD map update module 1650 can transmit a query to the change management module 1625 to fetch the change candidates, such as those detected recently or within a defined timeframe or defined lane element. The change management module 1625 can also query for change candidates stored on the change candidate storage 1675 or other data storage device.

In some embodiments, the change management module 1625 can be configured to force the data of a change candidate to be visible to a file system after being stored. This can be performed by invoking an operation (e.g., fflush), but if the operation is performed too frequently there may be a negative performance impact. In some instances to overcome any negative performance impact, a query from the HD map update module 1650 can be served by combined data from memory and/or the change candidate storage 1675.

The HD map update module 1650 includes an interface used by change management module 1625 to report detected change candidate proposals. Due to differences in time for processing data, such as image data compared to LIDAR data, the change candidate proposals may not be reported in a chronological order. For instance, a change detected using camera image captured at time T+1 may be reported earlier than a change detected using LIDAR data captured at time T because LIDAR based perception may take a longer time than image-based perception.

In some embodiments, the change detection system 1620 can be configured to process the raw sensor data to obtain change candidate data, which is significantly smaller in data size. The smaller data of the change candidate can be obtained by the vehicle 150 so that smaller data packets can be transmitted to the online HD map system 110, which can reduce bandwidth usage. Accordingly, the change detection system 1620 can be configured to processes the raw sensor data to generate the change candidate that can be transmitted to the online HD map system 110 for use in determining whether or not a corresponding HD map is to be updated with new object in the new object location (e.g., marking lane element as closed) or removing a known object that is now absent (e.g., marking lane element as opened).

In some embodiments, the perception module 1610 is configured to receive sensor data from a sensor data module captured by vehicle sensors 105 of the vehicle 150 and to analyze the sensor data to extract information from the sensor data relevant to a new object in a new object location or known object that is absent. For example, the perception module 110 can be configured to process the sensor data by recognizing various objects in a location of a lane element based on the sensor data, such as recognizing buildings, other vehicles in the traffic, traffic signs, etc. In some aspects, the vehicle 150 may include the $3^{rd}$ party perception module 1635 that includes object data for various objects in the location. The perception integration module 1615 can be configured to combines results of the perception module 1610 and any relevant data from the $3^{rd}$ party perception module 1635 in order to determine whether objects that are perceived by the vehicle sensors 105 and optionally by the $3^{rd}$ party perception module 1635 represent the same object or different objects as well as whether the objects are known objects in known object locations or new objects in new object locations. The perception integration module 1615 can be configured to generate perception output data that can be stored in a storage device (e.g., perception output storage 1655). Additionally, the perception integration module 1615 can be configured to provide the perception output data to the change detection module 1660. The change detection module 1660 also receives map data (e.g., Lmap and Omap data) as input and receives localization data for the vehicle 150 and map from the localization module 1645 as input. The change detection module 1660 detects changes in objects identified in the sensor data compared to the HD map data in order to identify proposed modifications (e.g., change candidate) to the HD map. For example, the change detection module may be configured to identify a traffic cone in a lane that is present as opened in the HD map and may be configured to determine that there is a lane closure to be identified and labeled in the HD map as a modification to the HD map. Alternatively, the change detection module 1660 may identify a new traffic sign on the route that is not present in the HD map or may determine that a traffic sign indicated in the HD map is no longer present on the route. In response, the change detection module 1660 provides a proposal of a change candidate to modify the HD map to the change management module 1625 that can be configured to perform further analysis on the change candidate and the corresponding HD map to determine the next actions to be taken, such as sending the change candidate or required information to the online HD map system 110.

In some embodiments, the change detection module 1625 can be configured to use an occurrence of a localization failure to trigger a detection of a possible change to identify a change candidate. In some instances, the localization failure may be an indication that the HD map is outdated and the actual objects in the route or region around the route has changed, thereby causing a localization failure as a result of mismatch in the sensor data and the HD map. There can be many reasons that lead to localization failure, where some examples include: sensor malfunction (e.g., LIDAR produces no data); a challenging scenario beyond localization algorithm capability (e.g., vehicle is surrounded by larger vehicles such that the sensor views are blocked by the larger vehicles); the OMap is out-of-date and should be updated (e.g., a large building/wall originally in the map is now demolished, or a new building is built, etc.). In some aspects, a localization failure can result in: no other change detection tasks can be performed because without a suitably accurate vehicle pose, the change detection system 1620 cannot compare a determined perception result with LMap to produce change candidates; or the OMap may need to be updated. In some aspects, the following information is stored by the change detection system (e.g., in the change candidate storage 1675): the last number (e.g., N) of successful localization results; a localization failure; vehicle positions reported by GPS in the last defined time period (e.g., M seconds); and/or a few camera images taken before and/or during a localization failure. The information may be presented to operators performing system testing to confirm whether the localization failure is due to an obsolete OMap, and hence a map update needs to be scheduled in that region of the localization failure.

Landmark Map Update

As described previously, the map update module 420 updates existing landmark maps to improve the accuracy of the landmark maps, and to thereby improve passenger and pedestrian safety. This is because the physical environment is subject to change, and measurements of the physical environment may contain errors. For example, landmarks such as traffic safety signs may change over time, including being moved or removed, being replaced with new, different signs, being damaged, etc. While vehicles 150 are in motion, they can continuously collect data about their surroundings via their sensors that may include landmarks in the environment. This sensor data, in addition to vehicle operation data, data about the vehicle's trip, etc. is collected and stored locally. When new data is available from the various vehicles 150 within a fleet, this is passed to the online HD map system 110 (e.g., in the cloud) for updating the landmark map, and the updated map is stored in the cloud. As new versions of the map become available, these or portions of them are pushed to the vehicles in the fleet for use while driving around. The vehicles 150 verify the local copies of the landmark maps, and the online HD map system 110 updates the landmark maps based on the verification results.

In some implementations, the vehicles 150 analyze the verification results, determine whether the existing landmark maps should be updated based on the verification results, and send information to the online HD map system 100 for use to update the existing landmark maps. The online HD map system 110 uses the information to update the existing landmark maps stored there. In some implementations, the vehicles 150 send summaries of the verification results to the online HD map system 110, the online HD map system 110 analyzes the summaries of the verification results to determine whether the existing landmark maps should be updated, requests information needed to update the existing landmark maps from the vehicles 150, and updates the existing landmark maps using the requested information.

Figure 9:
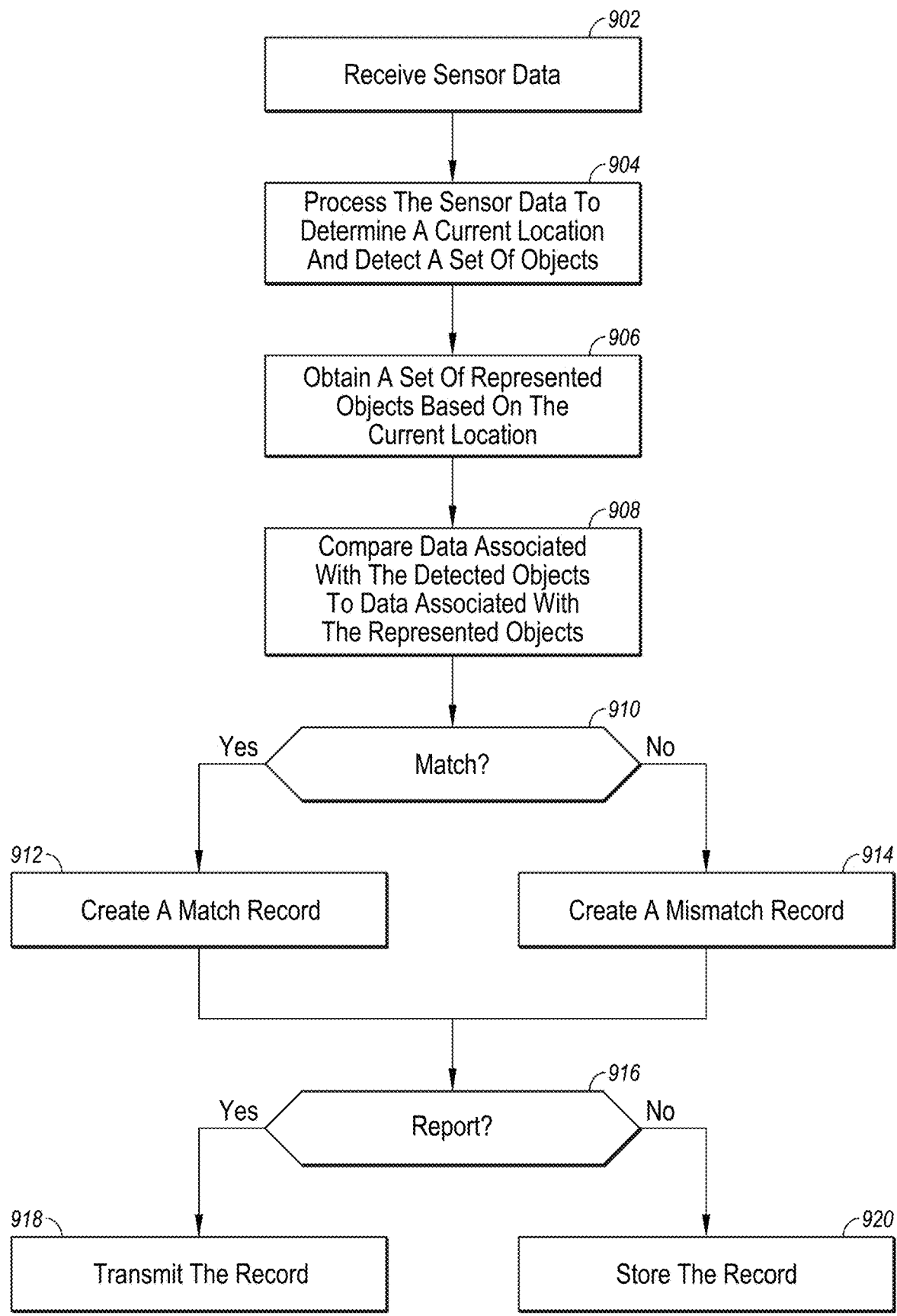
FIG. 9 is a flow chart illustrating an embodiment of a process of a vehicle verifying existing landmark maps.

FIG. 9 is a flow chart illustrating an example process of a vehicle 150 verifying existing landmark maps. The vehicle 150 receives 902 sensor data from the vehicle sensors 105 concurrently with the vehicle 150 traversing along a route. As described previously, the sensor data includes, among others, image data, location data, vehicle motion data, and LIDAR scanner data.

The vehicle 150 processes 904 the sensor data to determine a current location of the vehicle 150, and detects a set of objects (e.g., landmarks) from the sensor data. For example, the current location may be determined from the GPS location data. The set of objects may be detected from the image data and the LIDAR scanner data. In various embodiments, the vehicle 150 detects the objects in a predetermined region surrounding the vehicle's current location. For each determined object, the vehicle 150 may also determine information associated with the object such as a distance of the object away from the current location, a location of the object, a geometric shape of the object, and the like. The vehicle 150 (e.g., the perception module 210 or 1610 on the vehicle that was described above) applies various signal processing techniques to analyze the sensor data.

The vehicle 150 obtains 906 a set of represented objects (e.g., landmarks represented on the LMap) based on the current location of the vehicle 150. For example, the vehicle 150 queries its current location in the HD map data stored in the local HD map store 275 on the vehicle to find the set of represented objects located within a predetermined region surrounding the vehicle's 150 current location. The HD map data stored in the on-vehicle or local HD map store 275 corresponds to a geographic region and includes landmark map data with representations of landmark objects in the geographic region. The representations of landmark objects include locations such as latitude and longitude coordinates of the represented landmark objects. The HD map data stored in the local HD map store 275 is generally a copy of a particular version of the existing map information (or a portion of the existing map information) that is stored in the HD map store 165. By querying its current location from local HD map data, the vehicle 150 identifies objects present in its environment, which are also represented in landmark maps stored at the online system (e.g., in the cloud within the HD map store 165).

The vehicle 150 compares 908 data associated with the objects detected by the vehicles to data associated with the objects on the maps to determine any discrepancies between the vehicle's 150 perception of its environment (i.e., the physical environment corresponding to the predetermined region) and the representation of the environment that is stored in the HD map store 165. The vehicle 150 may compare location data and geometric shape data of the detected objects to location data and geometric shape data of the represented objects. For example, the vehicle 150 compares the latitude and longitude coordinates of detected traffic signs to latitudes and longitudes of traffic signs on the map to determine any matches. For each matched latitude and longitude coordinates, the vehicle 150 compares the geometric shape of the detected object (e.g., a hexagonal stop sign) to the geometric shape of the object on the map. Alternatively, the shapes can be matched without first matching coordinates. And then, for each matched geometric shape, the vehicle 150 compares the latitude and longitude coordinates between the objects.

The vehicle 150 determines 910 if there are any matches between the objects it detected and those on the map based on the comparison. The vehicle 150 determines that there is a match if the location data and the geometric shape data of a detected object matches the location data and the geometric shape data of a represented object, respectively. As described herein, a match refers to a difference between data being within a predetermined threshold.

The vehicle 150 creates 912 a match record. A match record is a type of a landmark map verification record. A match record corresponds to a particular represented object in the landmark map stored in the local HD map store 275 that is determined to match an object detected by the vehicle 150, which can be referred to as "a verified represented object." The match record includes the current location of the vehicle 150 and a current timestamp. The match record may also include information about the verified represented object, such as an object ID identifying the verified represented object that is used in the existing landmark map stored in the HD map system HD map store 165. The object ID may be obtained from the local HD map store 275. The match record may further include other information about the vehicle 150 (e.g., a particular make and model, vehicle ID, a current direction (e.g. relative to north), a current speed, a current motion, etc.) A match record may also include the version (e.g., a version ID) of the HD map that is stored in the local HD map store 275.

In some embodiments, the vehicle 150 creates match records only for verified represented objects of which the associated confidence value is below a predetermined threshold value. The associated confidence value can be obtained from the local HD map store 275.

In some embodiments, the vehicle 150 further verifies operations of the objects. For example, some objects display information or transmit wireless signals including the information to vehicles 150 according to various communication protocols. For example, certain traffic lights or traffic signs have communication capabilities, and can transmit data. The data transmitted by this type of traffic light affects the vehicle's 150 determination of the sequence of actions to take (e.g., stop, slow down, or go). The vehicle 150 can compare the traffic light or traffic sign with a live traffic signal feed from the V2X system to determine if there is a match. If there is not a match with the live traffic signal feed, then the vehicle 150 may adjust how it responds to this landmark. In some cases, the information sent from the object (e.g., traffic light, traffic sign) may be dynamically controlled, for example, based on various factors such as traffic condition, road condition, or weather condition. For example, the vehicle 150 processes the image data of the traffic sign to detect what is displayed on it, and processes the wireless signals from the sign to obtain wirelessly-communicated information from the sign, and compares these, and responds based on whether there is a match. If the displayed information does not match the wirelessly-communicated information, the vehicle 150 determines that the verification failed and disregards the information when determining what actions to take.

In some embodiments, if the operation verification fails for the first time, the vehicle 150 may repeat the verification process by obtaining an updated wireless signal and making another comparison. The vehicle 150 may repeat the verification process for a predetermined number of times or for a predetermined time interval before determining that the verification failed. The vehicle 150 associates the operation verification result with the match record created for the object.

The vehicle 150 may classify a verified represented object into a particular landmark object type (e.g., a traffic light with wireless communication capability, a traffic sign with wireless communication capability) to determine whether to verify operations of the verified represented object. This is because not all landmark objects' operations need to be verified. To make the classification, the vehicle 150 may determine whether any wireless signal is received from a particular represented object or obtain the classification from the HD map data stored in the local HD map store 275. Moreover, the vehicle 150 may also apply machine learning algorithms to make the classification. Alternatively, the vehicle 150 may provide the object and associated data (e.g., location data, geometric shape data, image data, etc.) to the online HD map system 110 or a third-party service for classification.

The vehicle 150 may further determine whether the operation verification failure is caused by various types of errors (e.g., sensor errors, measurement errors, analysis errors, classification errors, communication errors, transmission errors, reception errors, and the like.) That is, the vehicle 150 performs error control (i.e., error detection and correction). The errors may cause misperception of the environment surrounding the vehicle 150 such as a misclassification of an object or a misidentification of the displayed information. The errors may also cause miscommunication between the vehicle 150 and another device such as the verified represented object. If the vehicle 150 removes the detected errors, the vehicle 150 may re-verify the operation of the verified represented object (e.g., using recovered original information and/or using recovered displayed information) or determine that the operation verification is unnecessary (e.g., the object is of a particular type that does not transmit wireless signals). If the vehicle 150 does not remove the detected errors, the vehicle 150 includes an indication to indicate that the failure may be caused by errors in the operation verification result. The vehicle 150 may also include detected errors and/or error types in the operation verification result.

In some embodiments, the vehicle 150 may further determine a likelihood of the operation verification failure being caused by errors and include the likelihood in the operation verification result. The vehicle 150 may remove the operation verification failure result if the likelihood is above a threshold likelihood.

The vehicle 150 determines that there is a mismatch if the location data and the geometric shape data of an object detected by the vehicle (or an object on the map) does not match the location data and geometric shape data of any object on the map (or any object detected by the vehicle.) The vehicle 150 creates 914 a mismatch record. A mismatch record is another type of a landmark map verification record. A mismatch record can be of two types. A first type of a mismatch record corresponds to a particular detected object that is determined not to match any object represented in the landmark map stored in the local HD map store 275 (hereinafter referred to as "an unverified detected object"). A second type of a mismatch record corresponds to a particular represented object in the landmark map stored in the local HD map store 275 that is determined not to match any detected object (referred to as "an unverified represented object"). A mismatch record includes a mismatch record type, the current location (e.g., latitude and longitude coordinates) of the vehicle 150, and a current timestamp. A mismatch record is associated with raw sensor data (e.g., raw sensor data related to the unverified detected object or its location). The second type of mismatch record includes information about the unverified represented object such as an object ID identifying the unverified represented object that is used in the existing landmark map stored in the HD map system HD map store 165. The object ID may be obtained from the local HD map store 275. A mismatch record may further include other information about the vehicle (e.g., a particular make and model, vehicle ID, a current direction (e.g. relative to north), a current speed, a current motion, etc.) A mismatch record may also include the version (e.g., a version ID) of the HD map that is stored in the local HD map store 275. This can be especially useful for lane closure objects relevant for a lane closure or a lane opening.

The vehicle 150 may further determine whether the mismatch is caused by various types of errors (e.g., sensor errors, measurement errors, analysis errors, classification errors, communication errors, transmission errors, reception errors, and the like.) That is, the vehicle 150 performs error control (i.e., error detection and correction). The errors may cause misperception of the environment surrounding the vehicle 150 such as a misdetection of an object, a misdetermination of a location and/or geometric shape of an object, and the like. The errors may also cause the version of the HD map stored in the local HD map store 275 not to match the same version of the HD map that is stored in the HD map store 165. If the vehicle 150 removes the detected errors, the vehicle 150 may re-verify an unverified detected object or an unverified represented object. If the vehicle 150 does not remove the detected errors, the vehicle 150 indicates that the failure may be caused by errors in the mismatch record. The vehicle 150 may also include detected errors and/or error types in the operation verification result.

In some embodiments, the vehicle 150 may further determine a likelihood of the mismatch being caused by errors and include the likelihood in the mismatch record. The vehicle 150 may remove the mismatch record if the likelihood is above a threshold likelihood.

In some embodiments, the vehicle 150 creates mismatch records only for unverified represented objects of which the associated confidence value is below a predetermined threshold value. The associated confidence value can be obtained from the local HD map store 275.

For each created landmark map verification record, the vehicle 150 determines 916 whether to report the record. The vehicle 150 may report landmark map verification records periodically. For example, the vehicle 150 reports verification records every predetermined time interval. As another example, the vehicle 150 reports verification records when the number of total verification records reaches a threshold. The vehicle 150 may report a verification when the verification record is created. The vehicle 150 may also report verification records in response to requests for verification records received from the online HD map system 110. The online HD map system 100 may periodically send requests for verification records to vehicles 150, for example, vehicles 150 that are located in a particular geographic region. The online HD map system 100 may send requests for verification records to vehicles 150 based on summaries received from the vehicles 150. For example, the online HD map system 100 analyzes one or more summaries received from one or more vehicles to identify one or more verification records and sends a request for the identified verification records to corresponding vehicle(s) that create the identified verification records. The one or more vehicles may be located in a particular geographic region. A summary of verification records may include statistical information such as a number of times that a represented object is verified, a number of times that a represented object is not verified, a number of times of a detected object at a particular location is not verified, and the like. A vehicle 150 may create a summary of unreported verification records periodically or in response to an online HD map system's 110 request.

In some embodiments, after creating a match record (912) or creating a mismatch record (914) a report 916 identifying the same can be generated.

The vehicle 150 transmits 918 one or more verification records that are determined to be reported to the online HD map system 110. The vehicle 150 may send raw sensor data used when creating a mismatch record along with the mismatch record to the online HD map system 110. The vehicle 150 removes a verification record after transmitting the verification record to the online HD map system 110. Alternatively, the vehicle 150 may store the verification record locally for a predetermined time period.

The vehicle 150 stores 920 unreported verification records if it determines not to report those verification records. In some embodiments, the vehicle 150 removes the unreported verification records after a predetermined time period.

Figure 10:
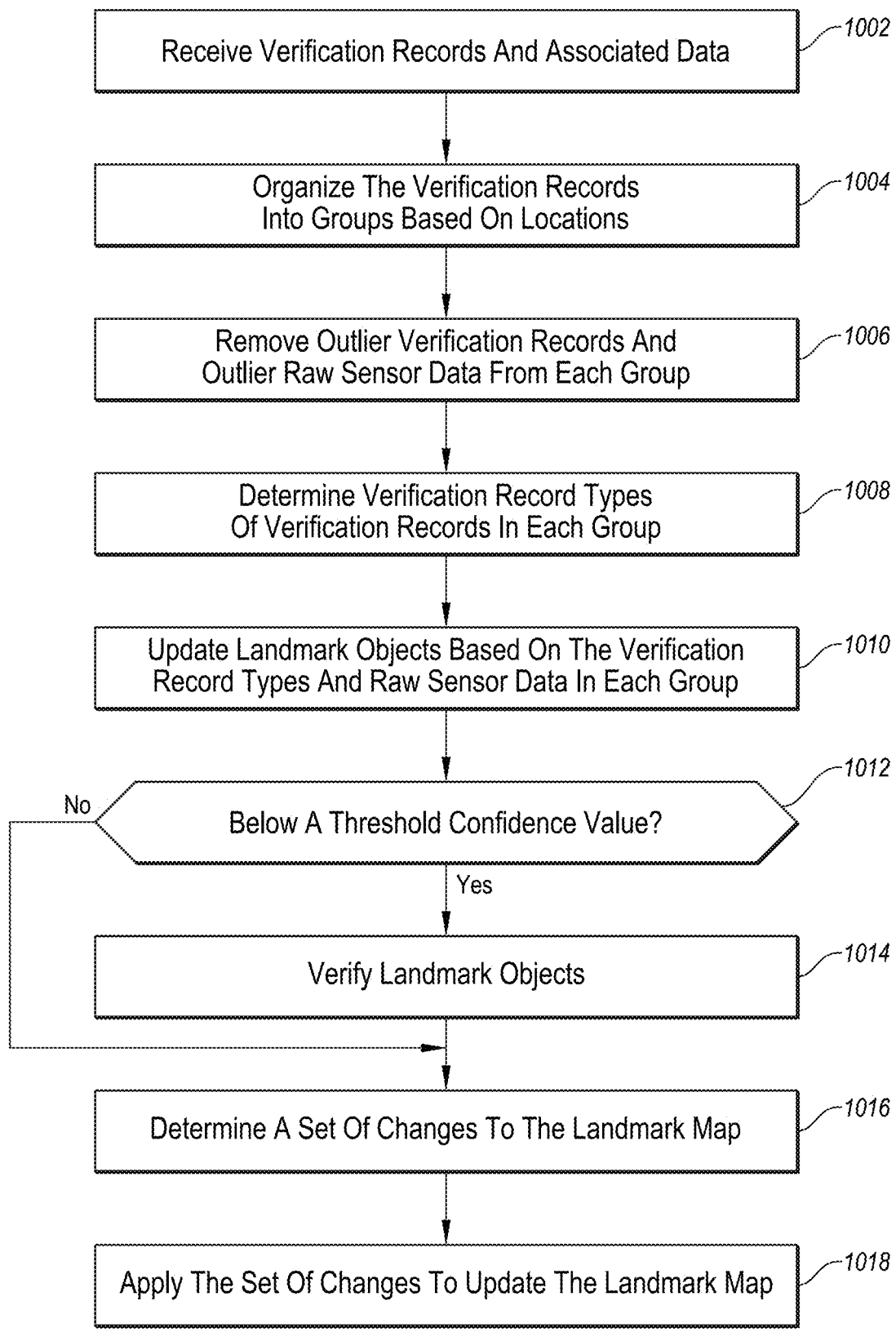
FIG. 10 is a flow chart illustrating an embodiment of a process of an online HD map system updating existing landmark maps.

FIG. 10 is a flow chart illustrating an example process of an online HD map system 110 (e.g., the map update module 420) updating existing landmark maps. The online HD map system 110 receives 1002 verification records and associated data (e.g., raw sensor data) from vehicles 150. As described previously with respect to FIG. 9, the online HD map system 110 may receive verification records from the vehicles 150 continuously over time. At a particular time point, the online HD map system 110 may receive verification records from some but not all vehicles 150, including from vehicles that may be distributed across different geographic regions that correspond to different regions of the HD map 510.

In some embodiments, the online HD map system 110 collects the verification records over a time interval and then processes the verification records to update the HD map 510. The time interval may be predetermined or adjusted based on the number of verification records received at each time point.

The online HD map system 110 organizes 1004 the verification records into groups based on locations (e.g., latitude and longitude coordinates). The locations can be determined from a current location of the vehicle included in each verification record. Each group corresponds to a geographic area and includes verification records for a location within the geographic area. The geographic area may be predetermined or dynamically determined based on the verification records received. For example, the online HD map system 110 determines geographic areas such that each group includes substantially the same number of verification records.

The online HD map system 110 removes 1006 outlier verification records and outlier raw sensor data. An outlier verification record is a verification record for which the verification result is inconsistent with other verification records for a particular location. For example, for a particular location, if 12 verification records are mismatch records and 1877 verification records are match records, the mismatch records are outlier verification records. If one copy of raw sensor data for a particular location is distant from other copies of raw sensor data for the same location, then this particular copy is an outlier. The online HD map system 110 removes any identified outlier verification records as well as any identified outlier raw sensor data. For a particular group verification records, the online HD map system 110 identifies outlier verification records and/or outlier raw sensor data, if any. The online HD map system 110 may apply data outlier detection techniques such as density-based techniques, subspace-based outlier detection, replicator neural networks, cluster analysis-based outlier detection, and the like to identify outlier verification records and outlier raw sensor data. Outlier verification records and outlier sensor data are likely to be caused by errors. By removing both of these, the online HD map system 110 improves the reliability as well as the accuracy of the HD maps.

For each group, the online HD map system 110 determines 1008 verification record types of verification records included in the group. A verification record can be a match record, a mismatch record of a first type, or a mismatch record of a second type.

For each group, the online HD map system 110 updates 1010 landmark objects based on the verification record types and raw sensor data in the group. For example, the online HD map system 110 increases the confidence value associated with each landmark object that corresponds to one or more match records. The online HD map system 110 decreases the confidence value associated with each landmark object that corresponds to one or more mismatch records of the second type. The amount of confidence value adjustment can be determined based on various factors such as the original confidence value associated with a landmark object, a location of the landmark object, a geographic region (e.g., an urban area, a suburban area, etc.) where the landmark object is located, the number of match records or mismatch records to which the landmark object corresponds, and the like. For one or more mismatch records of the first type that correspond to an unverified detected object at a particular location, the online HD map system 110 analyzes the raw sensor data associated with the mismatch records to detect the landmark object that is not represented in the landmark map 520. The HD map system 110 may further classify the detected landmark object. The online HD map system 110 determines a confidence value for the detected object using the associated raw sensor data.

For each landmark object, the HD map system 110 determines 1012 whether the confidence value associated with the landmark object is below a threshold confidence value. The HD map system 110 uses different threshold confidence values for different landmark objects. The HD map system 110 determines a particular threshold confidence value based on various factors such as the amount of confidence value adjustment, the location of the landmark object, the type of the landmark object (e.g., traffic signs, road signs, etc.), the geographic region (e.g., an urban area, a suburban area, etc.) where the landmark object is located, threshold values that different vehicles 150 use for determining sequences of actions, and the like. For example, a threshold confidence value for a traffic control landmark object is typically higher than a threshold confidence value for a road sign landmark object, because misrepresentation of traffic control landmark objects is more likely to cause accidents than misrepresentation of road sign landmark objects.

If the confidence value is below the threshold confidence value, the HD map system 110 verifies the corresponding landmark object. The verification can be performed in several ways. The HD map system 110 may analyze raw sensor data collected related to the particular landmark object and the landmark object as represented in the HD map 110 to verify whether the landmark object as presented in the HD map 110 is accurate or should be updated. The HD map system 110 may also notify a human reviewer for verification. The human operator can provide to the HD map system 110 with instructions on whether the landmark object as represented in the HD map 110 should be updated or is accurate. The human operator can provide specific changes that should be made to the HD map 510. The HD map system 110 may also interact with a human reviewer to verify the landmark object. For example, the HD map system 110 may notify the human reviewer to verify information that the HD map system 110 determines as likely to be inaccurate such as raw sensor data, analyses of the raw sensor data, one or more attributes of the physical object, one or more attributes of the landmark object as represented in the HD map. Based on the human reviewer's input, the HD map system 110 completes verifying whether the landmark object as represented in the HD map 510 should be updated or is accurate. After the HD map system 110 completes the verification, the HD map system 110 determines 1016 a set of changes to the HD map 510 (e.g., the landmark map 520).

The HD map system 110 determines 1016 a set of changes to the HD map 510, if the confidence value is above the threshold value. The HD map system 110 determines whether changes should be made to the landmark map 520. For example, the HD map system 110 determines whether one or more attributes (e.g., a location, a geometric shape, a semantic information) of an existing landmark object needs to be changed, whether an existing landmark object should be removed, and whether a new landmark object should be added and associated attributes. The HD map system 110 creates a change record for a particular landmark object that should be modified, added, or removed. The HD map system 110 associates the change record with a timestamp, change specifics (e.g., an attribute change, removal, addition), a change source (e.g., whether the change is requested by a human viewer, a human reviewer ID, whether the change is determined by an algorithm, the algorithm ID, etc.), input provided by a human reviewer, a data source (e.g., a vehicle 150 that provides the verification records, a vehicle that provides the raw sensor data, sensors associated with the raw sensor data), and the like.

The HD map system 110 applies the set of changes to the HD map 510 to update the map. For example, the HD map system 100 modifies an existing landmark object, adds a new landmark object, or removes an existing landmark object according to the set of changes. The HD map system 1100 may monitor the consistency of the landmark map 510 when applying the changes. That is, the HD map system 1100 determines whether a change triggers other changes because some landmark objects are interdependent. For instance, when adding a left-turn sign, the HD map system 1100 creates a lane element (e.g., LaneEl) to connect with the LaneEl of the left-turn target. Conversely, such a LaneEl might be removed when the corresponding left-turn sign is removed or a sign prohibiting left-turn is detected. The consistency maintenance may be performed on a per-change basis or on a per-region basis. When performing on the per-region basis, the HD map system 110 waits until all individual landmark object changes within a region are complete. Based on the locations of the changes, the HD map system 110 determines the maximum impact region of affected landmark objects (since LaneEl has a max length) and updates all landmark objects within this impact region (potentially add/remove LaneEl as needed). Additionally, this process can be especially suitable for updating a map to show a lane that has changed to being closed or changed to being opened based on the presence or absence of lane closure objects.

Occupancy Map Update

As described previously, the map update module 420 updates existing occupancy maps to improve the accuracy of the occupancy maps thereby improving passenger and pedestrian safety. This is because the physical environment is subject to change and measurements of the physical environments may contain errors. In various embodiments, the online HD map system 110 verifies the existing occupancy maps and updates the existing occupancy maps. If an object (e.g., a tree, a wall, a barrier, a road surface) moves, appears, or disappears, then the occupancy map is updated to reflect the changes. For example, if a hole appears in a road, a hole has been filled, a tree is cut down, a tree grows beyond a reasonable tolerance, etc., then the occupancy map is updated. If an object's appearance changes, then the occupancy map is updated to reflect the changes. For example, if a road surface's reflectance and/or color changes under different lighting conditions, then the occupancy map is updated to reflect the changes.

As further described below, the online HD map system 110 distributes copies of the existing occupancy maps or a portion thereof to vehicles 150 and the vehicles 150 verify the local copies of the existing occupancy maps or the portion thereof. The online HD map system 110 updates the occupancy maps based on the verification results. In some implementations, the vehicles 150 analyze the verification results, determine whether the existing occupancy maps should be updated based on the verification results, and send information to the online HD map system 110 for use to update the existing occupancy maps. The online HD map system 110 uses the received information to update the existing landmark maps. In some implementations, the vehicles 150 send summaries of the verification results to the online HD map system 110, the online HD map system 110 analyzes the summaries of the verification results to determine whether the existing occupancy maps should be updated, requests information needed to update the existing occupancy maps from the vehicles 150, and updates the existing occupancy maps using the requested information.

Figure 11A:
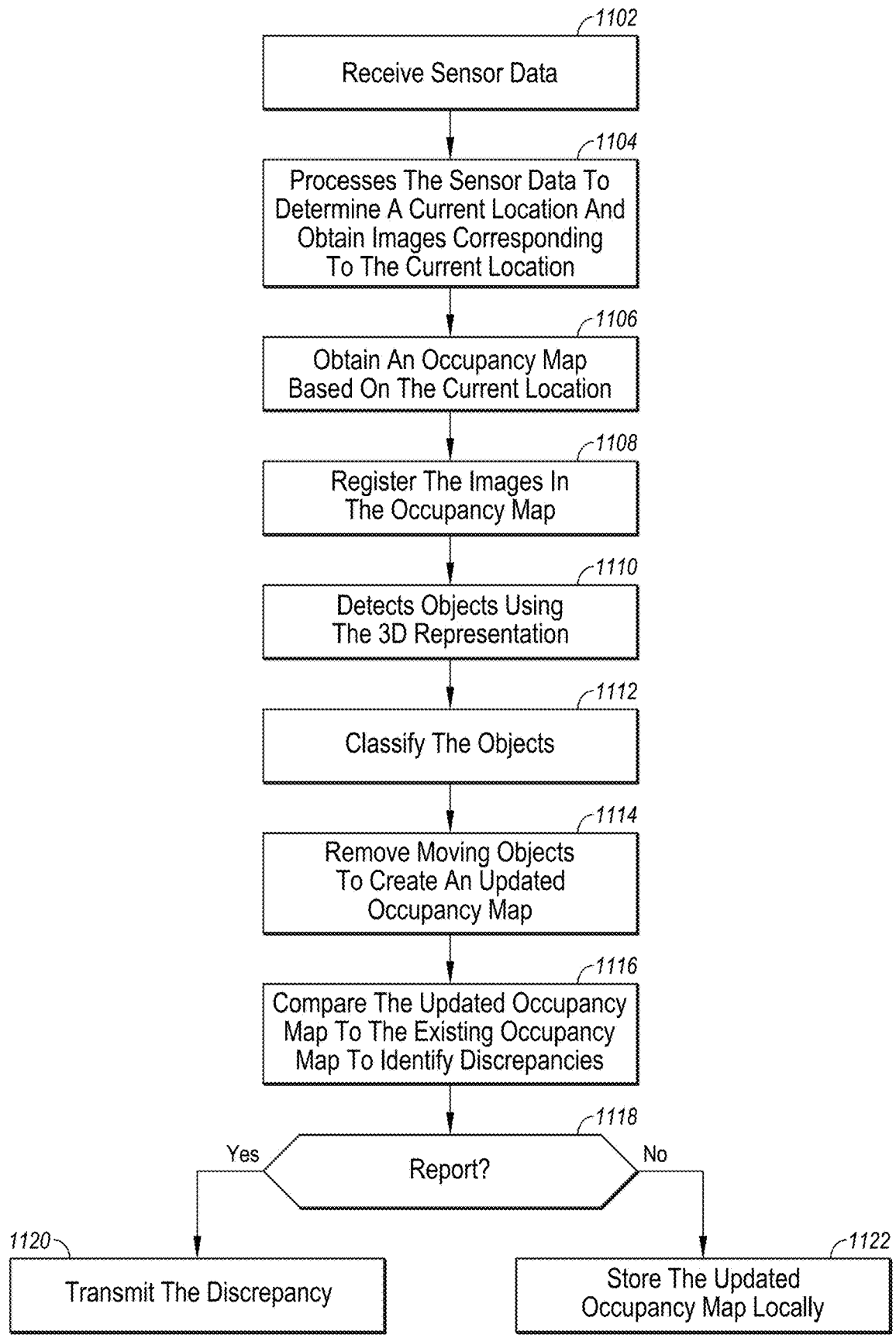
FIG. 11A is a flow chart illustrating an embodiment of a process of a vehicle verifying and updating existing occupancy maps.

FIG. 11A is a flow chart illustrating an example process of a vehicle 150 verifying and updating existing occupancy maps. The vehicle 150 receives 1102 sensor data from the vehicle sensors 105. The vehicle 150 receives the sensor data concurrently with the vehicle 150 traveling along a route. As described previously, the sensor data (e.g., the sensor data 230) includes, among others, image data, location data, vehicle motion data, and LIDAR scanner data.

The vehicle 150 processes 1104 the sensor data to determine a current location of the vehicle 150 and obtain images from the sensor data. The images capture an environment surrounding the vehicle 150 at the current location from different perspectives. The environment includes roads and objects around the roads. The current location may be determined from the GPS location data or matching the sensor data to an occupancy map. The images of the surroundings and LIDAR data can be used to create a 3D representation of the surroundings. The vehicle 150 such as the perception module 210 applies various signal processing techniques to analyze the sensor data. Alternatively, the vehicle 150 may provide the sensor data to the online HD map system 110 or to a third-party service for analysis.

The vehicle 150 obtains 1106 an occupancy map based on the current location. For example, the vehicle 150 queries the current location in the HD map data stored in the local HD map store 275 to find the occupancy map of which the associated location range includes the current location or of which the associated location matches the current location. The HD map data stored in the local HD map store 275 corresponds to a geographic region and includes occupancy grid data that includes 3D representations of the roads and objects around the roads in the geographic region. By querying the current location in the HD map data stored in the local HD map store 275, the vehicle 150 identifies roads and objects that are 3D represented in existing occupancy maps stored in the HD map store 165.

The vehicle 150 registers 1108 the images of the surroundings with the occupancy map. In other words, the vehicle 150 transforms 2D image information into the 3D coordinate system of the occupancy map. For example, the vehicle 150 maps points, lines, and surfaces in the stereo images to points, lines, and surfaces in the 3D coordinate system. The vehicle 150 also registers LIDAR scanner data with the occupancy map. The vehicle 150 thereby creates a 3D representation of the environment surrounding the vehicle 150 using the images, the LIDAR scanner data, and the occupancy map. As such, the vehicle 150 creates a 3D representation of the surroundings.

In some embodiments, the vehicle 150 detects objects (e.g., obstacles) from the sensor data (e.g., the image data, the LIDAR scanner data), classifies detected objects as moving objects, and removes moving objects while creating the 3D representation of the surroundings. As such, the 3D representation of the surroundings include no moving objects. In various embodiments, the vehicle 150 detects the objects in a predetermined region surrounding the current location. For each determined object, the vehicle 150 may also determine information associated with the object such as a distance of the object away from the current location, a location of the object, a geometric shape of the object, and the like. For each detected object, the vehicle 150 classifies whether the object is a moving object or a still object. A moving object (e.g., a car, a bicycle, a pedestrian) is either moving or is likely to move. The vehicle 150 may determine a likelihood of moving for an object. If the likelihood of moving is greater than a threshold likelihood, the object is classified as a moving object. The vehicle 150 removes the moving objects from the images. That is, the vehicle 150 classifies all objects into a moving object group or a still object group. The moving object group includes moving objects and the still object group includes still objects. The vehicle 150 removes the objects included in the moving object group. The vehicle 150 such as the perception module 210 or the prediction module 215 detects and classifies objects from the sensor data. Alternatively, the vehicle 150 may provide the sensor data to the online HD map system 110 or to a third-party service for analysis.

If the vehicle 150 registration of the images and the LIDAR scanner data with the occupancy map fails, the vehicle 150 may repeat the registration processes for a few iterations. Then, the vehicle 150 may determine whether the failure is caused by sensor failures, by corrupted registration processes, or by corrupted occupancy map data (e.g., an update is not correctly installed).

The vehicle 150 detects 1110 objects in the 3D representation created from the stereo images. For example, the vehicle 150 may apply one or more machine learning models to localize and identify all objects in the 3D representation. The vehicle 150 may provide the 3D representation to the online HD map system 110 or to another third party service for object detection.

The vehicle 150 classifies 1112 the detected objects. An object may represent a fixed structure such as a tree or a building or may represent a moving object such as a vehicle. For example, the vehicle 150 may apply one or more machine learning models to classify all detected objects as moving objects or still objects. The vehicle 150 may alternatively provide the 3D representation to the online HD map system 110 or to another third party service for object classification.

The vehicle 150 removes 1114 moving objects from the 3D representation to create an updated occupancy map. In particular, the vehicle 150 removes moving objects from the 3D representation and uses the remaining portion of the 3D representation to update the existing occupancy map. For example, the vehicle 150 compares the remaining portion of the 3D representation to the existing occupancy map to determine whether to add new representations and/or whether to remove existing representations. For example, if the remaining portion of the 3D representation includes an object (or a road) that is not represented in the existing occupancy map, the vehicle 150 updates the existing occupancy map to include a representation of this object (or this road). As another example, if the existing occupancy map includes a representation of an object (or a road) that is not represented in the remaining portion of the 3D representation, the vehicle 150 updates the existing occupancy map to remove the representation of this object (or this road). As a further example, if the existing occupancy map includes a representation of an object (or a road) that is different from that in the remaining portion of the 3D representation, the vehicle 150 updates the representation of this object (or this road) in the existing occupancy map according to the remaining portion of the 3D representation.

The vehicle 150 compares 1116 the updated occupancy map to the existing occupancy map (i.e., the occupancy map stored in the local HD map store 275) to identify one or more discrepancies. The updated occupancy map includes 3D representations of objects in the environment surrounding the vehicle 150 detected from the sensor data. The occupancy map stored locally includes representations of objects in the environment previously detected. A discrepancy includes any object detected from the sensor data but not previously detected, any object previously detected but not detected from the sensor data, or differences between any object detected from the sensor data and also previously detected.

The vehicle 150 may verify a particular discrepancy. The verification can be performed in several ways. The vehicle 150 may continuously analyze newly-generated raw sensor data collected related to the object to verify whether the object as represented in the occupancy map 530 is accurate or should be updated. The sensors 105 continuously generate raw sensor data as the vehicle 150 traverses the road. The newly-generated raw sensor data can provide additional information to verify discrepancies because they are generated at different locations. The vehicle 150 may also notify a human reviewer (e.g., the passenger) for verification. The human reviewer can provide vehicle 150 with instructions on whether the landmark object as represented in the local HD map store 275 should be updated or is accurate. The human reviewer can provide specific changes that should be made to the occupancy map 520. The vehicle 150 may also interact with a human reviewer to verify the discrepancy. For example, the vehicle 150 may notify the human reviewer to verify visible information that the vehicle 150 determines as likely to be inaccurate. Based on the human reviewer's input, the HD map system 110 completes verifying the discrepancy.

The vehicle 150 determines 1118 whether to report the identified discrepancies (e.g., as a change candidate, such as for lane closure or lane opening). The vehicle compares the identified discrepancies to a discrepancy threshold to determine whether any discrepancy is significant or if the identified discrepancies are collectively significant. For example, the vehicle 150 calculates a significance value for a particular discrepancy according to predetermined rules and compares the significance value to a threshold value to evaluate whether the discrepancy is significant. As one example, the vehicle 150 determines that an identified change is a significant change if it affects a lane usability or has a large effect on localization (i.e., registering 2D images or the LIDAR scanner data in the 3D coordinate system of the occupancy map.) The vehicle 150 may prioritize discrepancies to be reported based on significance values. A more significant discrepancy may be reported sooner than a less significant discrepancy.

The vehicle 150 transmits 1120 a discrepancy to the online HD map system 110 if it determines that the discrepancy is a significant discrepancy. The vehicle may send raw sensor data associated with the discrepancy to the online HD map system 110 along with the discrepancy. The vehicle 150 stores 1122 the updated occupancy map locally in the local HD map store 275. In some embodiments, the vehicle 150 transmits a discrepancy immediately if the associated significance value is greater than a threshold. The vehicle 150 may transmit sensor data (e.g., LIDAR scanner data, image data) along with the discrepancy. In some embodiments, only sensor data associated with the discrepancy is transmitted along with the discrepancy. For example, the vehicle 150 filters out LIDAR points and parts of the images that are substantially the same as before and sends the LIDAR point and/or image data for a very specific change. The vehicle 150 may send the sensor data associated with the 3D representation that are substantially the same as before at a later time (e.g., if the online HD map system 110 requests such information, or if bandwidth becomes available).

The online HD map system 110 updates the occupancy map stored in the HD map store 165 using the discrepancies received from the vehicle 150. In some embodiments, immediately if the associated significance value is greater than a threshold. The online HD map system 110 may request additional data (e.g., raw sensor data) associated with the discrepancy from the vehicle 150. The request may indicate a level of urgency that requires the vehicle 150 to respond within a predetermined time interval. If the level of urgency is low, the vehicle 150 may wait for a high speed connection to send the additional data to the online HD map system 110. This process can be especially suitable for lane closure objects for determining lane closures and lane openings.

Figure 11B:
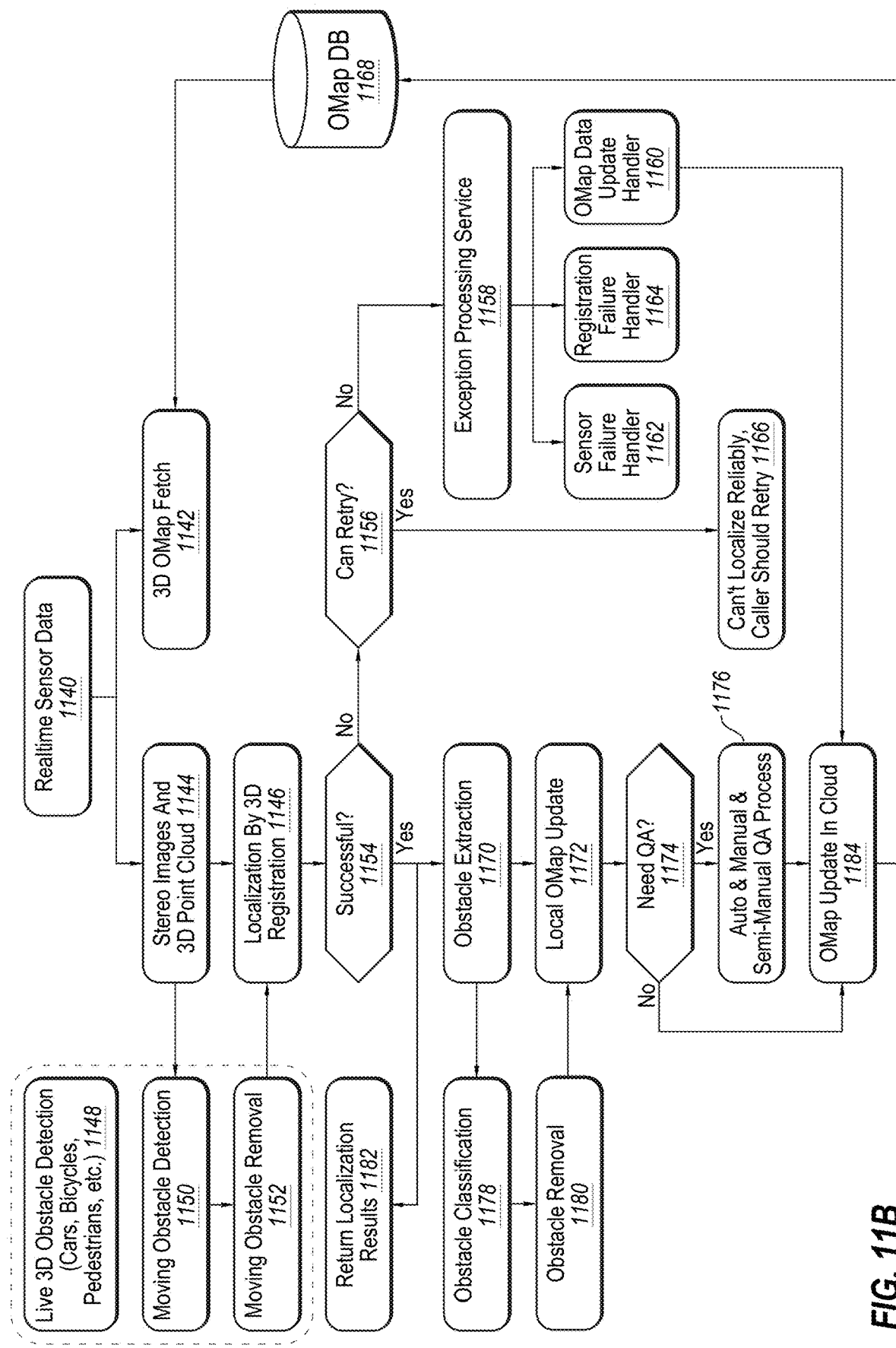
FIG. 11B is a flow chart illustrating an embodiment of a process of a vehicle verifying and updating existing occupancy maps.

FIG. 11B is a flow chart illustrating an example process of a vehicle 150 verifying and updating existing occupancy maps. The vehicle 150 periodically receives 1140 real-time sensor data. The vehicle 150 determines a current location based on the sensor data. The vehicle 150 fetches 1142 occupancy map data based on the current location from the occupancy map database 1168. The vehicle 150 processes 1144 the sensor data to obtain images of surroundings of the vehicle 150 as well as LIDAR scanner points. The vehicle 150 registers 1146 the images in the 3D coordinate system of the occupancy map to thereby create a 3D representation of the surroundings. The vehicle 150 may perform 1148 live 3D obstacle detection concurrently with registering the images. The vehicle 150 detects 1150 any moving obstacles, and can remove 1152 certain moving obstacles from the 3D representation of the surroundings. The vehicle 150 may remove moving obstacles to boost localization success rate. Steps 1148, 1150, and 1152 may occur in real-time, while the remaining steps may occur offline.

The vehicle 150 determines 1154 whether the 3D registration is successful. If the 3D registration is successful, a successful localization result is returned 1182 to the vehicle control system. The real-time sensor data will be further processed, either in the background or later. The vehicle 150 extracts 1170 obstacles from the 3D representation. The vehicle 150 classifies 1178 the obstacles as moving or still. The vehicle 150 removes 1180 moving obstacles from the 3D representation. The vehicle 150 updates 1172 the local occupancy map based on the 3D representation of which the moving obstacles are removed. The vehicle 150 determines 1174 whether the updated local occupancy map needs verification. If verification is determined as needed, the vehicle 150 can perform 1176 a combination of auto, manual, and/or semi-manual verification. If verification is determined as unnecessary, the vehicle 150 can provide occupancy map update data to the cloud, and the cloud updates 1184 the occupancy map in the cloud. If a major difference in the OMap stored in the cloud is detected, the on-vehicle system may decide to report to the online HD map system 110. This process can be especially suitable for lane closure objects for lane closures or lane openings.

If localization fails and cannot retry, an exception processing service can be invoked. If the 3D registration fails, the vehicle 150 can retry 1156 the 3D registration. If the 3D registration continues to fail, the vehicle 150 can invoke 1158 the exception processing service. The vehicle 150 can also invoke 1162 a sensor failure handler upon failure of any of its sensors. The vehicle 150 can further invoke 1164 a registration failure handler for registration fails. After ruling out sensor and other failures, the vehicle 150 reports the event to the cloud. The vehicle 150 can invoke 1160 an occupancy map update handler for handling updates to the cloud.

Map Data Collection

A vehicle computing system 120 interacts with the online HD map system 110 to ensure that enough data is collected to update maps while minimizing communication cost between a fleet and the cloud. The following factors are considered as part of the load balancing algorithm. The first factor is the amount of data needed to cross-check the quality of map updates detected. When a change is detected, it often needs to be validated by other vehicles before it's disseminated to other vehicles. The second factor is the amount of data a given vehicle has sent to the cloud (e.g., online HD map system 110) in the past. The upload history of a vehicle is considered such that a vehicle will not surpass its data consumption cap.

Figure 12:
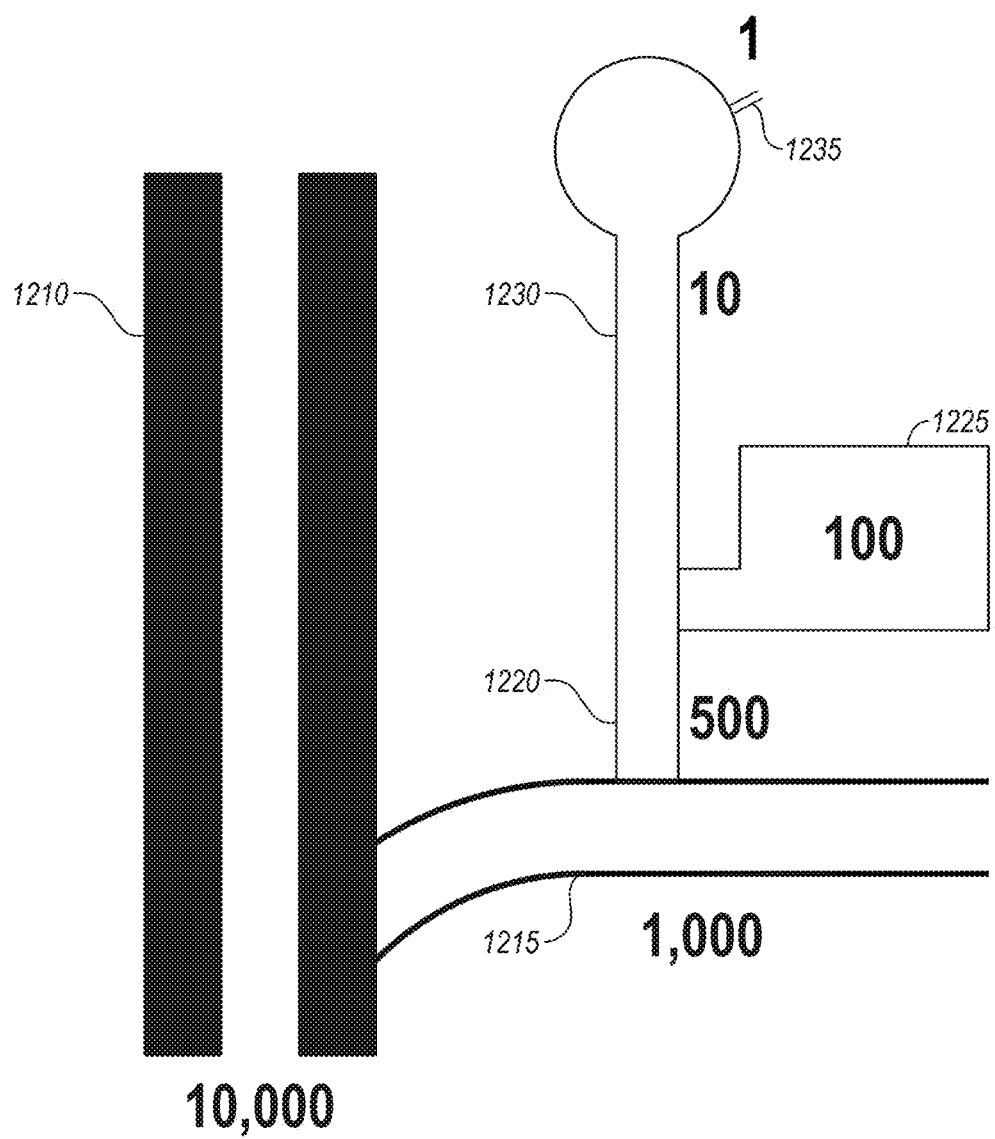
FIG. 12 illustrates an example of the rate of traffic in different types of streets.

FIG. 12 illustrates an embodiment of the rate of traffic in different types of streets. A street refers to roads, highways, avenues, boulevard, or other paths that vehicles can travel on. The different types of streets are interconnected in a street network, which comprises different levels of streets. As seen in FIG. 12, different levels of streets include residential driveways 1235, residential streets 1230, parking lots 1225, tertiary streets 1220, secondary streets 1215, and highways 1210. The street network may comprise zero or more of each of these levels of streets. In other embodiments additional levels of streets may exist, such as country backroads, private roads, and so on, which behave similarly to those described herein.

Each level of street has an associated magnitude of traffic as seen in the figure. For example, residential driveways 1235 may typically have a small number of vehicles traversing them on the order of one vehicle per day. Residential streets 1230 may typically have a relatively higher number of vehicles traversing them on the order of ten vehicles per day. Parking lots 1225 may typically have a number of vehicles traversing them on the order of 100 vehicles per day. Tertiary streets 1220 may typically have a number of vehicles traversing them on the order of 500 vehicles per day. Secondary streets 1215 may typically have a number of vehicles traversing them on the order of 1000 vehicles per day. Highways 1210 may typically have a number of vehicles traversing them on the order of 10,000 vehicles per day. The online HD map system uses the measure of traffic on each street to select vehicles from which to access map related data.

Accordingly, the level of traffic on a street for a given street is significant for vehicle data load balancing and is considered by a map data request module 1330, as described below, when selecting a vehicle 150. For example, a highway 1210 will have much more traffic per day than a residential street 1230. As such, a map discrepancy on a highway will be reported by many more vehicles than a map discrepancy on a residential street. Furthermore, different vehicles reporting different map discrepancies may refer to the same discrepancy. For example, a first vehicle may report a crashed vehicle in a lane of a street, and a second vehicle may report placement of cones at the same location (e.g., lane now closed), presumably around the crashed vehicle. Hence the amount of traffic on the street associated with a map discrepancy is used to select vehicles for requesting data by the online HD map system 110. Also, due to the fewer number of vehicles traversing certain levels of streets, the online HD map system 110 is less discriminating when selecting vehicles for those streets, since fewer vehicles total shall be traversing them and therefore the pool of valid vehicles for selection will be smaller. Therefore, if a street has very low traffic, the online system may select the same vehicle multiple times to request the vehicle to upload the data.

Figure 13:
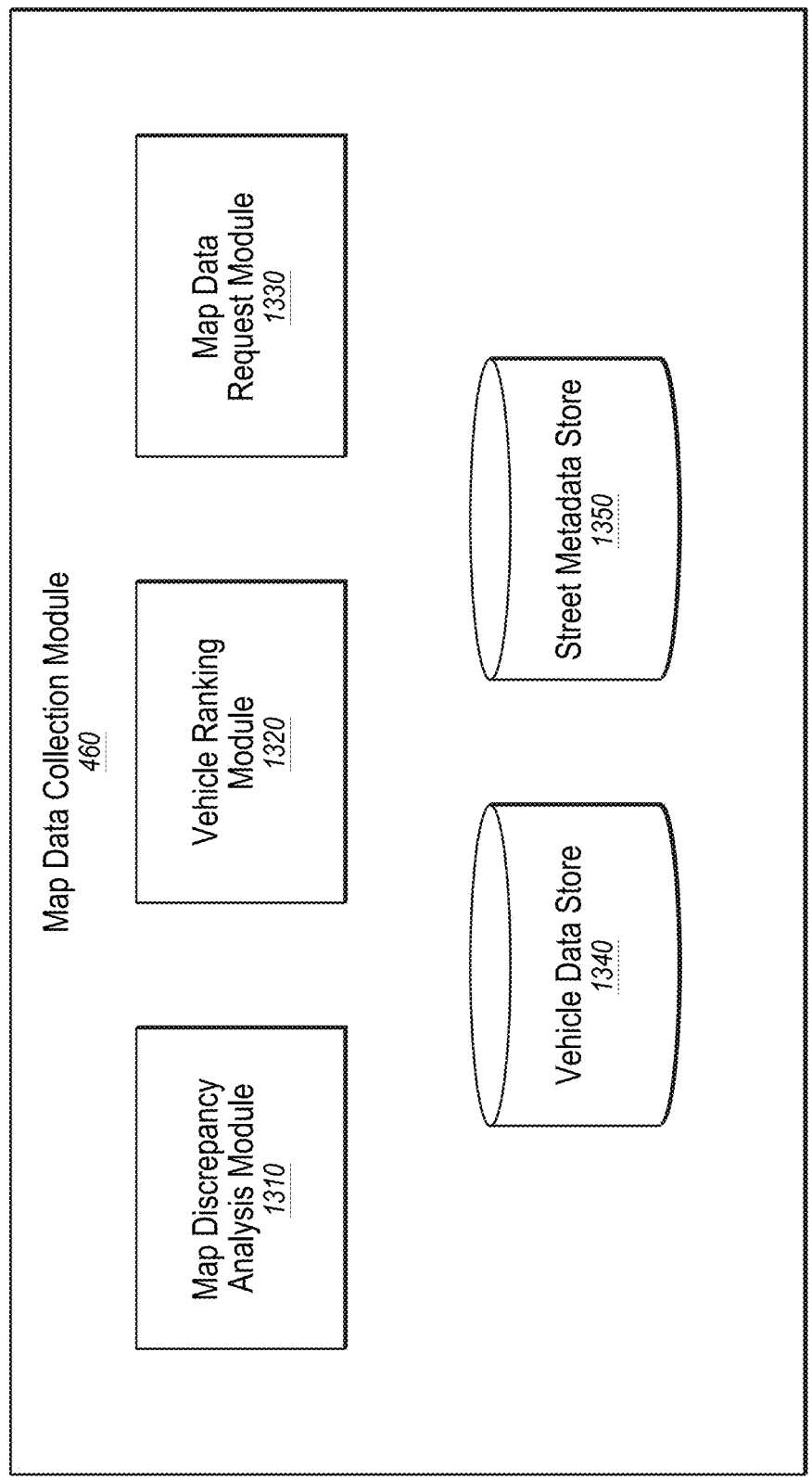
FIG. 13 illustrates an embodiment of the system architecture of a map data collection module.

FIG. 13 shows an embodiment of the system architecture of a map data collection module 460. The map data collection module 460 comprises a map discrepancy analysis module 1310, a vehicle ranking module 1320, the map data request module 1330, and a vehicle data store 1340. Other embodiments of map data collection module 460 may include more or fewer modules. Functionality indicated herein as performed by a particular module may be performed by other modules instead.

In an embodiment, each vehicle 150 sends status update messages, or update messages, to the online HD map system 110 periodically. The status update message includes metadata describing any map discrepancies identified by the vehicle 150 indicating differences between the map data that the online HD map system 110 provided to the vehicle 150 and the sensor data that is received by the vehicle 150 from its vehicle sensors 105. In an embodiment, even if the vehicle 150 determines that there are no map discrepancies at a location, the vehicle 150 provides a status update message indicating that no map discrepancies were noticed. These status messages allow a map data collection 460 to verify if a map discrepancy was erroneously reported by a vehicle 150. In addition, these status messages can allow older data from a particular area to be aged out and replaced with newer data about that area so that the HD map includes the most recent data that is possible.

The map discrepancy analysis module 1310 analyzes data received from vehicles 150 as part of the status update messages to determine whether the vehicle 150 reported a map discrepancy (e.g., change candidate). If the map discrepancy analysis module 1310 determines that a status update message received from a vehicle 150 describes a discrepancy, the map discrepancy analysis module 1310 further analyzes the reported map discrepancy, for example, to determine a level of urgency associated with the discrepancy as described supra with regard to map discrepancy module 290.

The map data collection module 460 stores information describing the data received from vehicles 150 in the vehicle data store 1340. This includes the raw data that is received from each vehicle 150 as well as statistical information describing the data received from various vehicles, for example, the rate at which each vehicle 150 reports data, the rate at which a vehicle 150 was requested to upload additional map data for a particular location, and so on.

The vehicle ranking module 1320 ranks vehicles 150 based on various criteria to determine whether the map data collection module 460 should send a request to a vehicle 150 to provide additional map data for a specific location. In an embodiment, the vehicle ranking module 1320 ranks vehicles 150 based on the upload rate of individual vehicles. In other embodiments, the vehicle ranking module 1320 may rank vehicles 150 based on other criteria, for example, a measure of communication bandwidth of the vehicle, whether the vehicle is currently driving or stationary, and so on.

The street metadata store 1350 stores a measure of the amount of traffic on each street at various locations as illustrated in FIG. 12. For example, the street metadata store 1350 may store a table mapping various portions of streets and a rate at which vehicles 150 drive on that portion of the street. The rate at which vehicles 150 drive on that portion of the street may be specified as an average number of vehicles 150 that drive on that street in a given time, for example, every hour. In an embodiment, the street metadata store 1350 also stores the rate at which vehicles 150 travel on a portion of the street at particular times, for example, night time, morning, evening, and so on.

The map data request module 1330 selects a vehicle for requesting additional map data for specific location and sends a request to the vehicle. The map data request module 1330 sends a request via the vehicle interface module 160 and also receives additional map data via the vehicle interface module 160. The map data request module 1330 selects a vehicle 150 based on various criteria including the vehicle ranking determined by the vehicle ranking module 1320 and a level or urgency associated with the map discrepancy, and a rate at which vehicles drive through that location of the street. In an embodiment, the map data request modules 1330 preferentially selects vehicles 150 which have data for the specific location recorded during daylight hours over vehicles 150 with data recorded at dawn, dusk, or night. Upon receipt of a response to a request, the map data request module 1330 may inform other modules of the online HD map system 110 to implement changes to the HD map using the additional data of the response to the request.

Outdated map alerts comprise notifications to the map data collection module 460, such as from the map update module 420, which indicate that a portion of an HD map is outdated and requires updating with new information. It is desirable for HD map data to be up to date. This requires at least periodic updating of the HD map data. Not all HD map data is of the same age, with some data having been collected earlier than other data. The online HD map system 110 may track how old HD map data is. For each lane element the online HD map system 110 may record the newest and oldest times data was used to build that lane element, for example a timestamp of when the oldest used data was collected and a similar timestamp for the newest used data. An outdated map alert may be sent requesting new map data for a lane element if either the oldest timestamp or newest timestamp of that lane element's data is older than a respective threshold age. For example, if the oldest data is more than four weeks old, or if the newest data is over a week old, an outdated map alert may be sent requesting additional data to update the HD map. As described herein, any response to a map discrepancy could similarly be applied to addressing an outdated map alert.

The map data request module 1330 may have a backlog of multiple map discrepancies or outdated map alerts which require additional data from vehicles 150 to be requested by the map data collection module 460. In such cases, the map discrepancies and/or outdated map alerts, henceforth together generally referred to as update requests, are managed by the online HD map system 110 which also prioritizes their handling.

More urgent update requests may be prioritized over less urgent update requests, for example, based on the degree of urgency of each update request. For example, an update request may be labeled critical (e.g., lane closed or opened), meaning it is of utmost importance, which may cause the online HD map system 110 to move it to the front of a queue of requests. Examples of critical update requests may include new routes and routes where a significant map discrepancy is detected by multiple vehicles 150. For example, if one hundred vehicles 150 detect closure of a highway lane, the online HD map system 110 may prioritize that map discrepancy. The online HD map system 110 may collate map discrepancies pertaining to the same map discrepancy into one for which to send requests for additional data, for example, the above-mentioned map discrepancies from the one hundred vehicles 150. Map discrepancies may be collated, or combined into one map discrepancy, by analyzing the map discrepancy fingerprint of each map discrepancy for similarity, wherein map discrepancies within a threshold similarity of one another are handled by the online HD map system 110 as a single map discrepancy.

Non-critical update requests may have various levels of non-criticality, for example, update requests where the oldest timestamp of used data is older than a threshold age may be prioritized over update requests where the newest timestamp is older than a threshold age.

Older update requests may be prioritized over newer update requests. For example, an update request a week old may be prioritized over an update request an hour old. Map discrepancies may be prioritized over outdated map alerts, or vice versa. If an update request is non-urgent, the online HD map system 110 may delay accessing data for it from vehicles if there are other urgent requests that need to be addressed. Furthermore, the online HD map system may wait to find a vehicle 150 with low update load so as to minimize per vehicle data upload requirements.

To properly update an HD map in response to an update request, additional data from more than one vehicle 150 may be required. In such cases the map data request module 1330 requests additional data from a plurality of vehicles 150. If a certain number of vehicles 150 are required to gather additional information for a particular update request and there are not enough applicable vehicles 150 to fully handle the update request, then every applicable vehicle 150 is sent a request for additional information. Otherwise, a subset of available vehicles 150 is selected. The plurality of vehicles 150 selected to respond to a request for additional data are selected similar to selection of a single vehicle, i.e., based on the upload rate of each vehicle to minimize upload rate per vehicle by distributing requests for additional data across the plurality of vehicles with vehicles of lowest upload rate taking precedence. The upload rate is a rate of data uploaded per time period (e.g., bytes of data uploaded per time period, such as over 10 seconds, 1 minute, 10 minutes, an hour, etc.)

Processes associated with updating HD maps are described herein. The steps described herein for each process can be performed in an order different from those described herein. Furthermore, the steps may be performed by different modules than those described herein.

Figure 14:
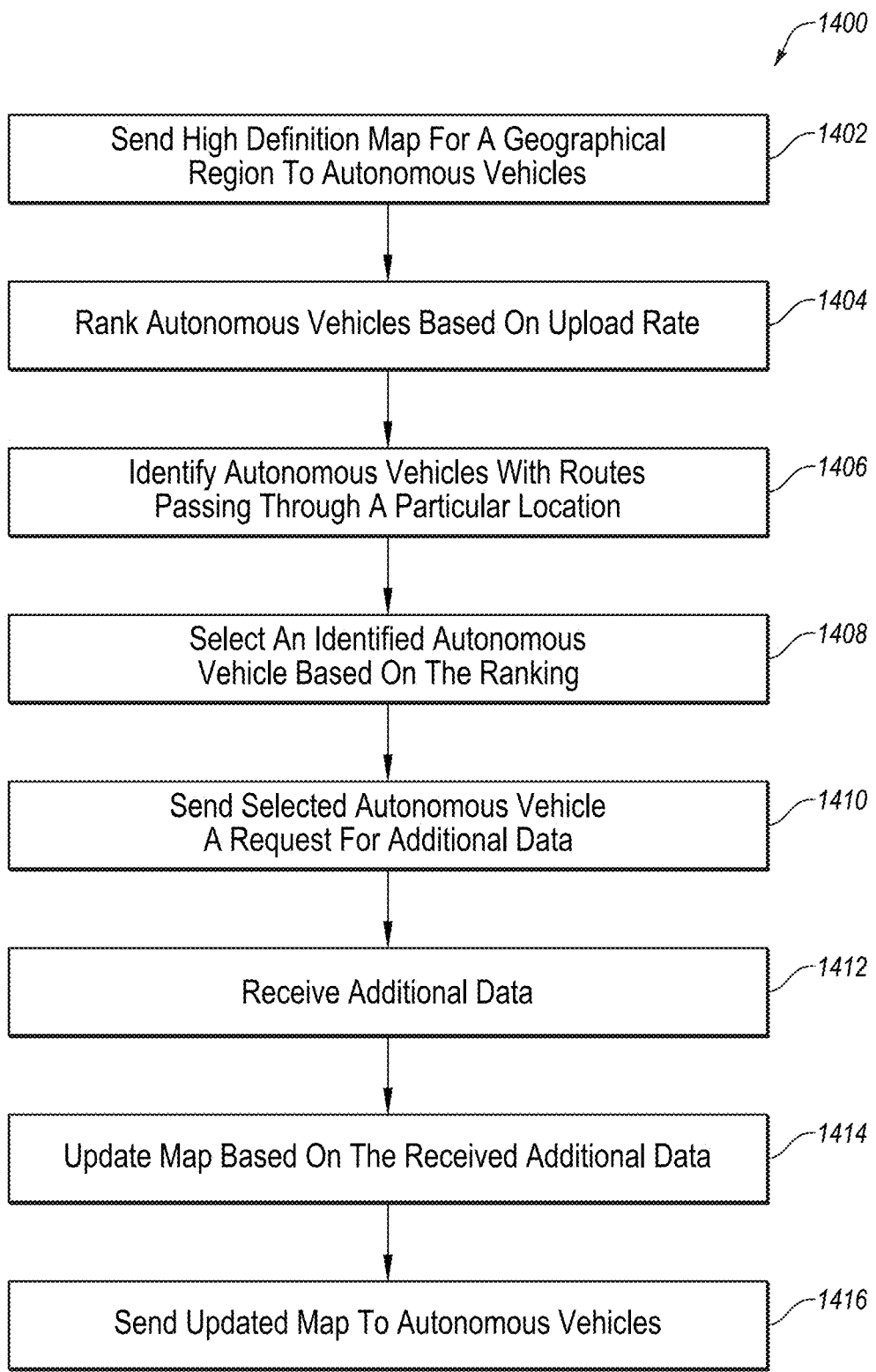
FIG. 14 illustrates an embodiment of the process of updating HD maps with vehicle data load balancing.

FIG. 14 illustrates an embodiment of a process 1400 of updating HD maps with vehicle data load balancing. The online HD map system 110 sends 1402 HD maps for a geographical region to a plurality of vehicles 150 which will drive or are driving routes which traverse that geographical region. The online HD map system 110 determines for each of the plurality of vehicles 150 an upload rate based on a frequency at which the vehicle uploads data to the online HD map system 110. The online HD map system 110 then ranks 1404 the plurality of vehicles 150 based on the upload rate or recently uploaded data size of each vehicle 150 to balance the burden of uploading data collected via the sensors across the fleet of vehicles 150. For example, for each vehicle 150 there is a recorded data load indicating how much data the vehicle 150 has uploaded to the online HD map system 110 that day, measured, for example, in megabytes (MB). In an embodiment, lower upload rates are ranked higher and higher upload rates are ranked lower. For example, a vehicle 150 with an upload total of 100 MB of data over the last accounting period or time period (e.g., days or a week)y would be ranked higher than a vehicle 150 with an upload total of 500 MB over the accounting period. Upload rate is a rate of data uploaded (e.g., in bytes) over a period of time (e.g., over a few minutes, over one or more days, over one or more weeks, over one or more months, etc.). The time period can be adjustable to optimize performance. Thus, tracking data uploads per week allows for better load balancing across the fleet of vehicles then tracking per day, weekly tracking can be used. And this can be adjusted over time to continue to optimize performance, including being adjusted year to year, or even throughout the year (e.g., winter versus summer, over holiday periods, etc.).

The online HD map system 110 then identifies 1406 vehicles 150 of the plurality of vehicles with routes passing through a particular location of the geographical region, for example, a particular intersection of a certain road. The particular location can be a location about which the online system needs or desires to have collected current vehicle sensor data. The particular location may be chosen for any of a plurality of reasons, for example, because the HD map data for the particular location has surpassed a threshold age, or because a map discrepancy was detected at the particular location which requires further investigation.

The online HD map system 110 then selects 1408 an identified vehicle 150 based on the ranking. For example, if the vehicle with the lowest upload rate, ranked first, does not pass through the particular location, but the vehicle 150 with the second lowest upload rate, ranked second, does, then the vehicle 150 with the second lowest upload rate is selected. In other embodiments other factors may be considered when selecting 1408 an identified vehicle 150, for example, a time of day at which the identified vehicle 150 traverses the particular location, or time of day (e.g., sunlight direction) versus direction of travel, as this may affect quality of the camera data. The vehicles 150 chosen can be the ones most likely to collect the highest quality camera data. So vehicles 150 traveling at night may have a lower priority over those traveling during the day, as night time camera data may not be as clear as day time camera data. Similarly, vehicles 150 with the sun behind them may have a higher priority over those driving into the sun, since camera data coming from a vehicle driving directly into the sun may be lower quality.

The online HD map system 110 then sends 1410 the selected vehicle 150 a request for additional data. In particular, the request for additional data may pertain to the particular location of the geographical region. The additional data requested may be in general, such as whatever data the selected vehicle 150 is able to sense while traversing the particular location, or may be specific, such as a particular kind of sensor data. The request may comprise a start location and an end location at which to begin recording data and at which to cease recording data, respectively, for responding to the request for additional data.

The online HD map system 110 then receives 1412 the additional data from the vehicle 150, such as over a wireless network. The additional data may be formatted such that the online HD may system 110 can incorporate the additional data into an update to the HD maps. The online HD map system 110 then uses the additional data to update 1414 the HD maps. For example, if the additional data pertains to a lane of a road which has temporarily closed due to construction work nearby, the online HD map system 110 may update the map to indicate that lane of that road as temporarily closed. Alternatively, the additional data may pertain to data already in the online HD map system 110 which has passed a threshold age and therefore requires updating to ensure the HD map is up to date. The online HD map system 110 then sends 1416 the updated HD map to the plurality of vehicles so that they may use a more accurate HD map while driving.

Figure 15:
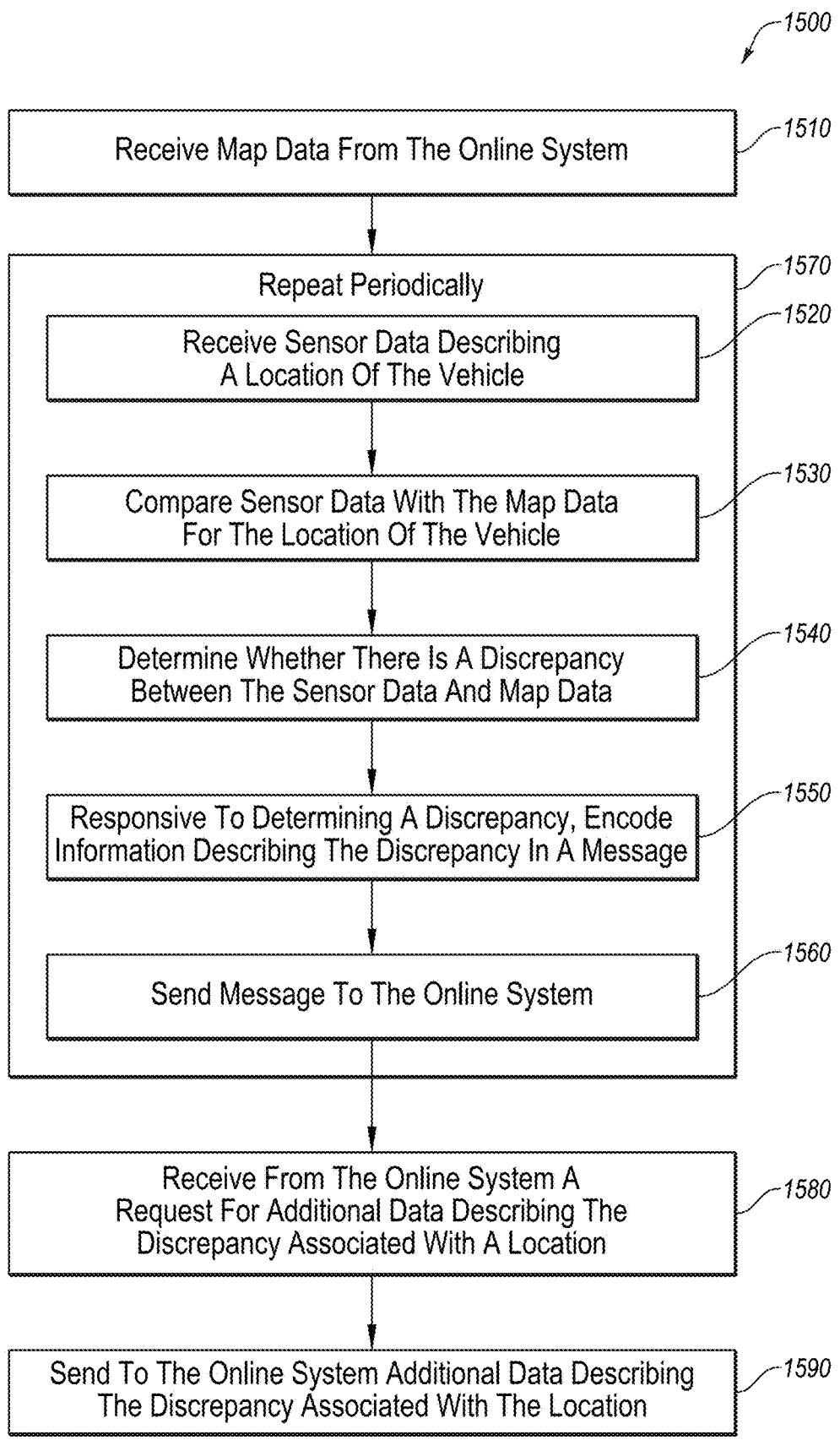
FIG. 15 illustrates an embodiment of the process of updating HD maps responsive to detecting a map discrepancy by use of vehicle data load balancing.

FIG. 15 illustrates an embodiment of a process 1500 of updating HD maps responsive to detecting a map discrepancy, with vehicle data load balancing. The vehicle 150 receives 1510 map data from the online HD map system 110 comprising HD maps for a geographical region. The vehicle 150 then receives 1520 sensor data 230 describing a particular location through which the vehicle 150 is driving.

The vehicle 150 compares 1530 the sensor data 230 with the map data for the particular location the sensor data 230 pertains to. Using the comparison, the vehicle 150 determines 1540 whether there is a discrepancy between the sensor data and map data. For example, the map data may indicate that a road has three lanes the vehicle 150 may use, but sensor data 230 may indicate that one of the lanes is obstructed and therefore closed, such as due to nearby construction or roadwork.

Upon determining that there is a map discrepancy, the vehicle 150 encodes 1550 information describing the discrepancy in a message. The message, or update message, is described with greater detail in the earlier section with regard to the map discrepancy module 290. The message comprises information which the online HD map system 110 may use to understand and/or analyze the discrepancy and/or update HD maps with the new information. Upon encoding 1550 the message, the message is sent 1560 to the online HD map system 110, for example, over a wireless network. Sending a message increases the upload rate of the vehicle 150 which sent the message, proportional to the size of the message sent.

Receiving 1520 sensor data describing a location of the vehicle 150, comparing 1530 sensor data with map data for the location of the vehicle, determining 1540 whether there is a map discrepancy between the sensor data and map data, encoding 1550 information describing the discrepancy in a message, and sending 1560 the message to the online HD map system 110 may repeat 1570 periodically. For example, they may repeat every threshold amount of time or threshold distance driven, for example every hour and/or every 10 miles. In an embodiment, the vehicle 150 records all discrepancies for a given window of time or distance between periodic messages and encodes all those recorded discrepancies into the next periodic message. In an embodiment, messages are only sent when the vehicle is docked at a high bandwidth access point to a network, though in general these messages can be designed to be small and can be sent on cellular networks, so a high bandwidth access point is not needed in other embodiments.

The vehicle 150 may then receive 1580 a request from the online HD map system 110 requesting additional data describing the map discrepancy at the particular location. The request may specify one or more desired types of sensor data or may ask for any and all sensor data capable of being measured by the vehicle at the particular location. Furthermore the request may specify a limit to the amount of data to be reported, for example, for the vehicle 150 to respond with no more than 500 MB of data pertaining to the map discrepancy. The vehicle 150 then sends 1590 the online HD map system 110 the additional data describing the map discrepancy associated with the particular location. In an embodiment, sending the additional data involves traversing the particular location and recording additional sensor data for the particular location, such as data types requested by the online HD map system 110.

In an embodiment, the vehicles 150 follow a hand-shake protocol with the online HD map system 110. A vehicle 150 sends a message after travelling a fixed amount of distance, for example X miles, whether or not the vehicle 150 detects a map discrepancy. The message includes various types of information including an identifier for the vehicle 150, a timestamp indicating the time the message was sent, information describing the coarse route traveled (for example, using latitude/longitude coordinates sampled at a fixed interval (e.g., 200*m*), if lane elements were traversed (i.e., driven over existing region in the map) the message includes a list of traversed lane element IDs, information describing a scope of change if any (what type of change and how big), a change fingerprint (to help identify duplicate changes), and a size of the change packet.

Alternative Embodiments

In an embodiment, the online HD map system 110 performs the following steps for distributing load of uploading data among vehicles 150. The online HD map system identifies: (1) critical routes (routes where multiple copies are needed); (2) non-critical routes prioritized; and (3) vehicles sorted by their recent uploads.

The online HD map system 110 handles critical routes first as follows. The online HD map system 110 first identifies vehicles 150 that have data for a critical route, and sorts them. For each vehicle 150, the online HD map system 150 sums up the number of critical routes that it covered. The online HD map system 150 takes all vehicles that covered at least one critical route and sorts them by their number of critical routes, least number of routes first. If the online HD map system 110 determines that for each critical route, if only N or fewer vehicles 150 covered a new route, the online HD map system 110 requests all the sensor data from those vehicles 150. If the online HD map system 110 determines that more than N vehicles 150 covered a route, the online HD map system 110 picks the first N vehicles 150 (from the sorted list of vehicles) that have that route. For the N selected vehicles 150, the online HD map system 110 keeps track of the route request and moves them to the bottom of the sorted list.

The online HD map system 110 handles non-critical routes as follows. The online HD map system 110 builds a sorted list of candidate vehicles 150. The online HD map system 110 determines the list of vehicles 150 that had no critical routes and vehicles 150 from the critical route group that didn't get selected for upload. The online HD map system 110 sorts the lists by their upload load for the last period (e.g., week) in least upload first order. For each non-critical route, the online HD map system 150 selects the vehicle 150 from the top of the list. The online HD map system 110 keeps track of the route request and moves them to the bottom of the sorted list.

The online HD map system 110 as a result obtains a table of vehicles 150 and route requests. When the vehicle 150 arrives at a high bandwidth communication location, the vehicle 150 issues a "docked" protocol message to the online HD map system 110. The online HD map system 110 responds with: a list of route data to upload. The vehicle 150 proceeds to upload the requested data. Alternatively the online HD map system 110 responds that no uploads are requested. The vehicle 150 marks its route data as deletable.

Accordingly, the online HD map system 110 ensures that the online HD map system 110 gets the data for newly driven routes, the online HD map system 110 gets the data for changed routes, that bandwidth is conserved by not requesting data from every vehicle 150 that goes down the same road, and that each car is not spending a great amount of time/energy and bandwidth uploading data since the online HD map system 110 distributes the load fairly among all cars.

Randomized Data Uploads

In another embodiment, the online HD map system 110 tracks the route handshakes as described above, and maintains a database of route coverage frequency. If a given route is covered N times a day by vehicles 150, and the online HD map system 110 ensures that the latest and oldest data for that route is within a given period of time (our freshness constraint). The online HD map system 110 estimates how often the online HD map system 110 needs an update to keep this freshness constraint (statistically).

For example, assume the online HD map system 110 determines that a route gets N coverages a day, where N=10. The online HD map system 110 determines that the latest data to be 2 days old and oldest data to be 14 days old. The online HD map system 110 determines that satisfying the latest time constraint requires selecting 1 out of 20 samples, while satisfying the oldest time constraint requires only 1 out of 140 samples. The online HD map system 110 takes the maximum of these 2 (1 out of 20) and uses that as a random probability for coverage of that route to be requested.

When the online HD map system 110 receives a message from a vehicle 150 with data for a particular route, the online HD map system 110 retrieves the probability for a coverage of that route as a percentage value. The online HD map system 110 computes a random number between 0.0 and 100.0 and if the number is below the retrieved probability, then the online HD map system 110 requests the data to be uploaded.

According to other embodiments, the online HD map system 110 performs additional checks. For example, if the online HD map system 110 determines that if the freshness constraint for a route is not valid, the online HD map system 110 simply requests the route data. For new data or changes, the online HD map system 110 simply requests the upload from the first N coverages.

Detection of Lane Closure or Opening

An autonomous vehicle 150 drives along a road and is configured to capture sensor data from vehicle sensors 105, for example, cameras and LIDAR. The autonomous vehicle 150 is also configured to load HD map data for the region through which the autonomous vehicle 150 is driving. The vehicle computing system 120 compares the sensor data from a sensor data module with the HD map data to determine whether the sensor data matches the HD map data. For example, the comparison can be used to perform a localization analysis in order to determine a pose of the vehicle 150. Often, there can be changes in the lane configurations on a road that may not be permanent, but remain as changes for a significant period of time (e.g., hours, days, or weeks). For example, due to a construction on the road, there may be a lane closure in a segment of a road or there may be a new lane or a temporary lane. The autonomous vehicle 150 can be configured to detect a lane modification (e.g., a lane changing from opened to closed or from closed to opened) in a route based on features that are indicative of such a change. For example, a lane closure can include cones, signs, barricades, barrels, or construction vehicles blocking one or more lanes of the route. The vehicle computing system 120 can be configured to send a change candidate as a proposal describing the lane modification (e.g., lane closure or lane opening) to the online HD map system 110. The online HD map system 110 can be configured to receive the lane modification of the lane closure or lane opening as a change candidate proposal from at least one or multiple autonomous vehicles 150. The online HD map system 110 may request additional information from one or more additional autonomous vehicles 150 to confirm whether there is lane modification, such as a lane closure or lane opening. The autonomous vehicles 150 may be configured to provide the additional requested information instantaneously, or at a later stage when the autonomous vehicle 150 is not driving and/or has a data link with network (e.g., via WiFi) or any other form of high bandwidth network connection.

The online HD map system 110 can be configured to determine whether or not to implement a change to a map based on change candidate proposals received from multiple autonomous vehicles 150, such as view the object discrepancy protocols described herein. The new presence of a lane closure object, or the absence of a known lane closure object can be an example of a discrepancy as described herein. The online HD map system 110 may be configured to store the lane modification information, whether a lane opening or a lane closure, as an additional layer over the HD map information that defines the lane information. The additional layer stores temporary information of the lane modification that may change after a period of time or until it is confirmed that the lane modification is removed or made permanent. The online HD map system 110 may be configured to request an operator or other human to verify the lane modification information by manually inspecting the change candidate information or other lane modification information provided by the plurality of autonomous vehicles 150.

According to some embodiments, the vehicle computing system 120 can determine whether a specific lane has been modified (e.g., is newly closed or opened) based on sensor data. For example, the system may be configured to analyze camera images to identify obstructions placed in the lane to block the lane, such as cones, construction signs, barricades, barrels, construction vehicles, etc., which objects can be referred to herein as lane closure objects). The vehicle computing system 120 may use deep learning techniques, for example, object recognition techniques to recognize the lane closure objects.

In some embodiments, the system can be configured to recognize or identify a lane closure object in a camera image of the sensor data from the sensor data module. The system is also configured to project the recognized lane closure object in the point cloud (e.g., LIDAR scan). The system can be configured to analyze localization data (e.g., determining pose of the vehicle) from the localization module to determine the location of the lane closure object on the HD map to identify the lane in which one or more of the lane closure objects are present. The system can also be configured to determine the position of each lane closure object in the lane, such as in the middle of the lane, on the left boundary of the lane (e.g., from the viewpoint of the vehicle 150) or on the right boundary of the lane.

In some embodiments, the system can be configured to generate one or more change candidates as a proposal for describing lane closures. For example, if a traffic cone is placed in the middle of a lane L1, the system may be configured to generate a change candidate that includes a lane closure proposal that indicates that lane L1 is closed. If a cone is placed on the boundary of lanes L1 and L2, the system may be configured to generate two proposals for a change candidate, which include a first proposal indicating that lane L1 is closed and a second proposal indicating lane L2 is closed. As the vehicle 150 keeps moving along the route, the vehicle 150 is configured to receive new sensor data that may provide new or additional information regarding the one or more change candidates. For example, the camera images may display additional lane closure objects or the camera images may comprise previous images from a different angle that changes the determined location of the lane closure object. For example, from one perspective a cone may appear to be on a lane boundary but from another perspective the cone may appear inside a particular lane. Based on these observations in the data, the system may generate new lane modification change candidate proposals.

In some embodiments, the system can be configured to determine a confidence level indicating a likelihood that the change candidate for the change candidate proposal is accurate. The system can be configured to associate the confidence level with the change candidate for the lane closure proposal for use in updating maps to indicate the lane closure. A similar protocol is used for a lane opening change candidate.

The system can be configured to provide the generated change candidate for the lane modification proposals to the online HD map system 110. The online HD map system 110 may be configured to receive change candidates having lane modification proposals from a plurality of vehicles 150, which can be useful to confirm a change candidate for the lane modification. The online HD map system 110 can be configured to combine the information obtained from a plurality of vehicles 150 to select the appropriate change candidate for the lane modification proposals that have the highest frequency in the change candidate for the lane modification proposals that are received from the plurality of vehicles 150. For example, if a plurality of vehicles 150 have indicated that a particular lane is closed via the change candidates, each indication can be based on sensor data representing multiple observations from the plurality of vehicles 150, then the online HD map system 110 can be configured to determine that the likelihood of that lane being closed is high. If only a single vehicle 150 indicates lane closure, then the likelihood of that lane being closed is low. In some embodiments, the online HD map system 110 aggregates scores for each lane modification proposal in the change candidates, where each instance of a lane modification proposal in a change candidate is weighted by the confidence level determined for the lane closure proposal by the change detection system 1620 for the specific vehicle 150 that generated the lane modification proposal.

In some embodiments, the online HD map system 110 can be configured to add information regarding the change candidate of a lane modification (e.g., newly opened or closed) to the HD map to indicate the lane modification. The online HD map system 110 can be configured to annotate the LMap with lane closure information, which annotation can be in a layer over the HD map showing the lane being closed and not a suitable route. For example, the LMap has a base layer representing permanent information that either does not change or changes at a very low frequency, such as for buildings changing once in several years. The online HD map system 110 can be configured to add a dynamic layer on the LMap over the relevant area of the map, where the dynamic layer represents information that changes at a higher frequency than the information in the base layer, such as for lane closure information that may change in hours, days, or weeks. The online HD map system 110 can be configured to store the lane closure information as part of the dynamic layer of an HD map. The same process can be performed with a lane opening change candidate.

In some embodiments, the online HD map system 110 can be configured to send map information to vehicles that identify information in a base layer separately from information in the dynamic layer. The vehicle computing system 120 performs navigation based on a combination of the base layer and dynamic layer. For example, if the vehicle computing system 120 determines that information from the dynamic layer is missing but the information from base layer matches the sensor data, the vehicle computing system 120 may generate change candidates for the lane closure/opening proposals. Accordingly, the vehicle computing system 120 may weigh the base layer information differently than the dynamic layer information.

In some embodiments, the online HD map system 110 can be configured to require a higher threshold of instances/scores for change candidates that indicate a lane opening compared to the threshold of instances/scores for change candidates for lane closure since lane opening is determined based on absence of one or more lane closure objects in a specific lane region. For example, the dangers of inadvertently driving into an erroneously labeled opened lane that is actually closed can be disastrous, but missing an actually opened lane that is labeled as closed may not be disastrous. The lane closure object may be missing for other reasons, for example, if there is another vehicle obstructing the view or moved by wind, etc. Therefore, the online HD map system 110 can be configured to acquire a plurality of observations and change candidates from a plurality of vehicles to infer that the lane closure object is not present any more, before determining that the lane is opened again after a closure.

In some embodiments, techniques described herein in the context of lane closures also apply to lane opening. A lane opening represents an end of a lane closure or a new lane being opened, such as when cones, signs, barricades, barrels, construction equipment, or other lane closure objects are removed.

Training Data Generation

In some embodiments, the HD map system may use deep learning based models for performing various tasks, for example, for perception, for recognizing objects in images, for image segmentation, etc. The quality of these models may depend on the amount of training and the quality of training data used to train the models. However, generating good training data for training models used by autonomous vehicles may be difficult since several extreme situations may rarely be encountered by vehicles on the road. Accordingly, the models may never get trained to handle unusual/uncommon situations.

Furthermore, a model trained using images captured under certain conditions may not work with images captured during other conditions. For example, a model trained during a particular season (e.g., a snowy winter) may not work for other seasons (e.g., a sunny summertime). Also, a model trained using images taken at a particular time of the day (e.g., noon) may not work for other times of day (e.g., midnight). For example, the images used for training may be obtained during day time when objects are clearly visible. However, the vehicle may have to travel through the area during nighttime or evening when the images are not very clear. The model may not work well for images taken during evening/nighttime.

Some embodiments of the invention may generate training data using HD map data (e.g., OMap data) for training deep learning based models or machine learning based models used by autonomous vehicles. The system may use sensor data including LIDAR and camera images to build an HD map comprising a point cloud (e.g., an OMap). Various objects and features may be labelled in the HD map. In some embodiments, image recognition techniques may be used to label the features/structures in the HD map. In some embodiments, users/operators may be used to label images which are then projected onto the point cloud of the HD map to label the features in the point cloud.

In some embodiments, the system may project the images onto the point cloud based on the pose of the vehicle. The pose of the vehicle may be determined by the vehicle using localization as the vehicle drives. The system may use the pose (location and orientation) of the vehicle to determine which objects/structures/features are likely to be visible from that location and orientation of the vehicle.

Once the system labels the OMap, the labelled OMap may be used to label subsequent images. For example, a new set of images may be received that may have been captured at a different time. The system may receive the pose of the vehicle that captured each of the new images. The system may identify the objects/structures/features that are likely to be visible from that location/orientation based on the OMap. The system may label the images based on the identified objects/structures/features from the OMap. The labeled images may be used for training various models, for example, models used in perception.

In some embodiments, the system may determine coordinates of bounding boxes around objects that are labeled. For example, if the system identifies a traffic sign, the system may identify coordinates of a bounding box around the traffic sign. The bounding box may be an arbitrary 3D shape, for example, a combination of one or more rectangular blocks. The system may identify the position of the bounding box in an image and may label the object displayed in the image within the projection of the bounding box in the image using the label of the bounding box.

Some embodiments may generate training data for training of models used for building HD maps. FIG. 16 illustrates a flowchart of an example method for training data generation. As disclosed in FIG. 16, the system may perform various steps for training data generation including, for example, training label generation, selection of labels for review, review of labels, dataset creation, and model training.

With respect to quantity, in order to use machine learning techniques, especially deep learning models, the system may need large amounts of labeled samples to learn patterns in the data. To hand-label all of the samples needed may be both tedious and costly. Some embodiments may minimize the cost associated with training label generation so that a user can maximize the benefit of the model. As the system trains the model using larger amounts of high quality training data, the model may improve, which may enable better perception and may expand the capability of automation, which in turn may lower the cost in time and resources to produce a map allowing for the HD maps to be updated more quickly and less expensively.

With respect to quality, the quality of the training labels may have equal importance to the quantity of the training labels. Inaccurate labels may confuse the model and insufficient dataset diversity may lead to a lack of model generalization. High quality training data may involve having varied data and accurate labels. Improving dataset quality or quantity may both be tradeoffs against time so it may be valuable to have a framework which can balance the tradeoff of quality versus quantity for the needs of a project.

With regard to costs, to optimize the cost associated with training label generation, the system may need to reduce the time spent, which may be broken up into multiple aspects. For example, it make take time to generate the labels, review the labels, select the labels from the set of reviewed labels for training a model, and to close the loop (e.g., the time required to generate/review/select new labels if a model is trained and found to be deficient in some aspect). In some embodiments, as the system attempts to minimize all of these aspects, the loop to iterate on models may become smaller and the system's ability to experiment may become greater.

With regard to extensibility, aside from all of the above considerations of dataset quality and quantity, scalability and minimizing the time cost of training data generation, the processes may be flexible enough that additional sources of data (e.g., new sensors such as radar, etc.) or new data processing paradigms (e.g., processing video versus images, streams of LIDAR versus discrete samples, etc.) may be quickly incorporated into the processing framework of the system.

Some embodiments may generate training data using techniques that are scalable and flexible to adaptation. Further, some processes may minimize the cost associated with generating training data to facilitate better models and higher quality automation. The system may generate high quality training data thereby obtaining high quality trained models. Better trained models may result in better perception and automation of vehicles and may make it less expensive and faster to produce HD maps. Furthermore, HD maps may be updated faster and less expensively resulting in better data.

In some embodiments, features may be landmark map features, and may have gone through review during the map building process and may serve as a ground truth. In some embodiments, a label may be an object instance in a sample of data such as, for example, a stop sign in an image or a particular car in a LIDAR sample. In some embodiments, a training sample may be the collection of labels for a particular sample of data such as, for example, all of the car labels for an image or all of the available labels for a LIDAR sample.

Figure 17:
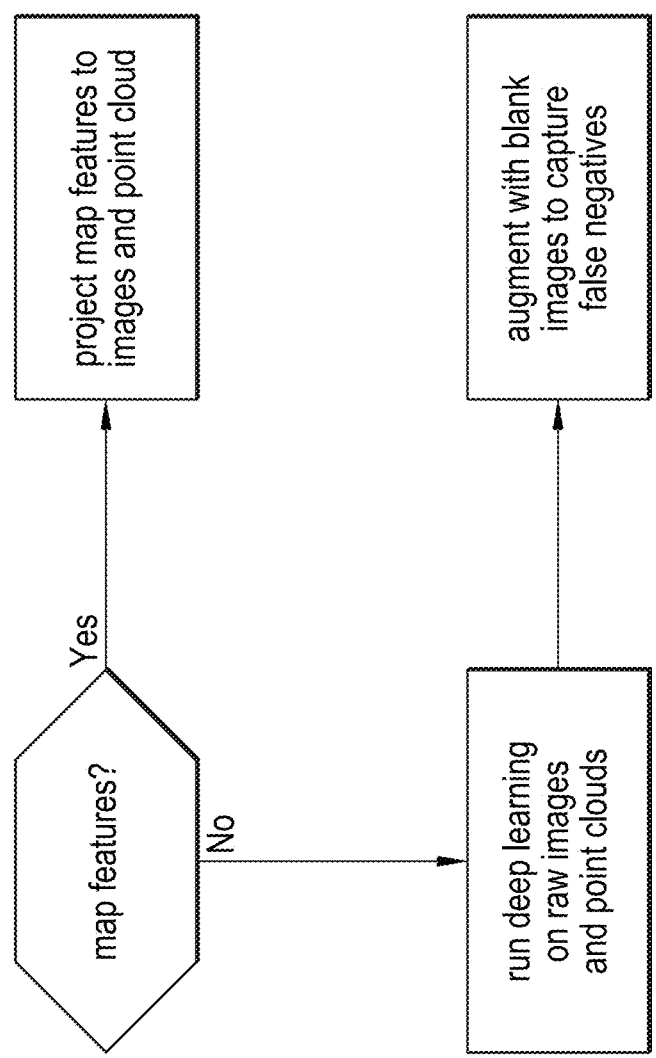
FIG. 17 illustrates a flowchart of an example workflow for training label generation.

FIG. 17 illustrates a flowchart of an example workflow for training label generation. In some embodiments, there may be at least two scenarios to support in training data generation. In the first scenario called the "map features" scenario, the models may be trained on objects that are in the map. Examples of map features may include traffic signs and cars. During the map building process, all instances of these objects may be labeled in the map (and subsequently removed in the case of cars). In the second scenario called the "model output" scenario, the system may directly review the output of the model. Examples of this scenario may include traffic cones, ICP stats, and depth image predictions. Traffic cones may typify an object which may be labeled but which does not make it into the map for labeling. In this scenario, the system may run the model on streams of data to pre-generate labels for review. Eventually, traffic cones may operate in a similar fashion to car removal, but there may always be features that either do not make it into the map or are too infrequent to have enough training data if only produced from map features. ICP stats and depth image predictions may be examples that need the output directly curated to be turned into new training labels. Running the model on data streams (e.g., a collection of images or point clouds) and reviewing the labels may be the most flexible framework and may allow new types of data such as radar to easily fit within the framework. However, the map features scenario may be the preferred framework where available because the system may want to incorporate as much of the work done during the map creation process into the label generation process to avoid duplication of review work. In both the map features scenario and the model output scenario, the goal may be to pre-populate as many labels as possible for review to reduce the work required to review new training labels. FIG. 17 discloses the decision process for which framework to use for pre-populating labels to be reviewed. When map features are available, the reviewed features may be used to project map features to all available samples (e.g., images and point clouds), which may be the preferred workflow to reduce false positives/negatives and to minimize duplication of review. If map features are not available, then the system may directly run the model on the data (e.g., on raw images and point clouds) to populate labels, and the system may augment with blank images to capture false negatives.

Figure 18:
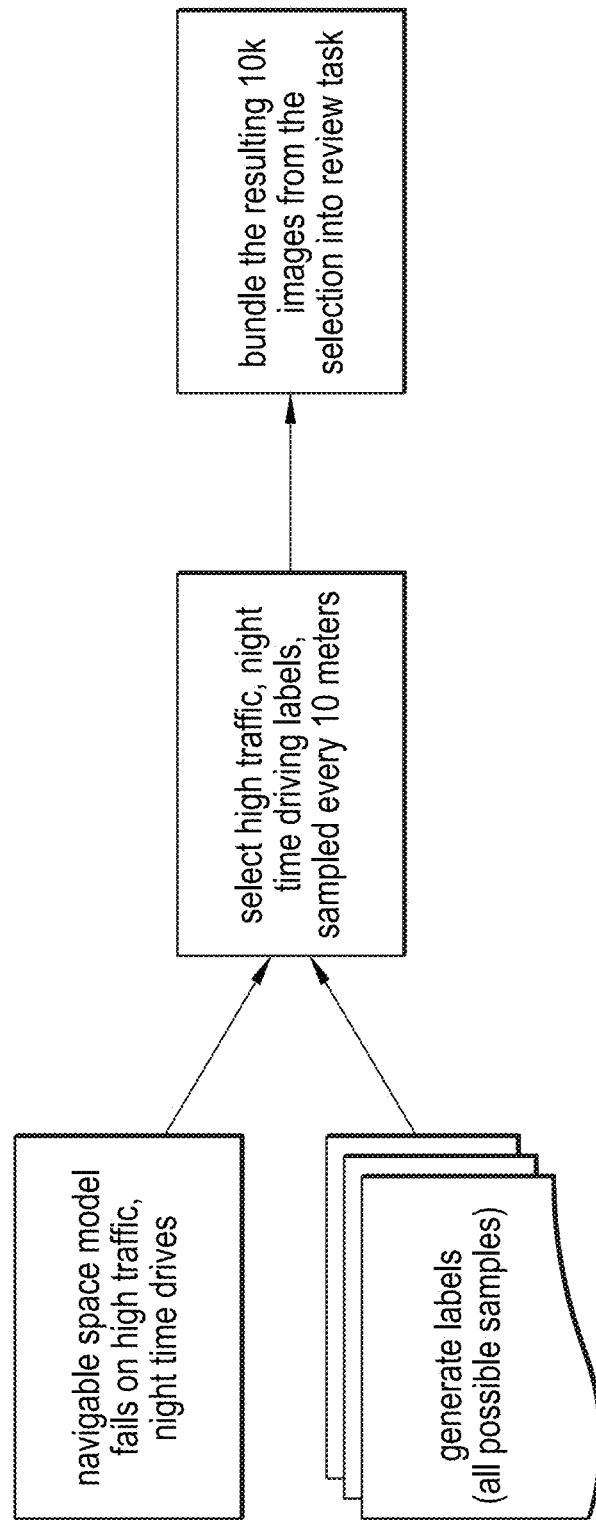
FIG. 18 illustrates a flowchart of an example workflow for selection of labels for review.

FIG. 18 illustrates a flowchart of an example workflow for selection of labels for review. After the population of labels, the process may be unified for both the first and second scenarios. A tool may allow a user to view all of the populated labels and may allow the user to make selections for which labels to send through review. In some embodiments, this may be a manual step. In some embodiments, the system may push all populated labels to review. In some embodiments, the targets for model performance targets may be set, and then the data that is needed to train the model to reach those goals may be selected using the review task creator tool. This tool may take advantage of the metadata tags applied to the training labels to facilitate the selection process. In an example of this workflow, the system may select every 100th low light sample of a particular feature type to create a set of 100 k labels to be reviewed from a set of 10 million generated training labels. FIG. 18 discloses a possible use case for the tool. The user may come to the tool with the knowledge that the user has a model which fails on a particular type of data (e.g., high-traffic night time drives) and generated labels from the pipelines described in the previous section. The user may then manually select the labels that they want for review and, using filters applied to the label metadata, they may be able to quickly select 10$k$ images to send through review.

Figure 19:
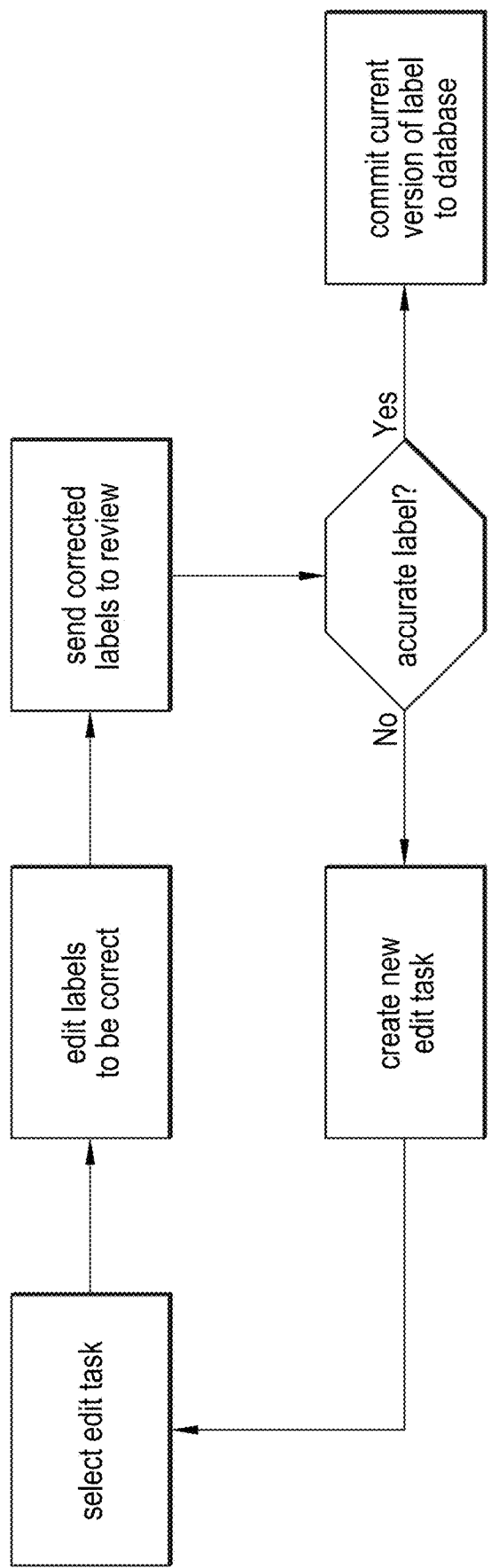
FIG. 19 illustrates a flowchart of an example workflow for review labels.

FIG. 19 illustrates a flowchart of an example workflow for review labels. With the labels to review selected, the samples may be grouped into review tasks by sample size so the quantity of work is consistent across tasks. The review tasks may be divided amongst the available users/operators. After a set of labels have gone through review and corrected for any flaws, the reviewed labels may go through a QA process that approves or rejects each label for correctness. If a label is rejected, it may need to go back through the review process for edits. This process may continue until the label is approved. At this point the label may be committed to the database and versioned in case there are further edits to the same label. FIG. 19 discloses the workflow for reviewing a label. The process may potentially be cyclic as the label goes between editing and QA for approving/rejecting edits.

Figure 20:
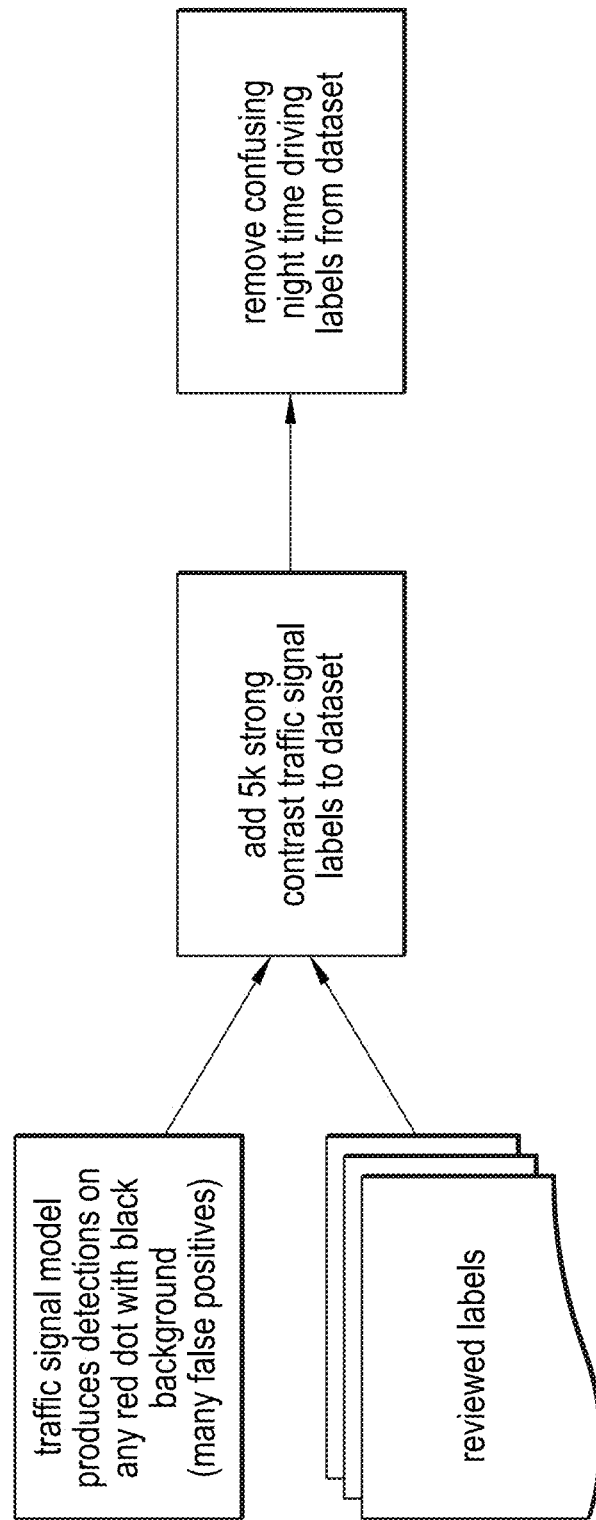
FIG. 20 illustrates a flowchart of an example workflow for dataset creation.

FIG. 20 illustrates a flowchart of an example workflow for dataset creation. After the labels are reviewed, the system may use a tool for browsing reviewed training labels. This tool may be used by the creator of a model and may allow for interaction with the training datasets, from providing visualization of the data and statistical sampling of the data to interactively reporting statistics on the selected dataset. Some potentially reported statistics may include number of instances of each class in the selected training/validation/test dataset, summary statistics of metadata properties such as location, customer, time of day, total number of samples in the dataset, and information about sampling methods used to select the data. Once a user has curated their training dataset they may obtain a fingerprint for the training set and may use this fingerprint to download that exact dataset. FIG. 20 discloses an example use case of this tool. The user may be looking to retrain a model which is performing poorly because it produces too many false positives. The user may want additional data to train the model so they come to this tool to view the reviewed labels. In this tool they may apply some metadata tag filters to narrow down the desired labels to add to 5 k strong contrast traffic signal labels. They may then confirm the addition of those labels to the dataset. Then they may look at the labels already in the dataset they are using and may find the labels of traffic lights during night time driving (e.g., again using filters on metadata tags) and may then confirm that they want to remove these labels from the dataset. They may confirm the final dataset and may get a unique identifier for the dataset.

Figure 21:
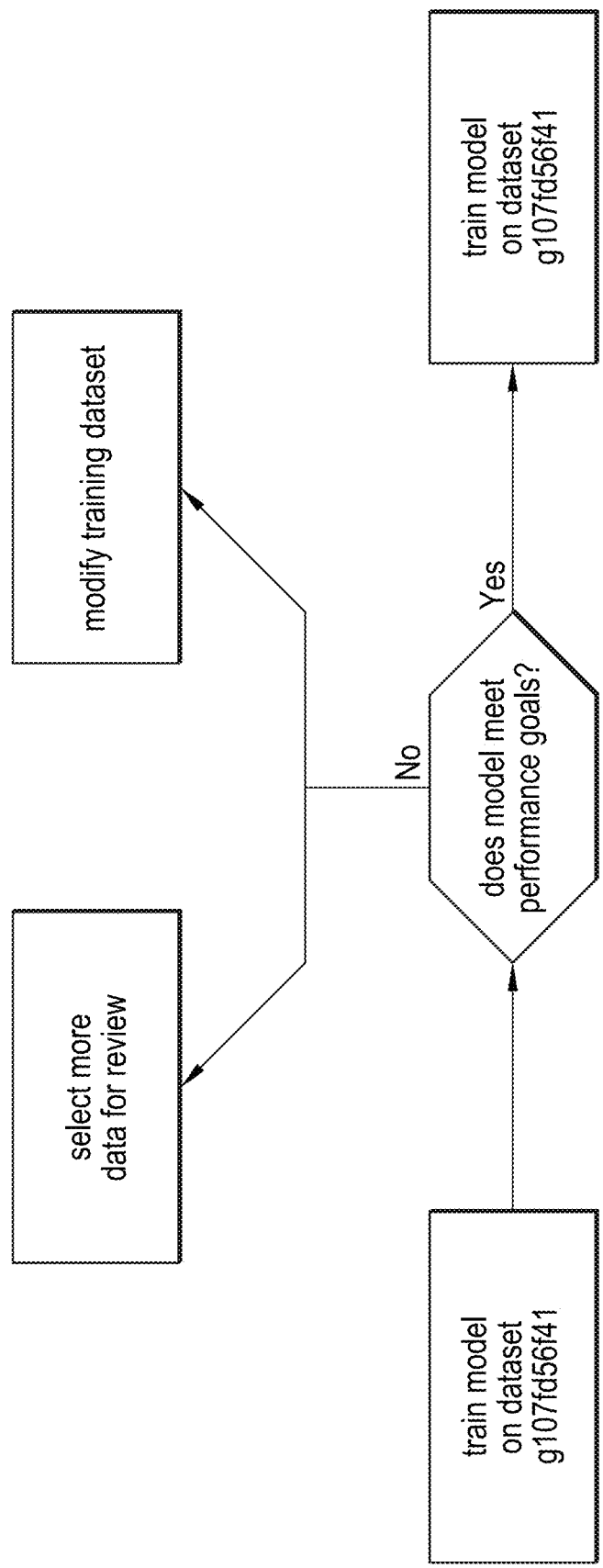
FIG. 21 illustrates a flowchart of an example workflow for model training.

FIG. 21 illustrates a flowchart of an example workflow for model training. After dataset selection, the final step may be to download the data and train the model. Should the training require additional data, the system may repeat the steps above from either dataset selection or from review task creation. FIG. 21 discloses the decision process used by the engineer training a model. They may have a unique identifier for their dataset produced from the dataset creation tool. When they train on this unique identifier, they may be able to stream all of the data that was selected in the dataset creation tool. If the model training is unsuccessful then there may be two paths forward: (1) add/remove data from the dataset using the dataset creation tool, or (2) request for additional data to be labeled and then add it to the dataset using the dataset creation tool. This process may be cyclic as the modified dataset may lead to additional training and repeating of the process until the model is ready to push to production.

With regard to label propagation, when the system creates labels from map features the process may be as follows: (1) generate the map (e.g., review features in the map), (2) from the features in the map (e.g., features refer to all the labeling that occurred during the map building process including car points for car removal), propagate the label to all viable samples. This process may work where the map labels are the best representation (e.g., the sign feature vector representation may be the best form of the feature, better than the model output). This may be true when the sign feature vector is a box and the model output is also a box. However, if the model performs a segmentation of a stop sign but the final map feature is a box then reviewing the model output could save time. The caveat may be that model output may not include false negatives and may include false positives, both of which should be rectified during the map building process. A possible optimization for this case may be to match model output with feature projections so that only samples where a map feature exists is reviewed, but if model output exists at the same location, then use that for label pre-population. For models that do not have map feature labels, the system may need to run the model on all of the data to pre-populate the labels for review. However, it may be optimal to run the model at the last moment possible that does not incur a wait for the data to review because the longer the system waits, the more likely the model has improved and will produce better labels for review. In some embodiments, the system may automate the model building and training process. Every time a set number of training labels have been reviewed from the model's dataset, the system may automatically kick off a new model generation. This may ensure that the model used to produce the labels is the best currently available. However, this may not fix the issue of a poor model running on loads of data before a user reviews any more data to retrain the model. One way to evaluate that issue may be that if there is a poor model in production then more data should be reviewed until the model is adequate. An additional concern when directly reviewing model output may be including false negatives into the dataset to be reviewed. This may require inserting blank data samples into the review tasks. Without a method for pointing out which samples contain the object, the best the system can do is create efficient tools for manually scanning the data. Some embodiments include functionality in a live viewer that allows a user to record sequences of samples so the user could mark the start of a set of samples including the object and mark the end of the observance. Some embodiments support injection of review tasks of blank samples from ranges of track sample id sequences. The same processes for identifying false negative samples may be directly relevant to bootstrapping models which do not yet have sufficient data. A final consideration may be online model training where the model is in the review loop so that every labeled input makes the pre-generated output even better for the next sample to label.

With regard to changing labeling methodology, it may be difficult to foresee all of the training label requirements for training a model, so the system may allow quickly updating the training data. Pixel perfect labels may be ideal but very time consuming. The system may allow labelling rough polygons to approximate an object's shape, bootstrap a model and when the accuracy of the model needs to improve, the system may update the previous labels. The system may allow a user to work quickly to label many training samples when quantity of training data is an issue for example initial model training when there is no previous data. This model may be useful for many months but then new requirements may come in that necessitate a higher accuracy from this model and to improve the accuracy of the model the labels may be revised. In this way, the system may support future accuracy requirements while paying the labeling cost now to only meet the current specifications. The system may support two features: versioning and easily creating review tasks from previously reviewed training data samples. For easily creating review tasks from reviewed samples, if there are 10 k labeled boxes of stop signs, the system may label the 10 k polygons of stop signs by taking the known samples and editing them. With regard to versioning, the system may version all edits to training labels so that the system supports reproducibility of the model training. With regard to dataset differencing, the system may perform dataset differencing to highlight where two or more datasets differ. If there are ten million labels in two different dataset versions, the system may identify the three labels that differ between them and visualizes the appearance of the labels in dataset 1 and what they look like in dataset 2.

With regard to sequential information, sequential data may provide a unique change in training label generation. The system may generally consider each sample as independent which allows for easy distribution of tasks across many machines. With the sequentiality of the data limited to the length of a track, the system may maintain reasonable task distribution across machines during label generation. The system may support linking of label instances across multiple frames. A reviewer may click through a video, highlighting the same instance throughout all of the frames. In some embodiments, a model may pre-populate this information as well, predicting the current instance's segmentation in the next frame.

With regard to scalability, the system may support distributed modes of processing that share the samples to be processed. Training data may be per sample so that it scales with input data (tracks) instead of alignments. Assuming independent samples, all of the data may be processed independently. The system may scale by adding more hardware to achieve target run rates.

In some embodiments, the steps performed for training data generation may include:
1. Pre-populate labels
   a. Framework 1: training label generation
      i. Camera image training label
      ii. Tile image training label
      iii. Lidar sample training label
   b. Framework 2: feature labels from model
      i. Image models
      ii. Lidar sample models
      iii. Combined image & lidar models
2. Labels to review selection tool
   This tool may share functionality with the training data selection tool but may be focused on selecting labels to send to review
   All of the selected labels may be grouped into a project and may be divided into review tasks for QA
3. Training label review tool
   This tool may support both editing and QA of labels, and during QA tasks only approve/reject actions may be available, but during edit the user can:
   Add & remove labels
   Edit labels
   Change label type
   Reject image due to data issue of:
      Blurry
      Exposure
   LIDAR sample labels, tile images, and camera image labels may all be reviewed
4. Training data selection tool
   This tool may allow for combining feature labels to create the dataset desired for model training. Training samples may be created dynamically which can contain labels of any combination of features, for example signs and cars or cars and navigable space. Labels may be be searched by image id so that all labeled features for a given image id can be returned.
   Labels may be searched by multiple criteria: id, feature type, data conditions, customer, location, etc.
   The set of <label_id>-<version> strings of all of the samples selected for a dataset may be hashed to uniquely identify the dataset and generate a dataset id. This list of ids may then be stored, keyed by its id, and retrievable from the storage.
5. Model training
   Datasets may be given a unique identifier so the user can create a repeatable training process. The dataset can be downloaded by its id.

With regard to the structure of a training label, the training label may be stored in a structure that comprises a track identifier, sensor identifier, unique identifier for the training label, image or point cloud label identifier, type of feature that was labeled, a version, and any other metadata.

Synthetic Data Driven Change Detection Simulation

In some embodiments, scenarios such as lane closure may be difficult to test. For example, a lane closure may be a relatively rare phenomenon and data for testing lane closures based on different scenarios may be difficult to obtain. For example, for thoroughly testing/evaluating instructions associated with autonomous vehicles, multiple situations of lane closure may need to be tested/evaluated, for example, different numbers of lanes, different positions where one or more cones are placed, different types of streets, different cities, etc.

Some embodiments may allow generation of synthetic sensor data representing scenarios that may be user specified and may not represent real world scenarios. The data may be used, for example, for testing, debugging, or training models.

In some embodiments, the HD map system may include an LMap describing various features in a region and an OMap representing a point cloud of a region. In some embodiments, the OMap may include a collection of aligned points representing the surfaces seen from many collective LIDAR scans, organized into an HD map. In some embodiments, the LMap may include a list of features such as maps, lane lines, signs, and cones, organized geographically, organized into an HD map, with dimensions and locations. The system may provide a user interface that allows a user to view the LMap data or the OMap data. The system may allow a user to edit the map data by adding/removing/perturbing objects and/or structures in the map. For example, a user may add a new traffic sign at a location where there is no traffic sign in the real world. The user may also remove a traffic sign from the map from a location even though the traffic sign continues to exist in the real world. The user may move a traffic sign from one location to another location, for example, to a neighboring location. Similarly, the user may add/remove/move traffic cones, construction signs, lane lines, traffic signs, traffic lights, curbs, barriers, dynamic object (e.g., parked vehicles), etc.

In some embodiments, the system may provide a library of synthetic objects that can be added to the map, for example, various traffic signs, cones, lane lines, traffic lights, curbs, barriers, dynamic object (e.g., parked vehicles), etc. For each synthetic object, the system may store a model including a 3D point cloud representation of the object. A user may specify a location where the object should be placed in a map. The system may allow the user to scale the object to increase/decrease the size from a default size, and/or the system may allow the user to specify the size of the object.

In some embodiments, the user may edit a view of the LMap using a user interface and the system may correspondingly update the OMap. For example, if the user adds an object at a location specified via the LMap, the system may add a point cloud representation of the object in the OMap. Similarly, if the user removes an object from a location specified via the LMap, the system may remove a set of points representing the object from the point cloud representation of the OMap. Similarly, if the user moves an object from a first location to a second location specified via the LMap, the system may move the set of points representing the object from the first location to the second location in the point cloud representation of the OMap.

In some embodiments, the system may provide a visualization of the OMap data via a user interface. The system may perform segmentation based on deep learning models to identify various objects represented by various sets of points of the OMap. The OMap representation may annotate sets of points with labels identifying corresponding real-world objects. The OMap may be configured to receive instructions to edit the OMap, for example, instructions to add/delete/move objects. The system may edit the point cloud representation in accordance with the instructions and may also update the LMap to keep the two maps consistent.

In some embodiments, the system may save a separate layer of the map with the edits so that an edited version of the map can be created at any point in time. Furthermore, the system may receive and store several sets of edits provided by one or more users. The system may generate a version of the HD map based on a particular set of edits.

Once the system generates an edited version of the HD map, the system may generate sensor data based on the edited version. The sensor data may be generated from the point of view of various poses of vehicles. For example, the system may generate a LIDAR scan by projecting the OMap data. The system may receive a pose of the vehicle and may generate the LIDAR scan as observed by a LIDAR from the specified pose.

In some embodiments, the system may generate camera images as observed by a camera from a given pose. The system may store 3D models of various types of objects and may project the objects from a particular direction to generate an image. In some embodiments, the system may receive an image that may have been previously captured by a camera and may edit the image to either add a projection of an object or remove the object in accordance with instructions provided by a user to edit the map.

The system may generate samples representing sensor data from a series of poses corresponding to a track. Accordingly, the system may generate simulated tracks based on HD map data that has been modified to add synthetic objects. The system may use the generated simulated track for testing purposes. The system may also use the generated simulated track for debugging purposes, for example, to recreate a situation in which the code for a vehicle acted in a particular way. The system may use the generated tracks for training machine learning models based on situations that are difficult to encounter and for which training data is sparsely available. The system may then use the trained models for navigation of vehicles. If the system uses the synthetic tracks for testing/evaluating some code/set of instructions, the system may use the tested code/instructions for navigating the vehicle, possibly through a situation that is similar to the edited track. Further, if the system uses the synthetic tracks for debugging some code/set of instructions, the system may use the debugged code/set of instructions for navigating the vehicle, possibly through a situation that is similar to the edited track.

Synthetic Track Generation for Lane Network Change Benchmarking

Some embodiments may involve the generation of synthetic track data and the ground truth for a change detection evaluation framework. The synthetic data may entail accurate obstacle locations with the corresponding 2D perception output that are normally provided from a perception service as object detection results. The synthetic data generation may allow the system to create various corner case track scenarios that are beneficial for the validation of a change detection algorithm.

In some embodiments, in order to evaluate the performance of a change detection framework, it may need to be tested on a large set of scenarios that occur in traffic. The testing dataset may include numerous corner cases that do not appear regularly in a real world traffic environment. The change detection evaluation framework may require ground truth, which may include information about obstacles (such as 3D positions of obstacles), and IDs of lane elements that are closed because of them. In case of using only a real world dataset, creating the labeled test dataset may require manual validation of the ground truth, which may be neither efficient nor precise. The test dataset augmentation may be handled by generating synthetic track data using the world geometry, computed from real measurements, and inserting static obstacles on predefined 3D positions that can be labeled as the ground truth, and used in the change detection validation framework.

In some embodiments, one goal of the system may be to generate track data that will be able to simulate various corner cases hard to find in real tracks. Further, another goal of the system may be to generate the ground truth information for the change detection service that includes closed LaneEl candidates and 3D positions of obstacles. In some embodiments, a LaneEl may include a particular kind of feature, such as portion of a road, representing part of a lane, found in the LMAP, containing physical location, dimension, and connection/routing information, as well as other optional data like speed limit and other special instructions.

In some embodiments, instead of synthesizing the whole environment for a virtual simulation, the system may use a GUI tool to interactively generate a synthetic environment using an existing map (e.g., that include both an OMap and an LMap).

Figure 22:
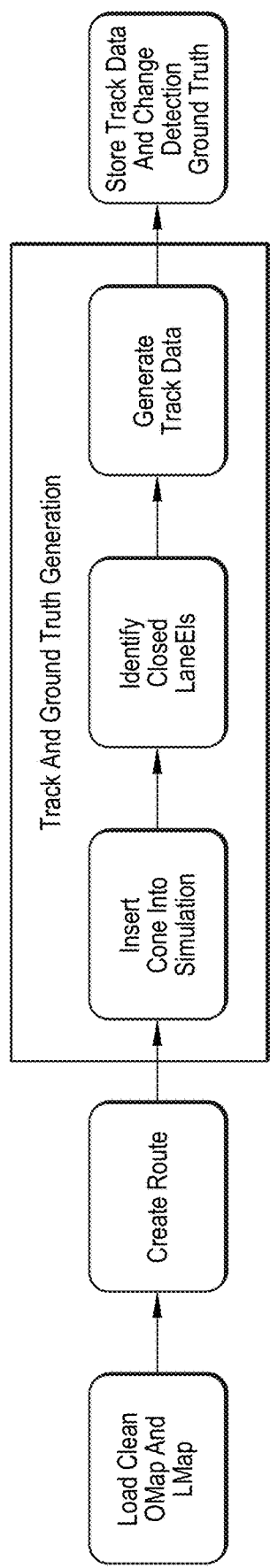
FIG. 22 illustrates a flowchart of an example method for synthetic track generation for lane network change benchmarking.

FIG. 22 illustrates a flowchart of an example method for synthetic track generation for lane network change benchmarking. As disclosed in FIG. 22, the tool may load the clean (e.g., real world) OMap/LMap data and may allow a user to interactively select vehicle route, place obstacles, and identify affected LaneEls. In some embodiments, cones may be used as obstacles. Further, as disclosed in FIG. 22, a user may be expected to use a viewer to view the LMap and interactively select both a start position and an end position. The user may also add waypoints to further constrain the routing decision. The viewer may then invoke a routing service in order to compute the route. After the route is decided, the user may interactively place obstacles (e.g., cones, traffic signs, etc.) in the LMap view. The viewer may compute and remember the 3D locations of these obstacles. The user may place cones in different configurations to test the lane closure propagation algorithm. The obstacles may be placed in a variety of obstacle placement configurations. The user may also interactively identify the set of LaneEls that are closed by the obstacles. LaneEls closed may include more than just those LaneEls where cones are present. They may also include the regions within navigable boundaries that cannot be entered or cannot reach other open LaneEls (e.g., due to obstacles).

Subsequently, vehicle motion may be simulated along the simulated route. As the vehicle travels along the simulated route, the vehicle pose may be determined accurately at any moment. Sensor data may be computed based on the expected frequency (e.g., 100 HZ for fused GPS/IMU, 25 HZ for camera image, and 10 HZ for LIDAR), and vehicle poses may be computed at each sensor data timestamp. Camera images may contain the contour of obstacle projection (e.g., to ease debugging) as well as perception output for each camera frame. The perception output and camera image may be computed by calculating the projection of obstacles on each camera frame. The LIDAR scan may be generated by ray tracing the OMap (e.g., by computing laser returns from the closest OMap points). The resulting point cloud may or may not be motion compensated. Vehicle poses at each point cloud starting timestamp may be stored as well so that during replay the system may not need to run ICP to register the point cloud with the OMap.

In some embodiments, all of the data that is generated from the tool may first be stored on a local disk. A separate tool may be provided to upload the generated track and ground truth to online storage (e.g., S3 or artifactory) so that they can be used by a change detection evaluation framework. The following data may be written: (1) images from each camera with timestamp, (2) LIDAR scans with timestamp, (3) fused GPS data, (4) sensor calibration configurations, (5) vehicle poses at point cloud starting timestamp, (6) ground truth, and (7) an LMap dynamic layer containing all the closed LaneEls (e.g., this may be useful to simulate LaneEl reopening).

With regard to simulate LaneEl reopening, the above workflow may work well to test LaneEl closure, but it can also be used to generate a track to test LaneEl reopening with minor enhancements as follows: (1) a user may need to provide a dynamic layer which may be generated either by a production pipeline or by the tool, (2) optionally, the user may also provide ground truth data accompanying the dynamic layer, and (3) the viewer may render the dynamic layer and obstacles, if the ground truth is provided. Similar to the case of a LaneEl closure, a user may interactively decide the route. The user may then interactively remove (and add) obstacles and closed LaneEls. Finally the track may be generated and data may be saved as before.

In some embodiments, synthetic cones may be located on roads to simulate temporary traffic redirection. The addition of a 3D model of a traffic cone into the virtual environment may enable the system to synthesize different scenarios.

Figure 23:
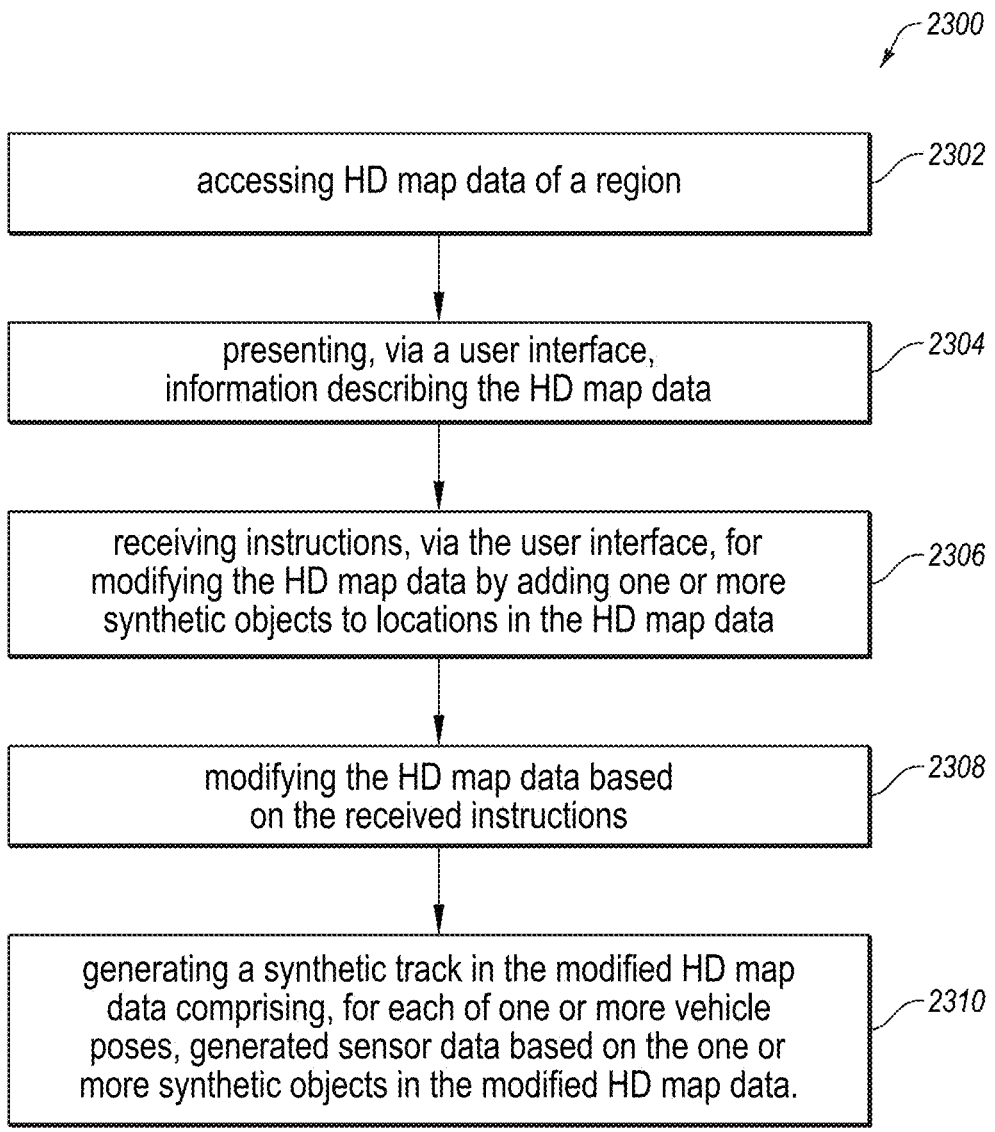
FIG. 23 illustrates a flowchart of an example method for using high definition maps for generating synthetic sensor data for autonomous vehicles.

FIG. 23 illustrates a flowchart of an example method 2300 for using high definition maps for generating synthetic sensor data for autonomous vehicles. The method 2300 may be performed by any suitable system, apparatus, or device. For example, one or more elements of the HD map system 100 of FIG. 1 may be configured to perform one or more of the operations of the method 2300. Additionally or alternatively, the computer system 2400 of FIG. 24 may be configured to perform one or more of the operations associated with the method 2300. Although illustrated with discrete blocks, the actions and operations associated with one or more of the blocks of the method 2300 may be divided into additional blocks, combined into fewer blocks, or eliminated, depending on the particular implementation.

The method 2300 may include, at action 2302, accessing HD map data of a region. For example, the map update module 420 may access, at action 2302, HD map data of a region.

The method 2300 may include, at action 2304, presenting, via a user interface, information describing the HD map data. For example, the map update module 420 may present, at action 2304, information describing the HD map data via a user interface.

The method 2300 may include, at action 2306, receiving instructions, via the user interface, for modifying the HD map data by adding one or more synthetic objects to locations in the HD map data. In some embodiments, each of the one or more synthetic objects may comprise a synthetic traffic sign, a synthetic traffic cone, a synthetic traffic light, a synthetic lane line, a synthetic curb, a synthetic barrier, or a synthetic dynamic object. In some embodiments, the modification may further comprise removing a synthetic object from a location in the HD map data and/or moving a synthetic object from a first locations in the HD map data to a second location in the HD map data. For example, the map update module 420 may receive instructions, at action 2306, for modifying the HD map data via the user interface. These modifications may include adding one or more synthetic objects (e.g., traffic signs, traffic cones, etc.) to locations in the HD map data, removing a synthetic object from a location in the HD map data, and/or moving a synthetic object from a first locations in the HD map data to a second location in the HD map data.

The method 2300 may include, at action 2308, modifying the HD map data based on the received instructions. For example, the map update module 420 may modify, at action 2308, the HD map data based on the received instructions.

The method 2300 may include, at action 2310, generating a synthetic track in the modified HD map data comprising, for each of one or more vehicle poses, generated synthetic sensor data based on the one or more synthetic objects in the modified HD map data. In some embodiments, the generated synthetic sensor data may comprise generated synthetic LIDAR data and/or generated synthetic camera data. For example, the map update module 420 may generate, at action 2310, a synthetic track in the modified HD map data. The synthetic track may include, for each of one or more vehicle poses, generated synthetic sensor data based on the one or more synthetic objects in the modified HD map data.

In some embodiments, the method 2300 may further include training a deep learning model based on synthetic track, the deep learning model configured to be used by an autonomous vehicle for navigation along a route.

Subsequent to the action 2310, the method 2300 may employ the generated synthetic sensor data in navigating the vehicle 150, or in simulating the navigation of the vehicle 150 (e.g., for testing or debugging of the vehicle 150). Further, the method 2300 may be employed repeatedly as the vehicle 150 navigates along a road. For example, the method 2300 may be employed when the vehicle 150 (or another non-autonomous vehicle) starts driving, and then may be employed repeatedly during the navigation of the vehicle 150 (or another non-autonomous vehicle). The vehicle 150 may navigate by sending control signals to controls of the vehicle 150. The method 2300 may be employed by the online HD map system 110 and/or by the vehicle computing system 120 of the vehicle 150 to generate synthetic sensor data to simulate a lane closure, without an actual lane closure in the real world, to enable testing of navigation of the autonomous vehicle 150 along the synthetic track.

Computing Machine Architecture

Figure 24:
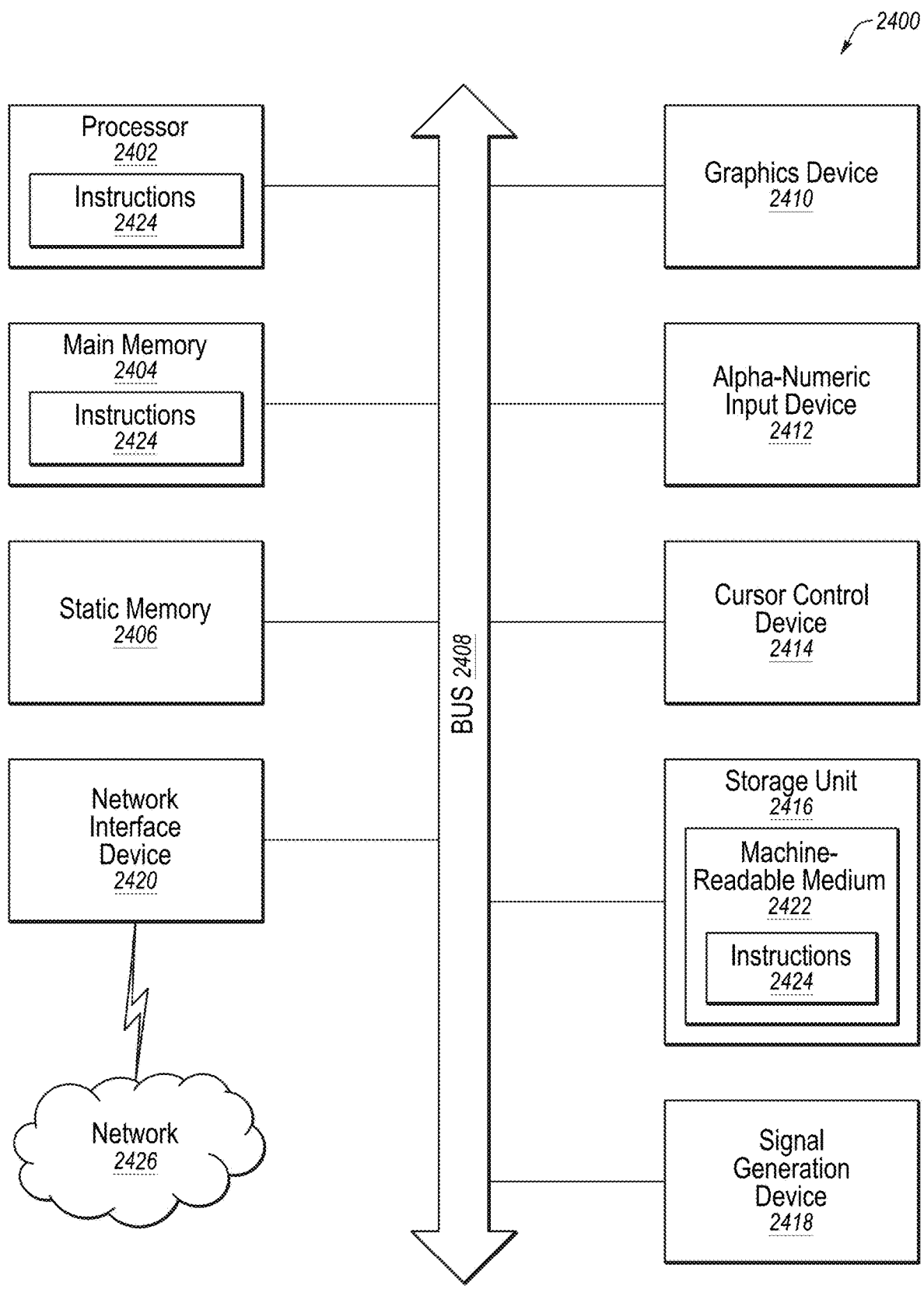
FIG. 24 illustrates an embodiment of a computing machine that can read instructions from a machine-readable medium and execute the instructions in a processor or controller.

FIG. 24 is a block diagram illustrating components of an example computer system 2400 (e.g., machine) able to read instructions from a tangible, non-transitory machine-readable medium and execute them in a processor (or controller). Specifically, FIG. 24 shows a diagrammatic representation of a machine in the example form of a computer system 2400 within which instructions 2424 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The computer system 2400 may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 2424 (sequential or otherwise) that specify actions to be taken by that machine. Further, while only a single machine is illustrated, the term "machine" shall also be taken to include any collection of machines that individually or jointly execute instructions 2424 to perform any one or more of the methodologies discussed herein.

The example computer system 2400 may be part of or may be any applicable system described in the present disclosure. For example, the online HD map system 110 and/or the vehicle computing systems 120 described above may comprise the computer system 2400 or one or more portions of the computer system 2400. Further, different implementations of the computer system 2400 may include more or fewer components than those described herein. For example, a particular computer system 1600 may not include one or more of the elements described herein and/or may include one or more elements that are not explicitly discussed.

The example computer system 2400 includes a processor 2402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 2404, and a static memory 2406, which are configured to communicate with each other via a bus 2408. The computer system 2400 may further include graphics display unit 2410 (e.g., a plasma display panel (PDP), a liquid crystal display (LCD), a projector, or a cathode ray tube (CRT)). The computer system 2400 may also include alphanumeric input device 2412 (e.g., a keyboard), a cursor control device 2414 (e.g., a mouse, a trackball, a joystick, a motion sensor, or other pointing instrument), a storage unit 2416, a signal generation device 2418 (e.g., a speaker), and a network interface device 2420, which also are configured to communicate via the bus 2408.

The storage unit 2416 includes a machine-readable medium 2422 on which is stored instructions 2424 (e.g., software) embodying any one or more of the methodologies or functions described herein. The instructions 2424 (e.g., software) may also reside, completely or at least partially, within the main memory 2404 or within the processor 2402 (e.g., within a processor's cache memory) during execution thereof by the computer system 2400, the main memory 2404 and the processor 2402 also constituting machine-readable media. The instructions 2424 (e.g., software) may be transmitted or received over a network 2426 via the network interface device 2420.

While machine-readable medium 2422 is shown in an example embodiment to be a single medium, the term "machine-readable medium" should be taken to include a single medium or multiple media (e.g., a centralized or distributed database, or associated caches and servers) able to store instructions (e.g., instructions 2424). The term "machine-readable medium" shall also be taken to include any medium that is capable of storing instructions (e.g., instructions 2424) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although the techniques described herein are applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein can also be applied for displaying maps for purposes of computer simulation, for example, in computer games, and so on.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the systems and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modules running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc.", or "at least one of A, B, or C, etc." or "one or more of A, B, or C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
    accessing high definition (HD) map data of a region, the HD map data including landmark map data and occupancy map data, the landmark map data including location information related to one or more objects included in the HD map data, the occupancy map data including point cloud data representing the region and obtained from one or more light detection and ranging (LIDAR) sensors;
    presenting, via a user interface, information describing the HD map data;
    receiving instructions, via the user interface, for modifying the HD map data by adding one or more synthetic objects to locations in the HD map data and for defining one or more of: a route of a vehicle, one or more lane elements corresponding to the route, or one or more waypoints constraining the route;
    modifying the HD map data based at least on the instructions, wherein the modifying of the HD map data includes:
        adding respective point cloud representations of the one or more synthetic objects to the point cloud data of the occupancy map data; and
        updating the landmark map data to include respective location information of the one or more synthetic objects; and
    generating synthetic track data in the modified HD map data, the synthetic track data comprising, for one or more vehicle poses, synthetic sensor data based at least on the one or more synthetic objects in the modified HD map data such that the synthetic track data corresponds to a simulated vehicle trajectory within the region, the simulated vehicle trajectory being determined based at least on the instructions.

2. The method of claim 1, wherein the synthetic track data simulates a lane closure without an actual lane closure in the real world to allow for testing of navigation of an autonomous vehicle along the simulated vehicle trajectory that corresponds to the synthetic track data.

3. The method of claim 1, wherein the instructions for modifying the HD map data further comprise one or more of:
    removing a synthetic object from a location in the HD map data; or
    moving a synthetic object from a first location in the HD map data to a second location in the HD map data.

4. The method of claim 1, further comprising training a deep learning model based at least on the synthetic track data, at least one instance of the deep learning model used by an autonomous vehicle for navigation along a route.

5. The method of claim 1, wherein the one or more synthetic objects comprise one or more of: a synthetic traffic sign, a synthetic traffic cone, a synthetic traffic light, a synthetic lane line, a synthetic curb, a synthetic barrier, or a synthetic dynamic object.

6. The method of claim 1, wherein the synthetic sensor data comprises one or more of: generated synthetic LIDAR data, or generated synthetic camera data.

7. A processor comprising:
    processing circuitry to cause performance of operations comprising:
        receiving, via a user interface and based at least on a presentation of information corresponding to HD map data of a region, one or more first inputs corresponding to a modification of the HD map data by adding one or more synthetic objects to locations in the HD map data and one or more second inputs corresponding to one or more of: a route of a vehicle, one or more lane elements corresponding to the route, or one or more waypoints constraining the route;

modifying the HD map data based at least on the one or more first inputs, wherein the modifying of the HD map data includes:
adding respective point cloud representations of the one or more synthetic objects to occupancy map data of the HD map data, and
updating landmark map data of the HD map data to include location information related to the one or more synthetic objects in response to adding the respective point cloud representations to the occupancy map data; and
generating, based at least on the one or more first inputs and the one or more second inputs, synthetic track data corresponding to the modified HD map data and corresponding to the route, the synthetic track data comprising, for one or more vehicle poses, synthetic sensor data generated based at least on the one or more synthetic objects in the modified HD map data, the synthetic track data corresponding to a simulated vehicle trajectory within the region.

8. The processor of claim 7, wherein the synthetic track data simulates a lane closure without an actual lane closure in the real world to allow for testing of one or more navigation operations associated with an autonomous vehicle along the simulated vehicle trajectory that corresponds to the synthetic track data.

9. The processor of claim 7, wherein the one or more first inputs further correspond to one or more of:
removing a synthetic object from a location in the HD map data; or
moving a synthetic object from a first location in the HD map data to a second location in the HD map data.

10. The processor of claim 7, further comprising training a deep learning model based at least on the synthetic track data, at least one instance of the deep learning model used in an autonomous vehicle for navigation.

11. The processor of claim 7, wherein the one or more synthetic objects comprise one or more of: a synthetic traffic sign, a synthetic traffic cone, a synthetic traffic light, a synthetic lane line, a synthetic curb, a synthetic barrier, or a synthetic dynamic object.

12. The processor of claim 7, wherein the synthetic sensor data comprises one or more of: generated synthetic LIDAR data, or generated synthetic camera data.

13. A system comprising:
one or more processing units to perform operations comprising:
receiving, via a user interface and based at least on a presentation of information corresponding to HD map data of a region, one or more first inputs corresponding to a modification of the HD map data by adding one or more synthetic objects to locations in the HD map data and one or more second inputs corresponding to a route of a vehicle;
modifying the HD map data based at least on the one or more first inputs, wherein the modifying of the HD map data includes:
updating, with respective representations of the one or more synthetic objects, occupancy map data of the HD map data that includes point cloud data representing the region, and
updating landmark map data of the HD map data to include location information related to the one or more synthetic objects; and
generating, based at least on the one or more first inputs and the one or more second inputs, synthetic track data corresponding to the modified HD map data and corresponding to the route, the synthetic track data comprising, for one or more vehicle poses, synthetic sensor data generated based at least on the one or more synthetic objects in the modified HD map data, the synthetic track data corresponding to a simulated vehicle trajectory within the region.

14. The system of claim 13, wherein the synthetic track data simulates a lane closure without an actual lane closure in the real world to allow for testing of one or more navigation operations associated with an autonomous vehicle along the simulated vehicle trajectory that corresponds to the synthetic track data.

15. The system of claim 13, wherein the one or more first inputs further correspond to removing a synthetic object from a location in the HD map data.

16. The system of claim 13, wherein the one or more first inputs further correspond to moving a synthetic object from a first location in the HD map data to a second location in the HD map data.

17. The system of claim 13, further comprising training a deep learning model based at least on the synthetic track data, at least one instance of the deep learning model used in an autonomous vehicle for navigation.

18. The system of claim 13, wherein the one or more synthetic objects comprise one or more of: a synthetic traffic sign, a synthetic traffic cone, a synthetic traffic light, a synthetic lane line, a synthetic curb, a synthetic barrier, or a synthetic dynamic object.

19. The system of claim 13, wherein the synthetic sensor data comprises one or more of: generated synthetic LIDAR data, or generated synthetic camera data.

20. The system of claim 13, wherein the one or more second inputs corresponding to the route include one or more of: one or more lane elements corresponding to the route or one or more waypoints constraining the route.

* * * * *